(12) United States Patent
Kurihara et al.

(10) Patent No.: US 11,823,004 B2
(45) Date of Patent: Nov. 21, 2023

(54) INFORMATION MEDIUM, RECORDING APPARATUS, AND READING APPARATUS

(71) Applicant: Sony Group Corporation, Tokyo (JP)

(72) Inventors: Kenichi Kurihara, Tokyo (JP); Nobukazu Hirai, Tokyo (JP)

(73) Assignee: Sony Group Corporation, Tokyo (JP)

(*) Notice: Subject to any disclaimer, the term of this patent is extended or adjusted under 35 U.S.C. 154(b) by 67 days.

(21) Appl. No.: 17/438,201

(22) PCT Filed: Feb. 13, 2020

(86) PCT No.: PCT/JP2020/005433
§ 371 (c)(1),
(2) Date: Sep. 10, 2021

(87) PCT Pub. No.: WO2020/195283
PCT Pub. Date: Oct. 1, 2020

(65) Prior Publication Data
US 2022/0253621 A1    Aug. 11, 2022

(30) Foreign Application Priority Data
Mar. 27, 2019    (JP) .................. 2019-060353

(51) Int. Cl.
*G06K 7/14*    (2006.01)
*B41M 5/28*    (2006.01)
(Continued)

(52) U.S. Cl.
CPC .............. *G06K 7/1417* (2013.01); *B41M 5/28* (2013.01); *B41M 5/323* (2013.01); *B41M 5/42* (2013.01);
(Continued)

(58) Field of Classification Search
CPC .... G06K 7/1417; G06K 7/1491; G06K 1/121; G06K 19/06037; G06K 19/06093;
(Continued)

(56) References Cited

U.S. PATENT DOCUMENTS

2009/0166418 A1    7/2009    Onoda
2014/0284382 A1    9/2014    Park
(Continued)

FOREIGN PATENT DOCUMENTS

CN    101819647 A    9/2010
JP    H09-509516 A    9/1997
(Continued)

OTHER PUBLICATIONS

International Search Report issued in International Patent Application No. PCT/JP2020/005433 dated May 19, 2020 and English translation of same. 5 pages.
(Continued)

*Primary Examiner* — Laura A Gudorf
(74) *Attorney, Agent, or Firm* — K&L Gates LLP

(57) ABSTRACT

An information medium according to an embodiment of the present disclosure includes two or more data layers provided on a support base. The two or more data layers have two or more pieces of visible information recorded on the two or more data layers. The two or more pieces of visible information are obtained by decomposing two-dimensional visible information and thereby allowing synthesis of the two or more pieces of visible information to result in the two-dimensional visible information.

18 Claims, 33 Drawing Sheets

(51) Int. Cl.
*B41M 5/323* (2006.01)
*B41M 5/42* (2006.01)
*G06K 1/12* (2006.01)
*G06K 19/06* (2006.01)

(52) U.S. Cl.
CPC .......... *G06K 1/121* (2013.01); *G06K 7/1491* (2013.01); *G06K 19/0615* (2013.01); *G06K 19/06037* (2013.01); *G06K 19/06093* (2013.01)

(58) Field of Classification Search
CPC ..... G06K 19/0615; B41M 5/28; B41M 5/323; B41M 5/42
See application file for complete search history.

(56) References Cited

U.S. PATENT DOCUMENTS

| | | | |
|---|---|---|---|
| 2015/0306887 A1* | 10/2015 | Waumans | B42D 25/30 |
| | | | 347/102 |
| 2017/0193260 A1* | 7/2017 | Prusik | G06K 19/0614 |
| 2019/0033206 A1 | 1/2019 | Spoettl et al. | |

FOREIGN PATENT DOCUMENTS

| | | |
|---|---|---|
| JP | 2004-234318 A | 8/2004 |
| JP | 2016-100013 A | 5/2016 |
| WO | WO07/010650 A1 | 1/2007 |
| WO | WO-2018188351 A1 | 10/2018 |

OTHER PUBLICATIONS

Written Opinion issued in International Patent Application No. PCT/JP2020/005433 dated May 19, 2020. 3 pages.

* cited by examiner

[FIG. 1]
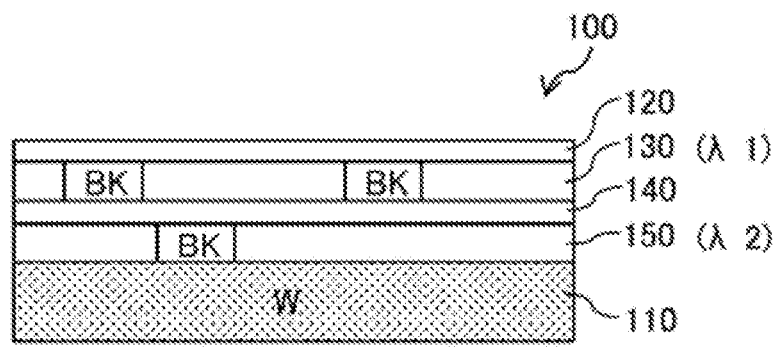
[FIG. 2]
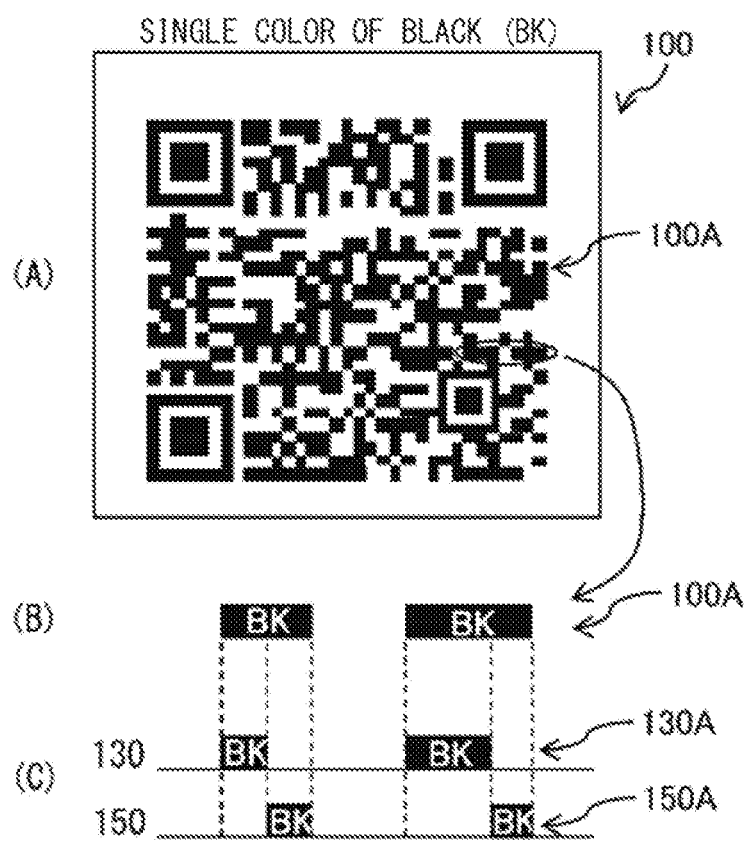

[FIG. 3]
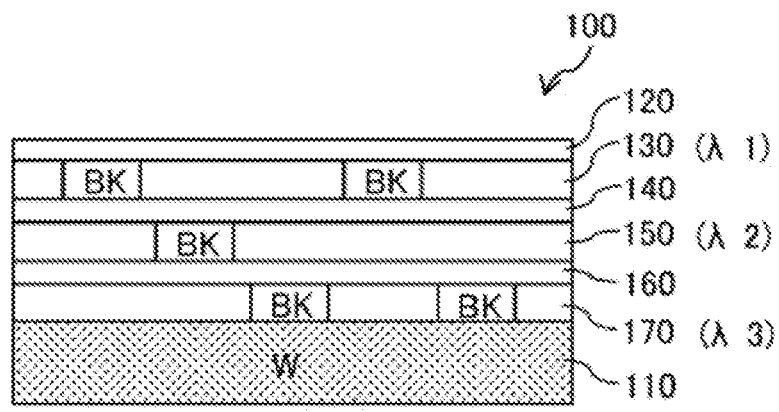
[FIG. 4]
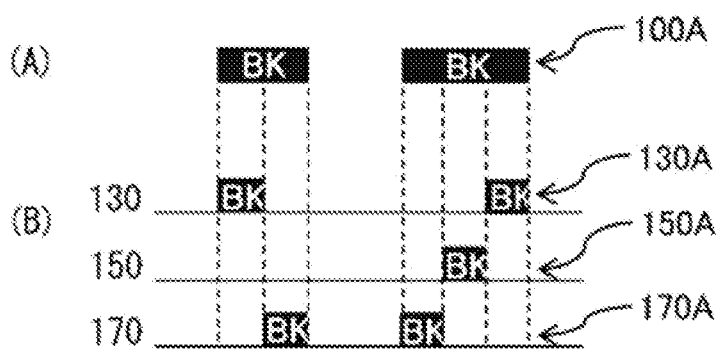
[FIG. 5]
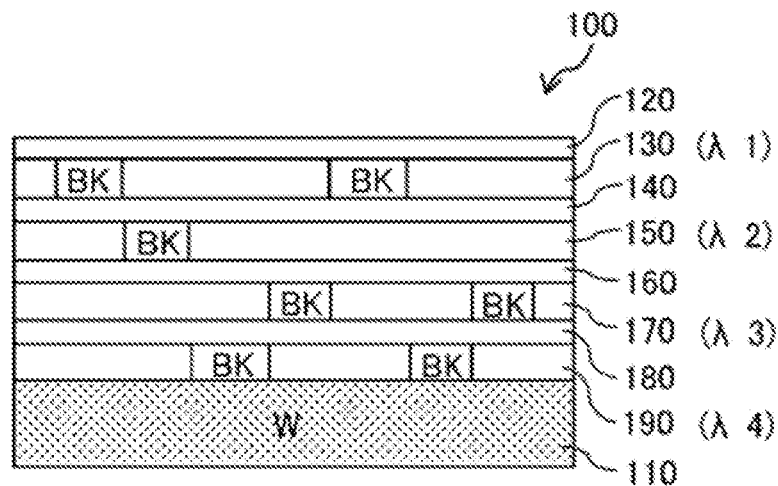

[ FIG. 6 ]
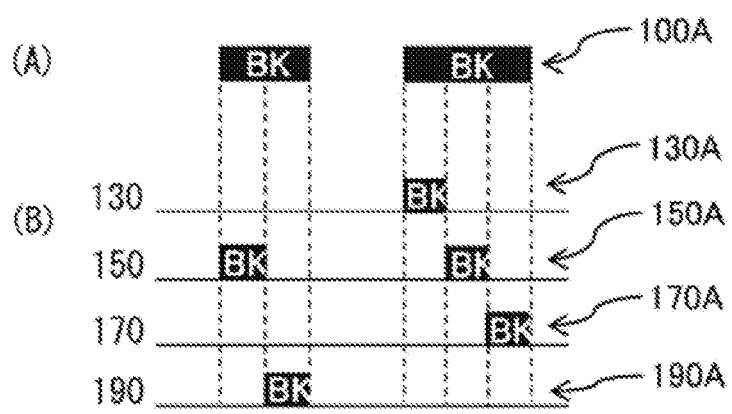
[ FIG. 7 ]
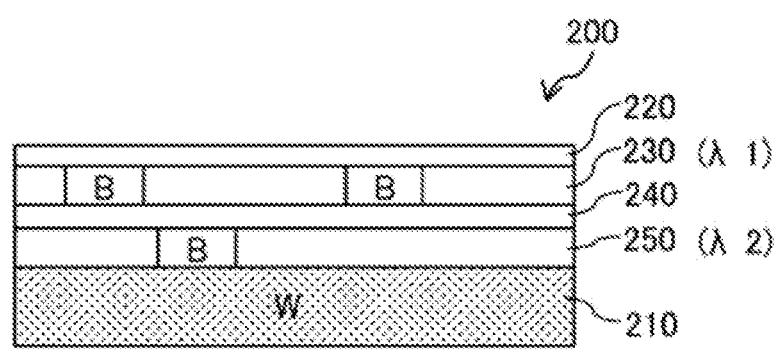

[ FIG. 8 ]
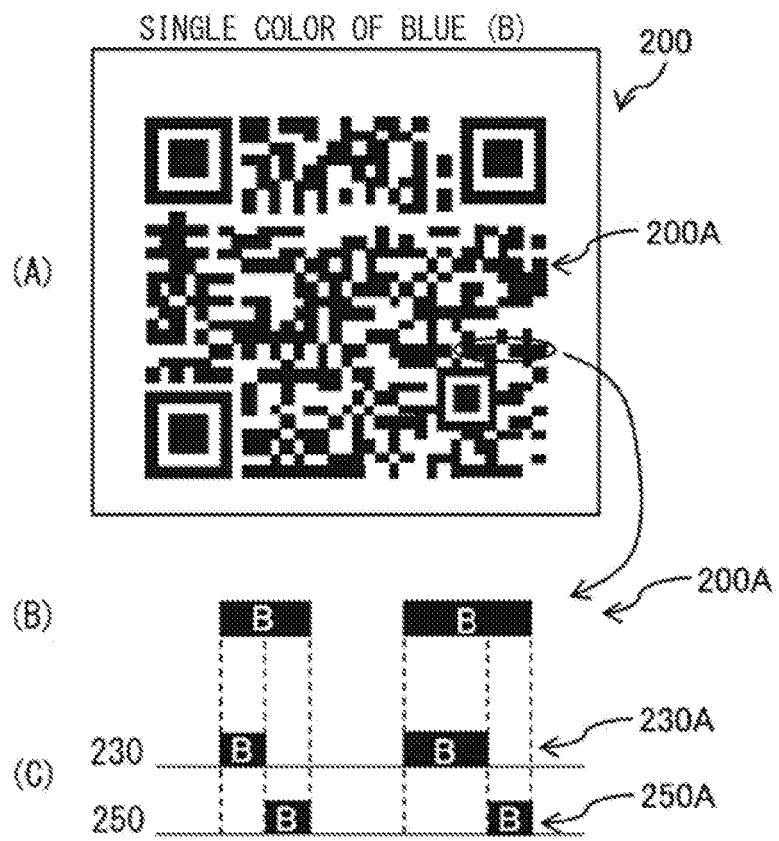
[ FIG. 9 ]
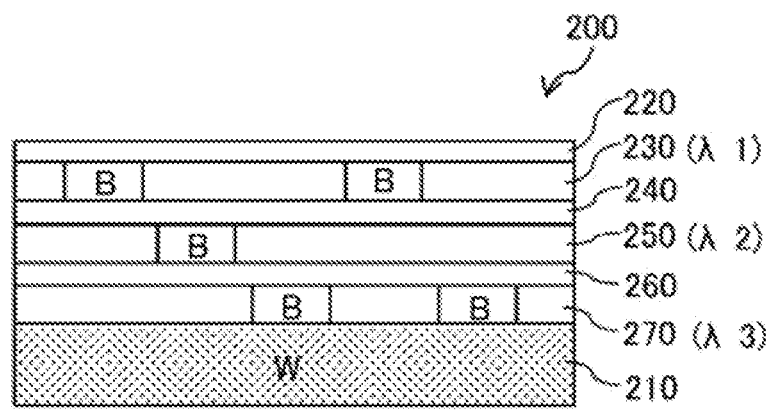

[FIG. 10]
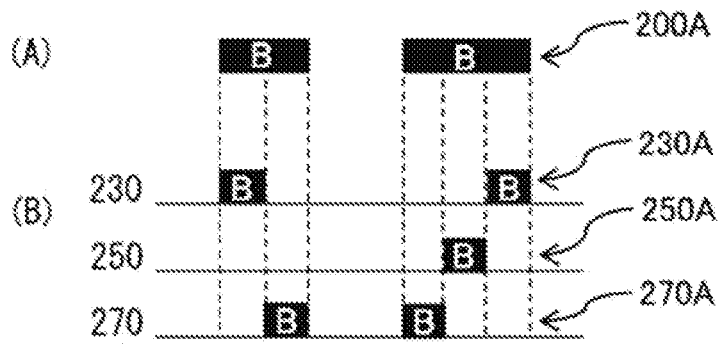
[FIG. 11]
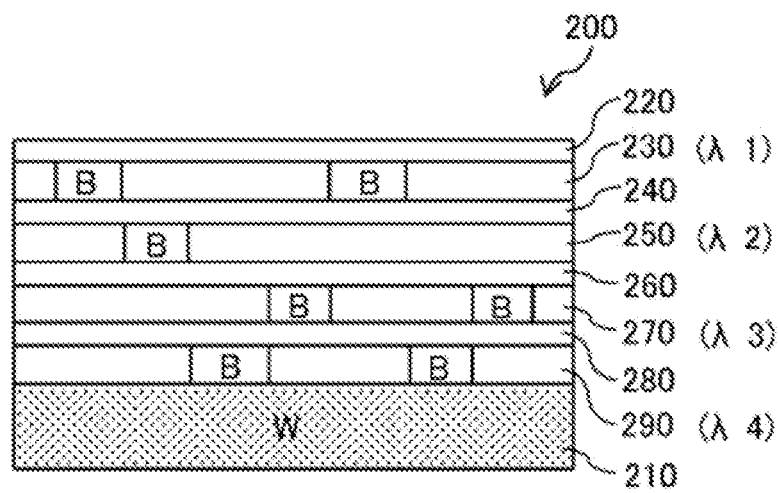
[FIG. 12]
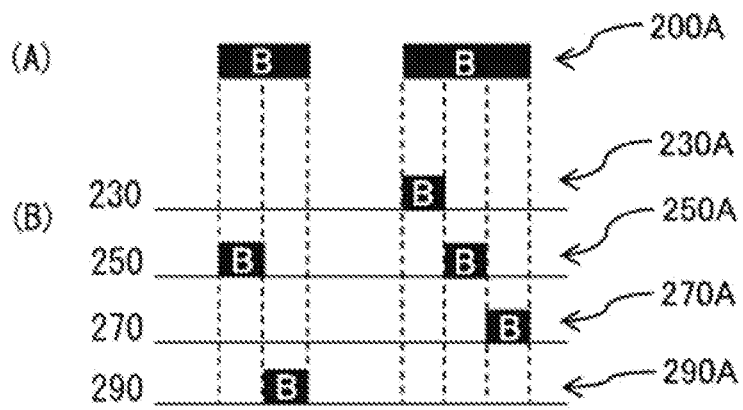

[ FIG. 13 ]
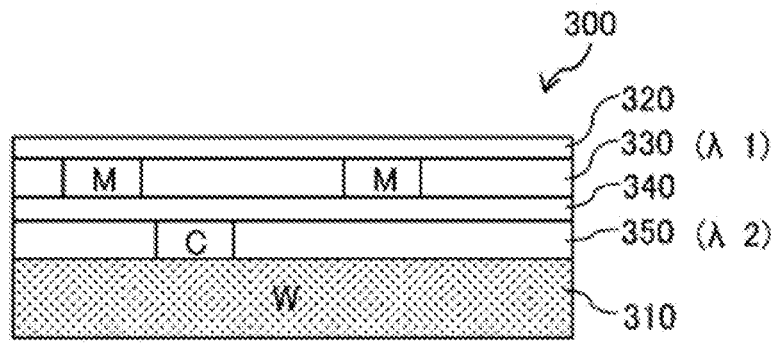
[ FIG. 14 ]
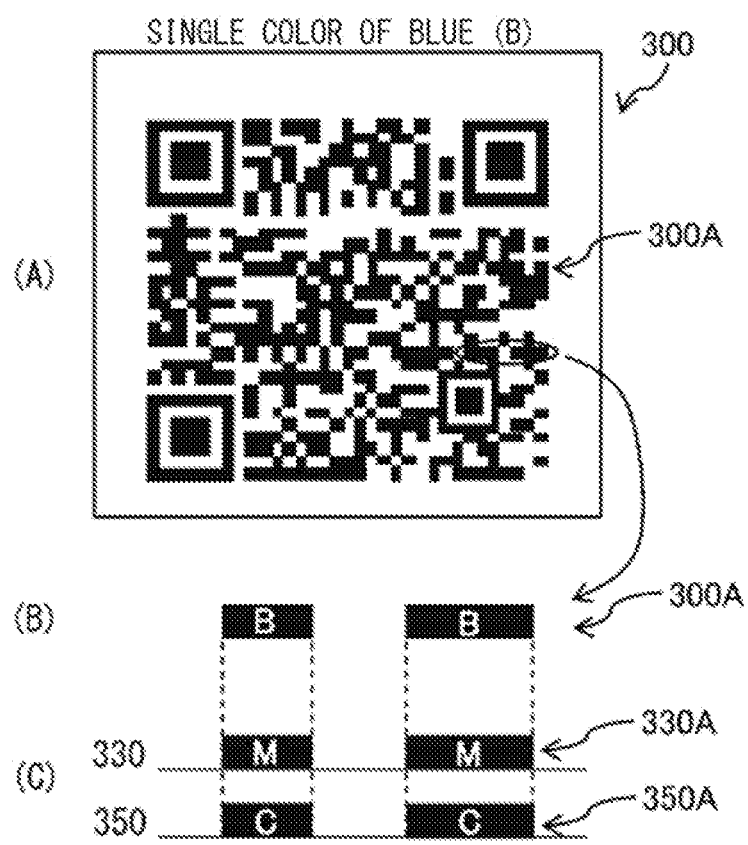

[ FIG. 15 ]
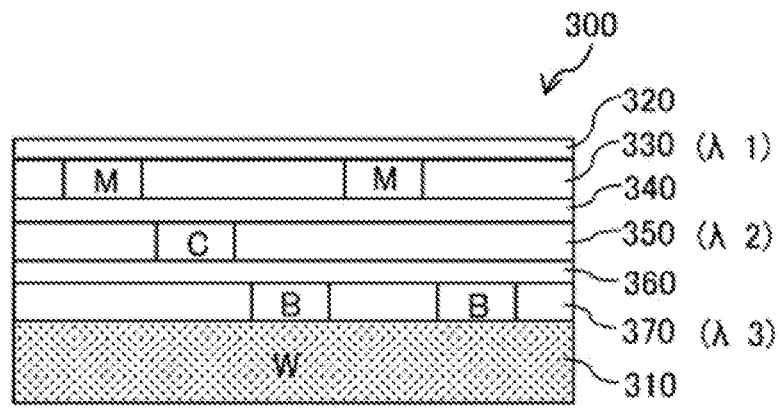
[ FIG. 16 ]
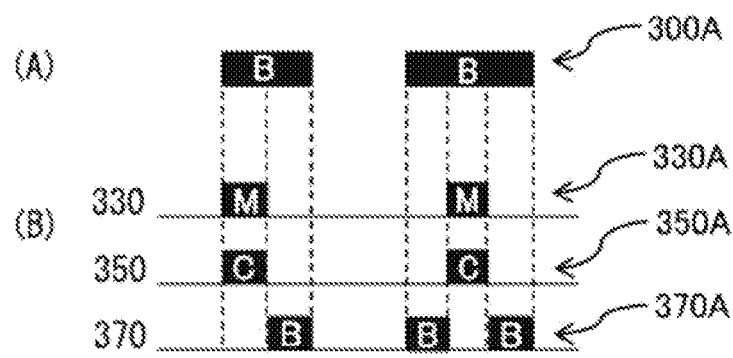
[ FIG. 17 ]
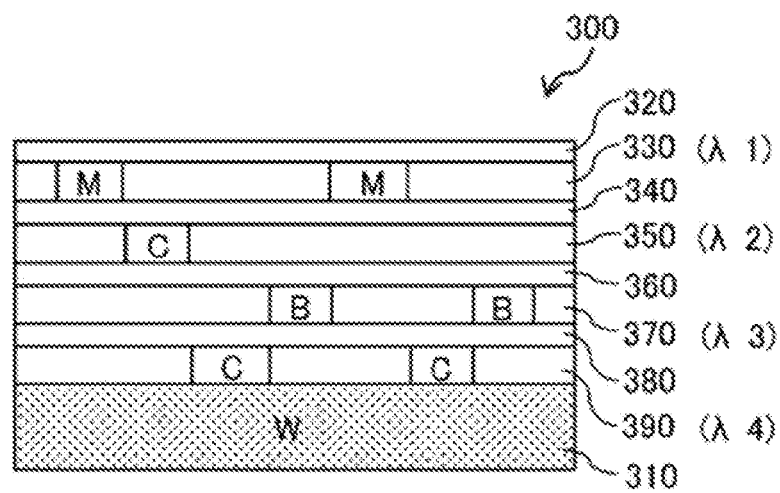

[ FIG. 18 ]
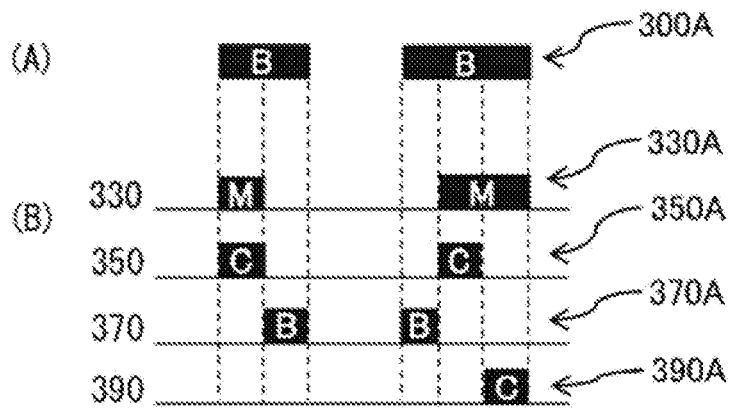
[ FIG. 19 ]
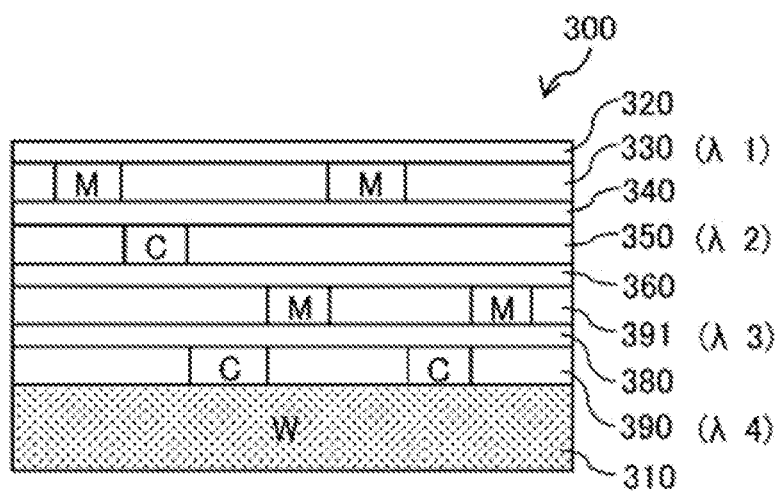
[ FIG. 20 ]
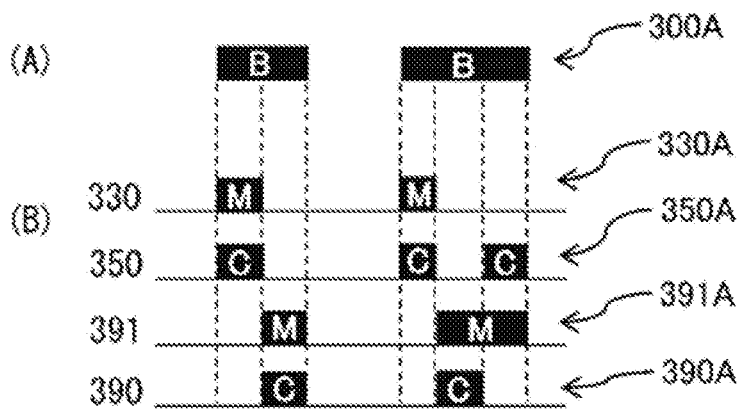

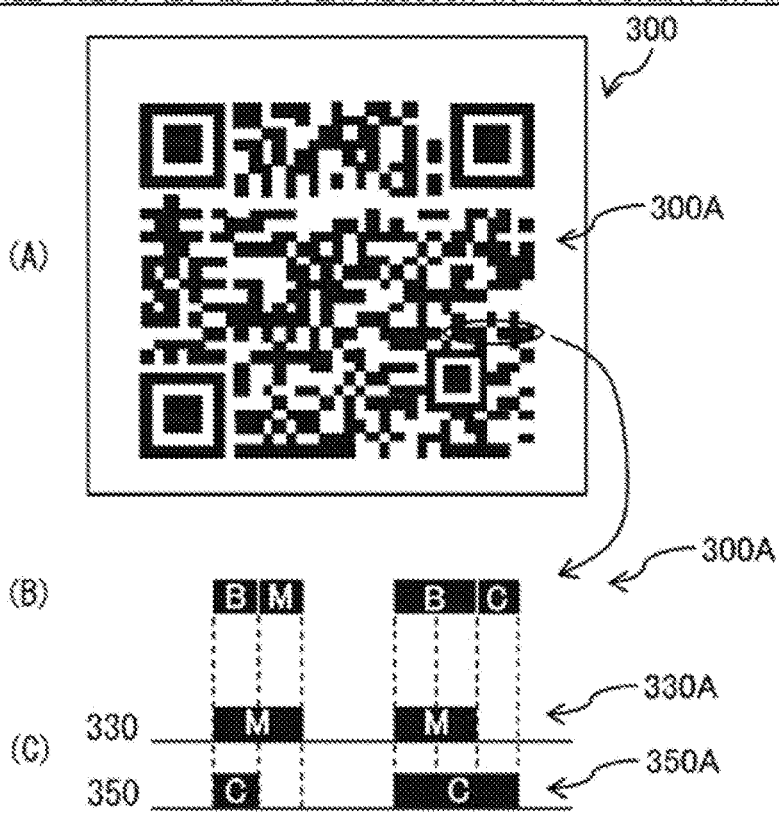

[FIG. 22]
THREE-COLOR (B, M, C) EXPRESSION WITH INFORMATION MEDIUM 300 IN FIG. 15
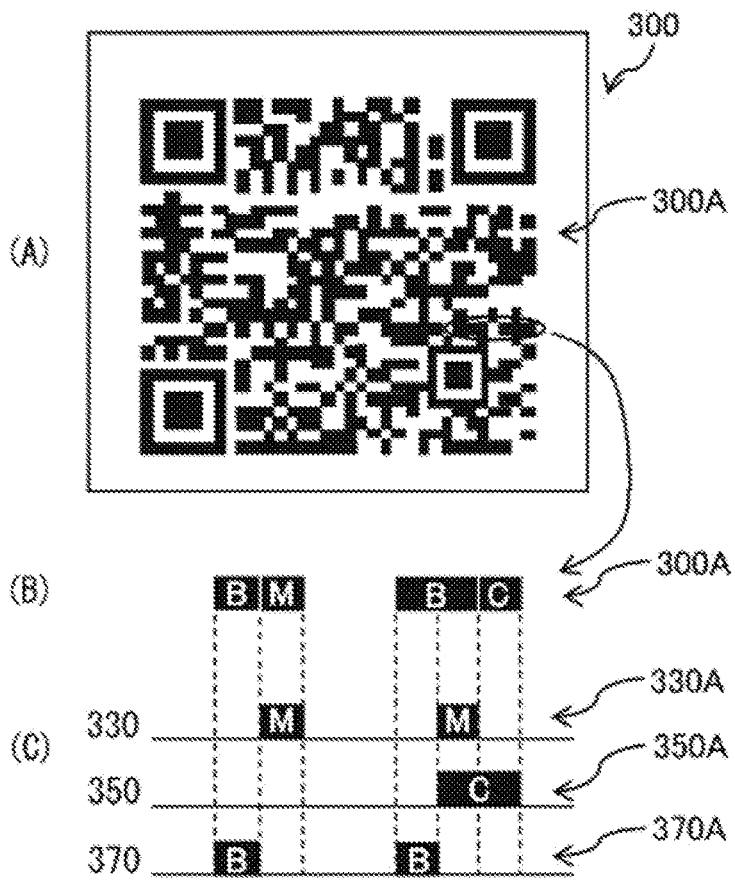

[FIG. 23]
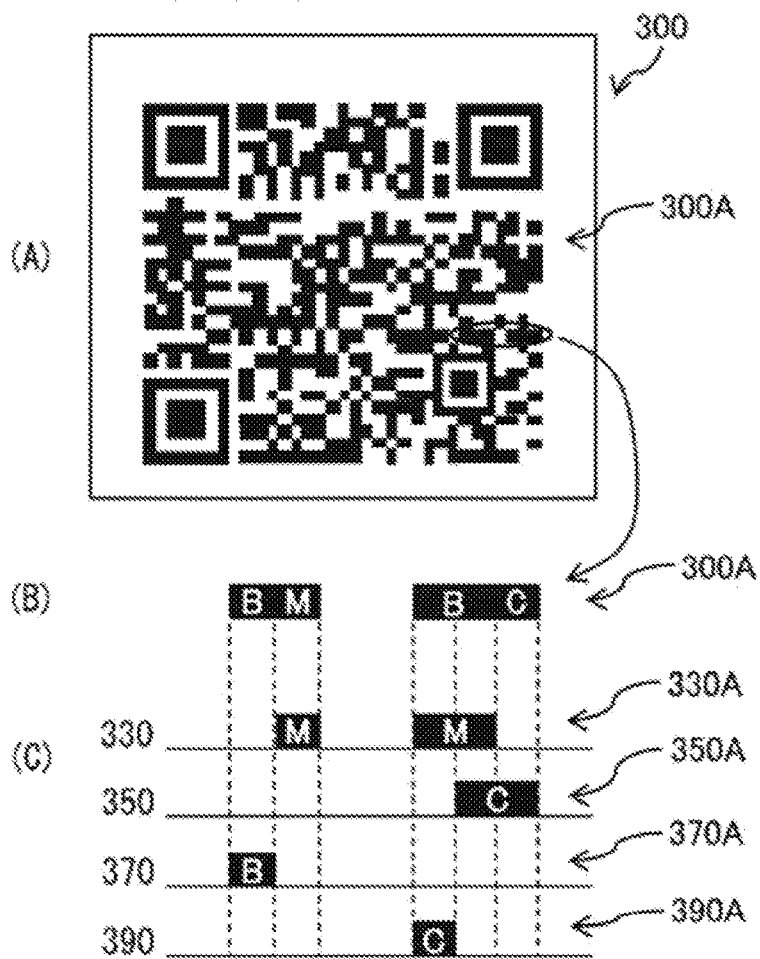

[ FIG. 24 ]
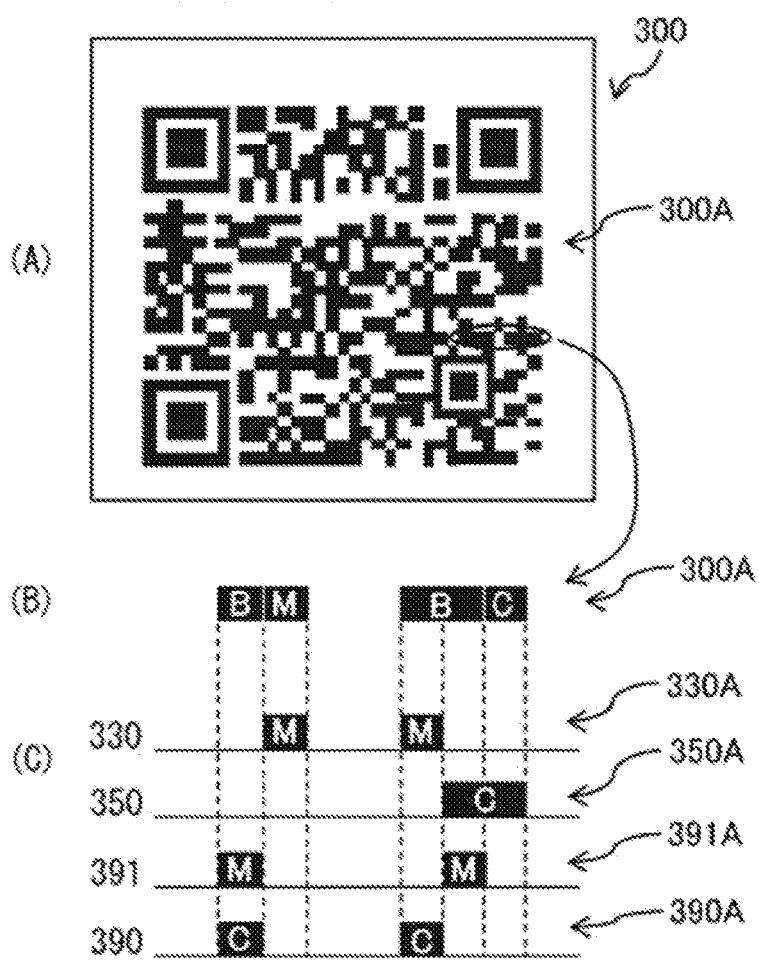

[FIG. 25]
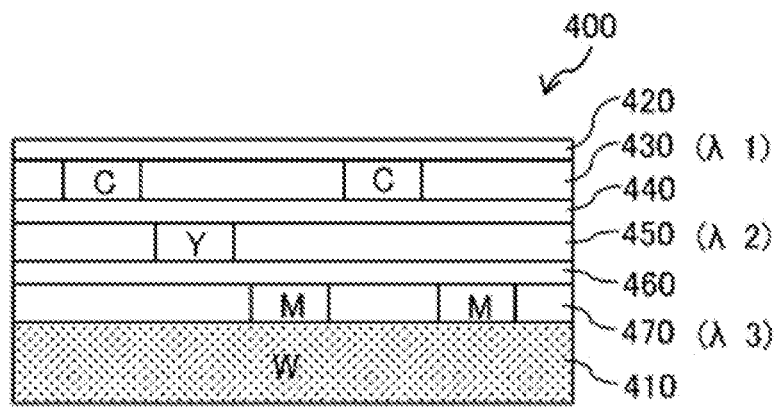
[FIG. 26]
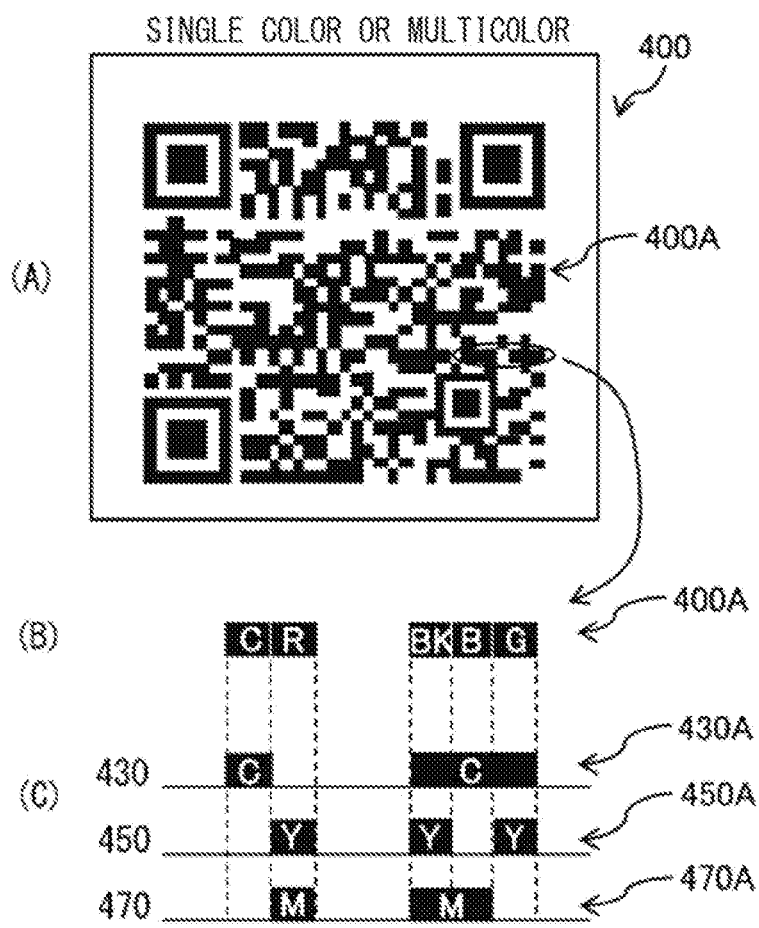

[ FIG. 27 ]
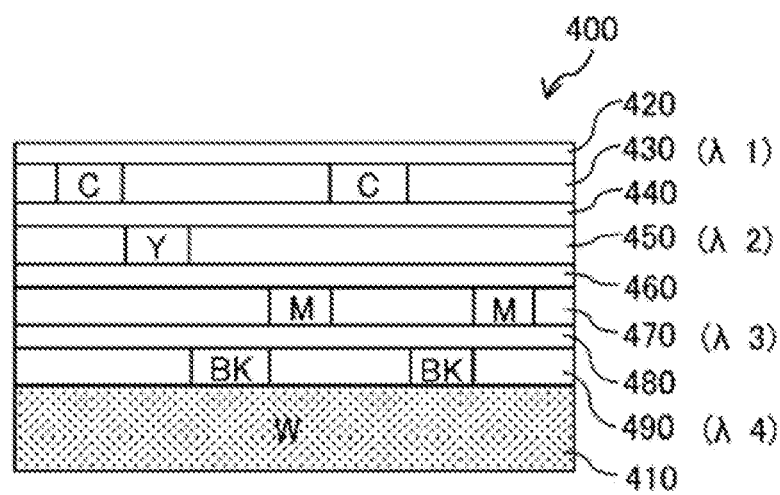
[ FIG. 28 ]
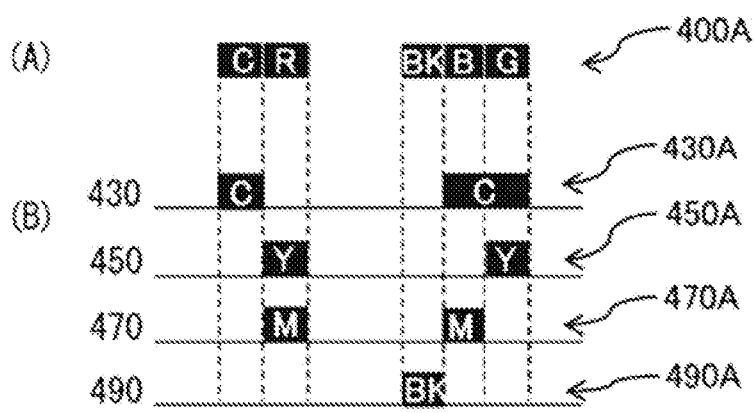

[ FIG. 29 ]
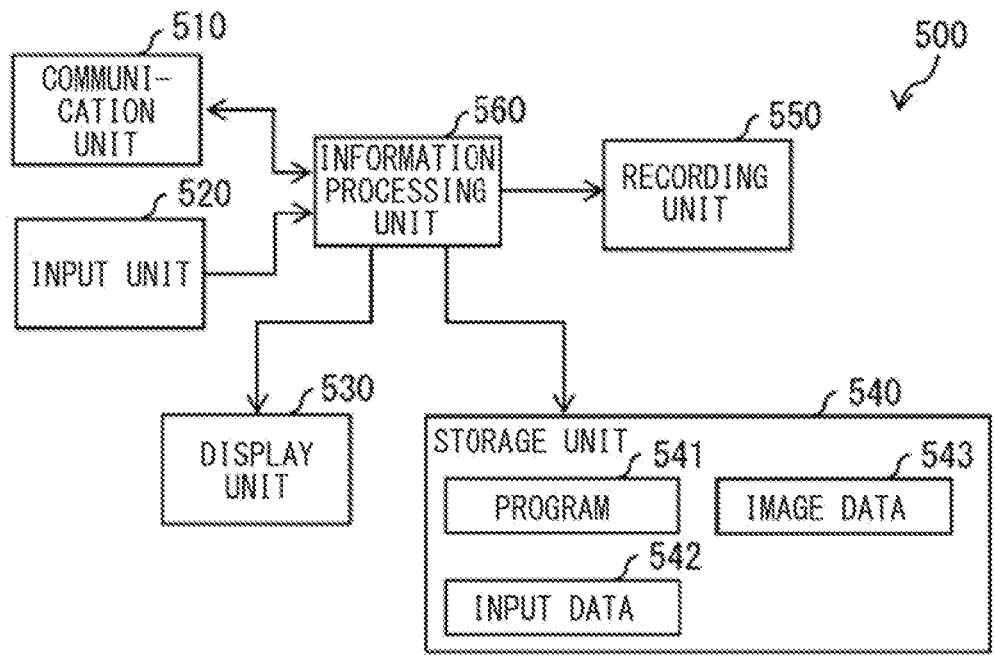
[ FIG. 30 ]
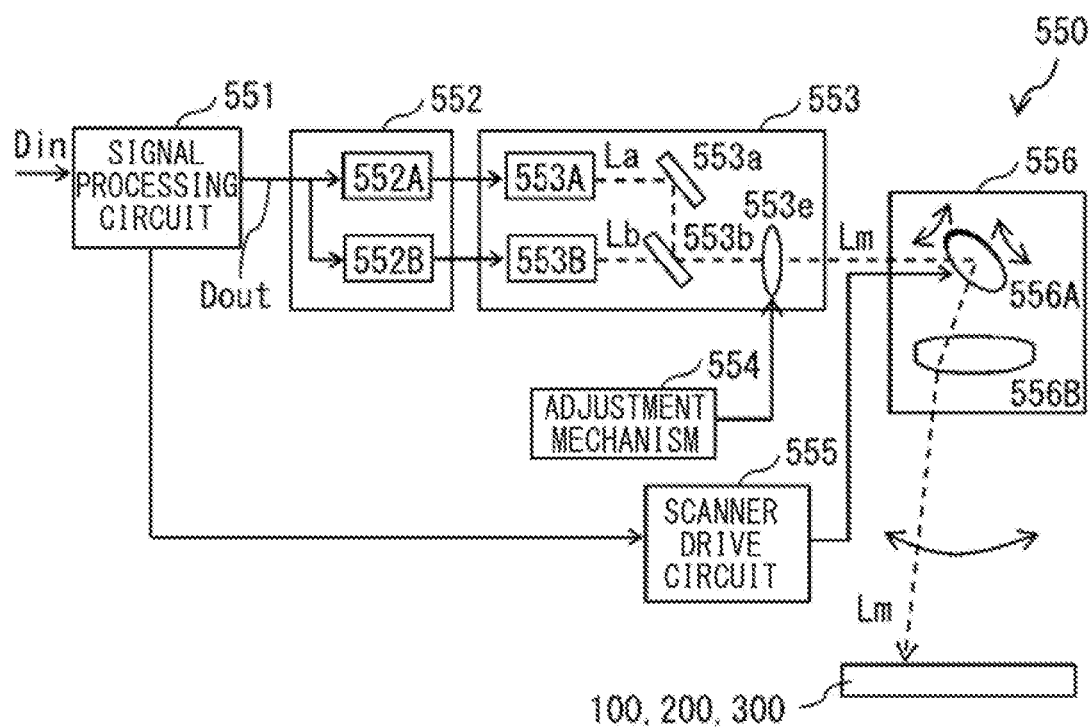

[ FIG. 31 ]
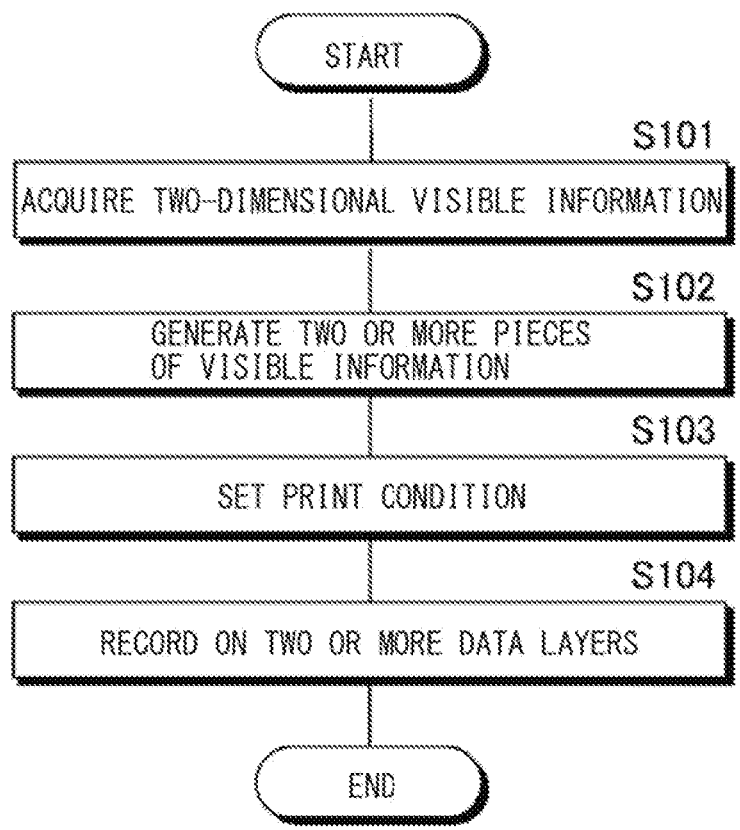
[ FIG. 32 ]
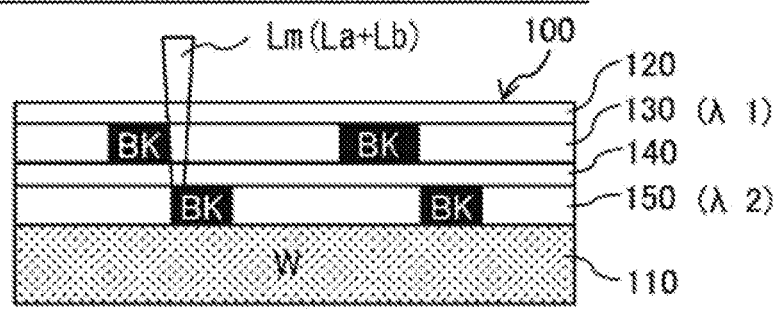

[FIG. 33]
WRITING ON INFORMATION MEDIUM 200 IN FIG. 7
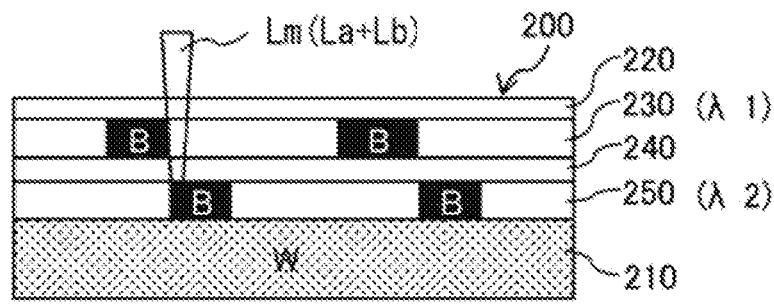
[FIG. 34]
WRITING ON INFORMATION MEDIUM 300 IN FIG. 13
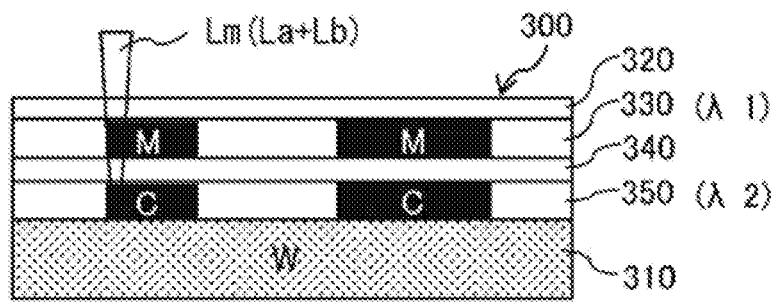
[FIG. 35]
WRITING ON INFORMATION MEDIUM 300 IN FIG. 21
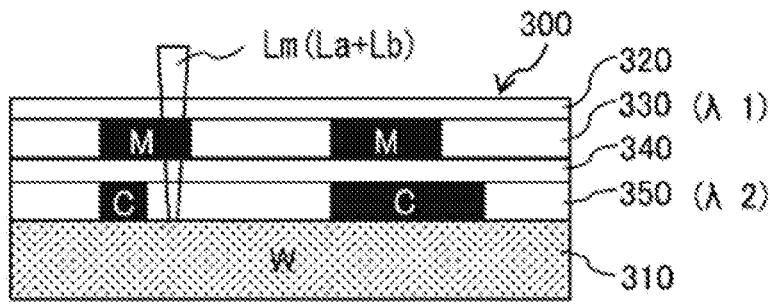

[FIG. 36]
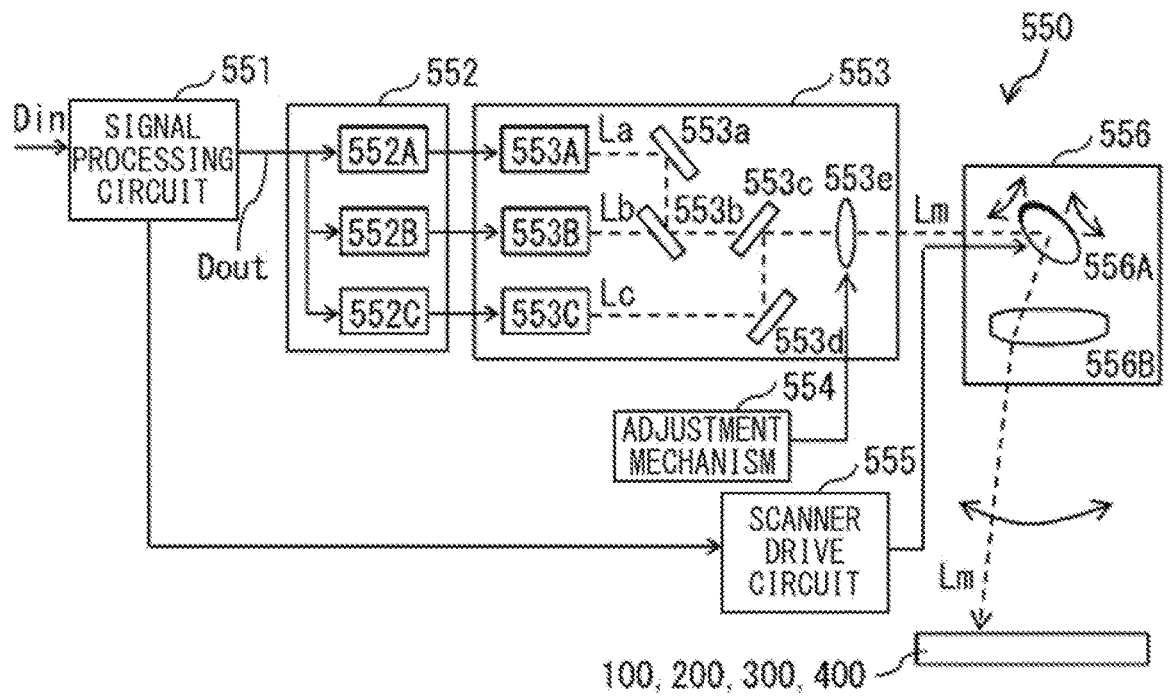
[FIG. 37]
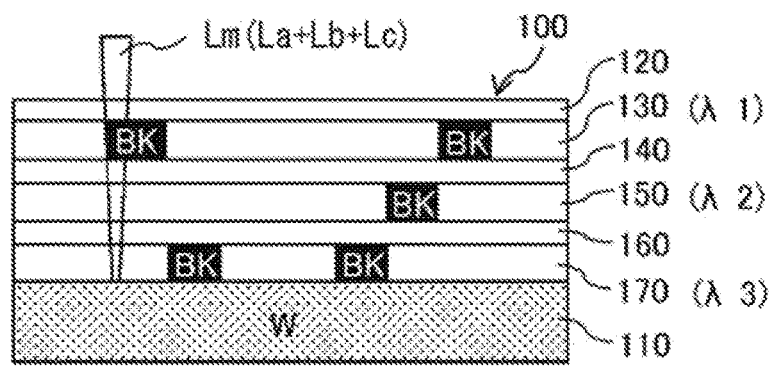

[FIG. 38]
WRITING ON INFORMATION MEDIUM 200 IN FIG. 9
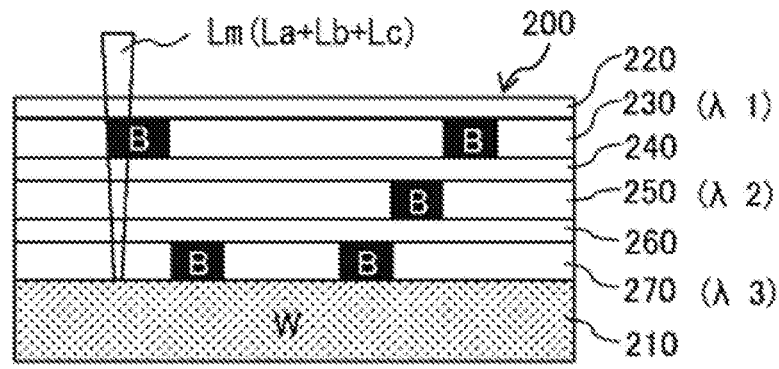
[FIG. 39]
WRITING ON INFORMATION MEDIUM 300 IN FIG. 15
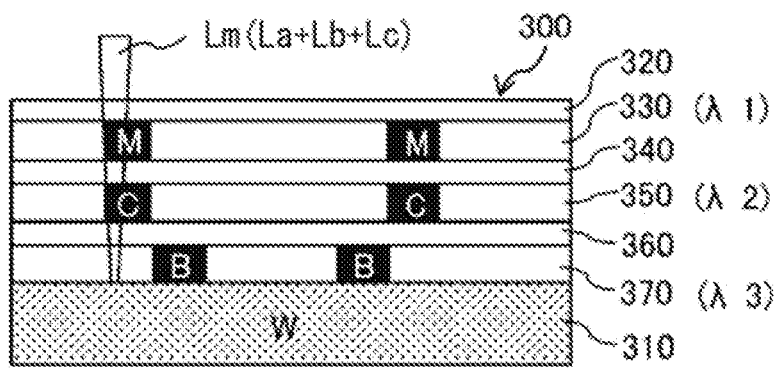
[FIG. 40]
WRITING ON INFORMATION MEDIUM 300 IN FIG. 22
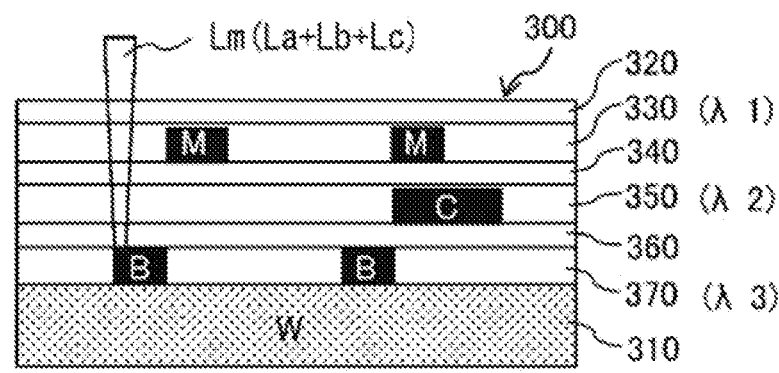

[FIG. 41]
WRITING ON INFORMATION MEDIUM 400 IN FIG. 25
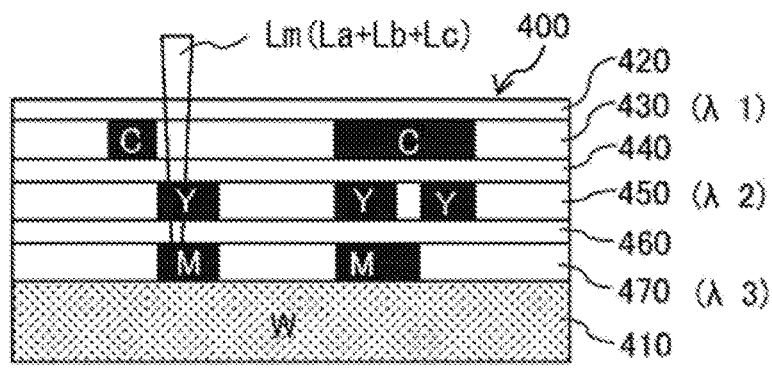
[FIG. 42]
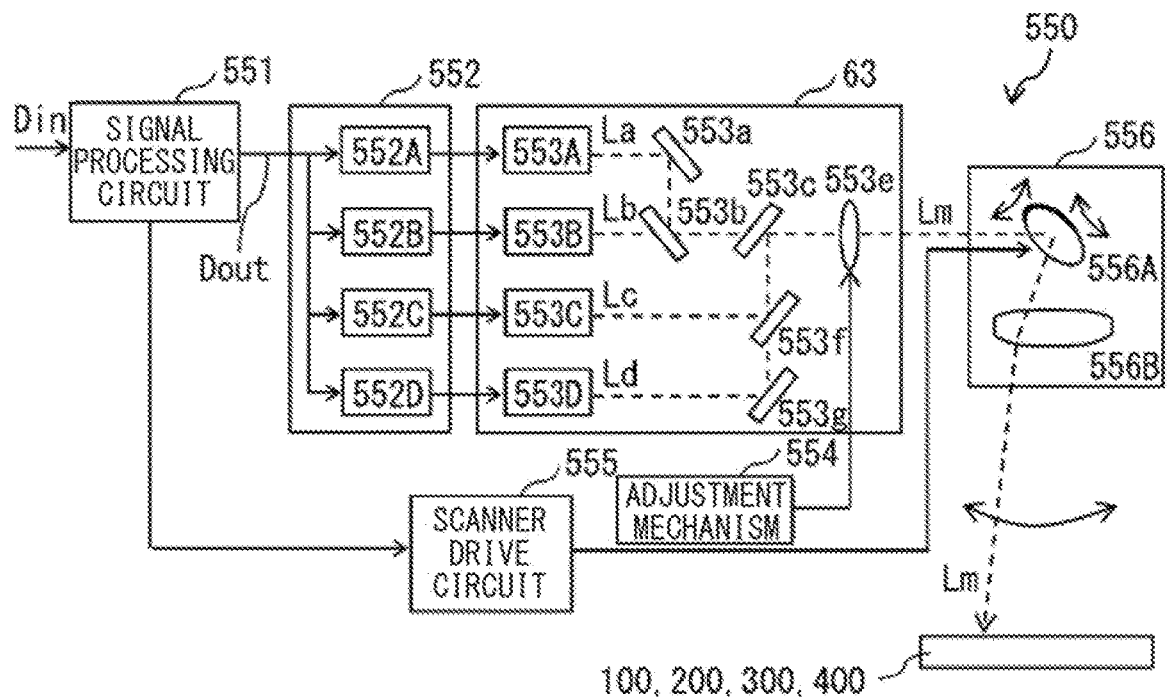

[FIG. 43]
WRITING ON INFORMATION MEDIUM 100 IN FIG. 5
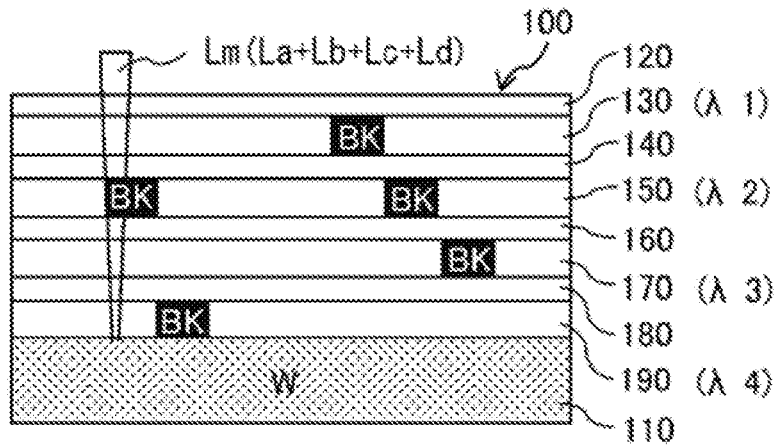
[FIG. 44]
WRITING ON INFORMATION MEDIUM 200 IN FIG. 11
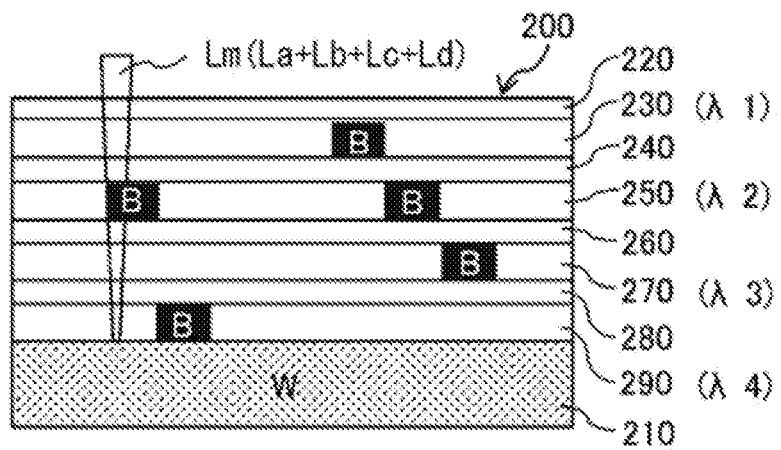
[FIG. 45]
WRITING ON INFORMATION MEDIUM 300 IN FIG. 17
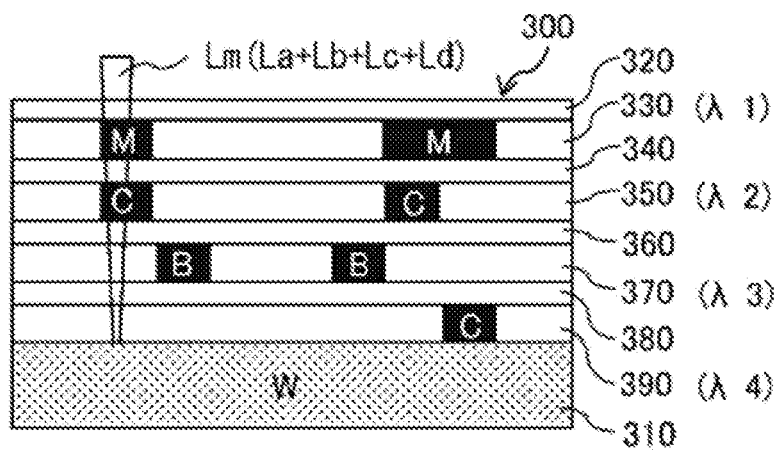

[FIG. 46]
WRITING ON INFORMATION MEDIUM 300 IN FIG. 19
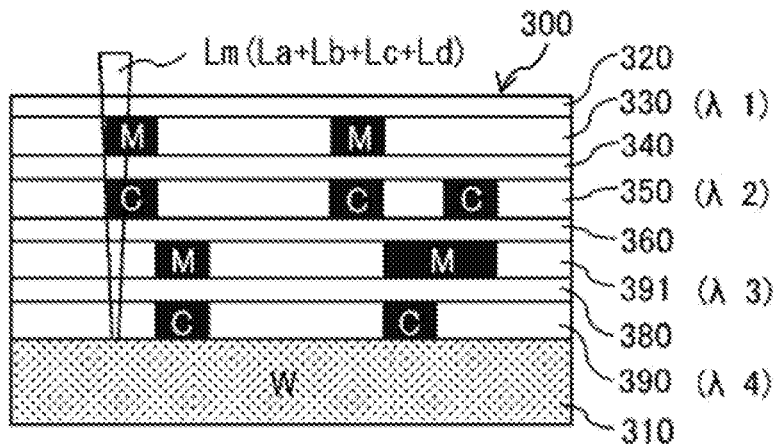
[FIG. 47]
WRITING ON INFORMATION MEDIUM 300 IN FIG. 23
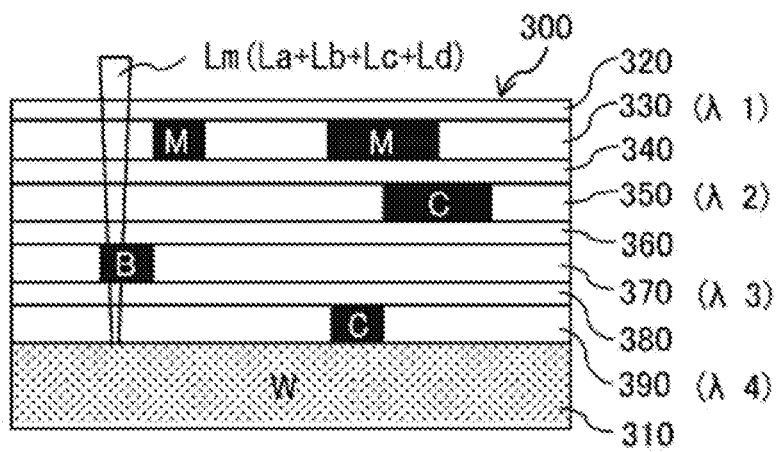
[FIG. 48]
WRITING ON INFORMATION MEDIUM 300 IN FIG. 24
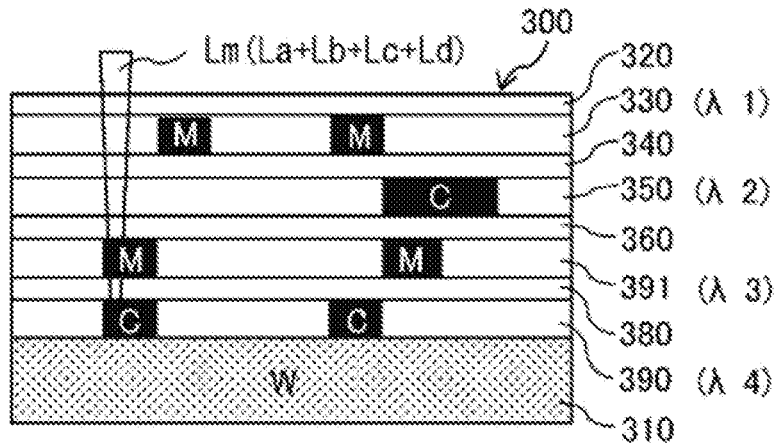

[ FIG. 49 ]
WRITING ON INFORMATION MEDIUM 400 IN FIG. 27
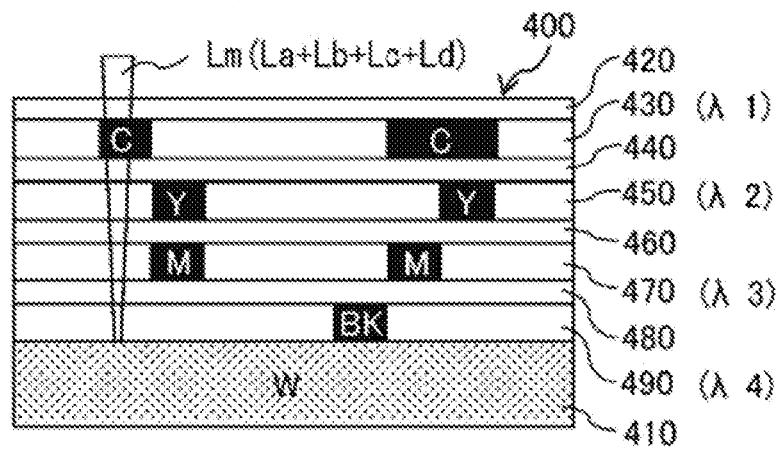
[ FIG. 50 ]
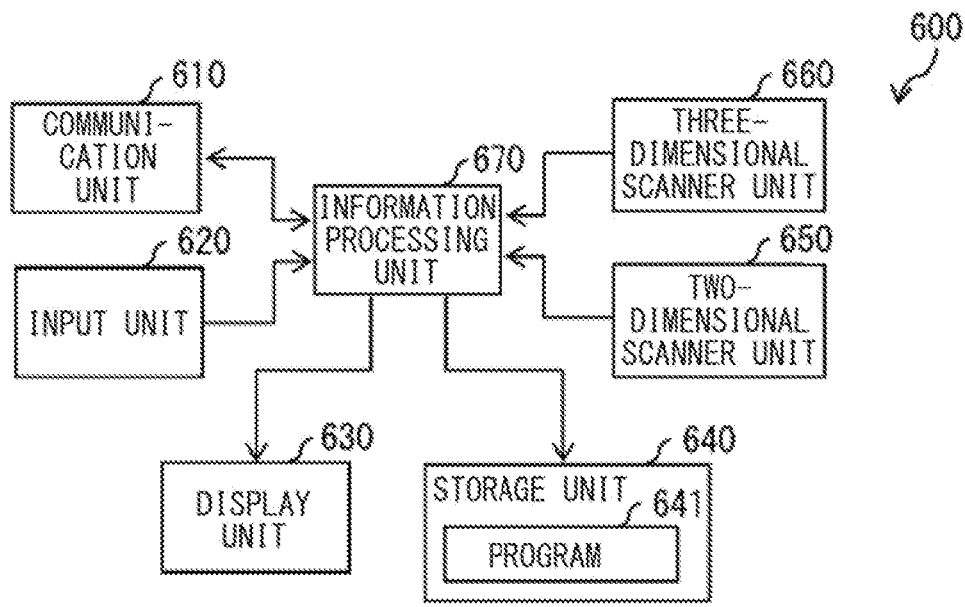

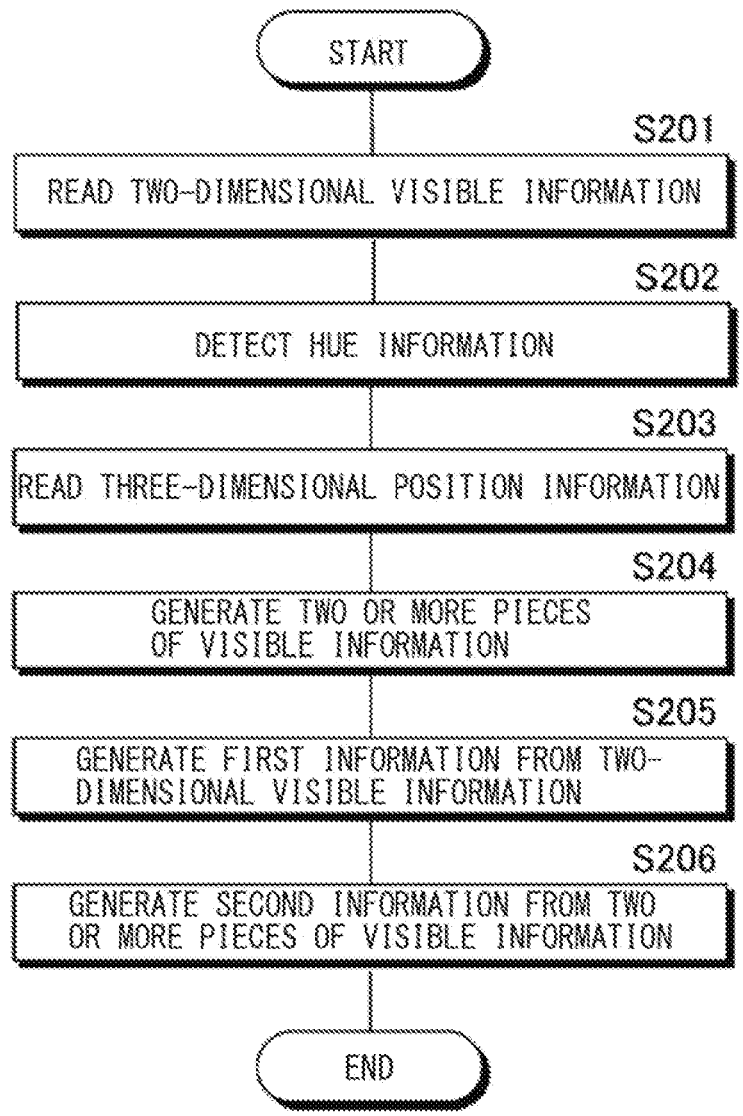

[ FIG. 52 ]
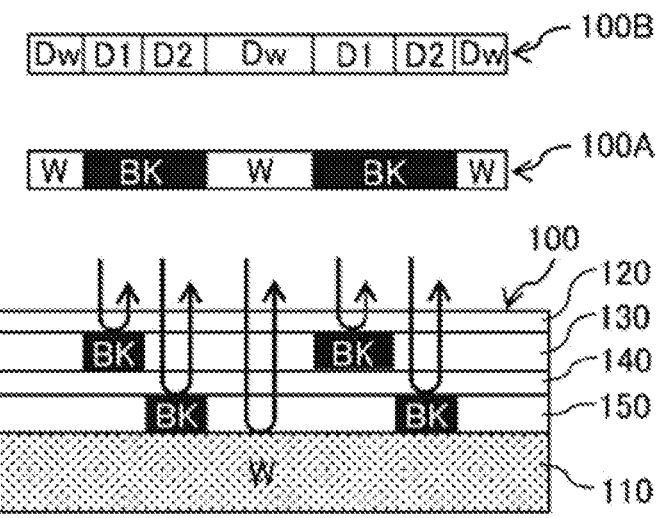
[ FIG. 53 ]
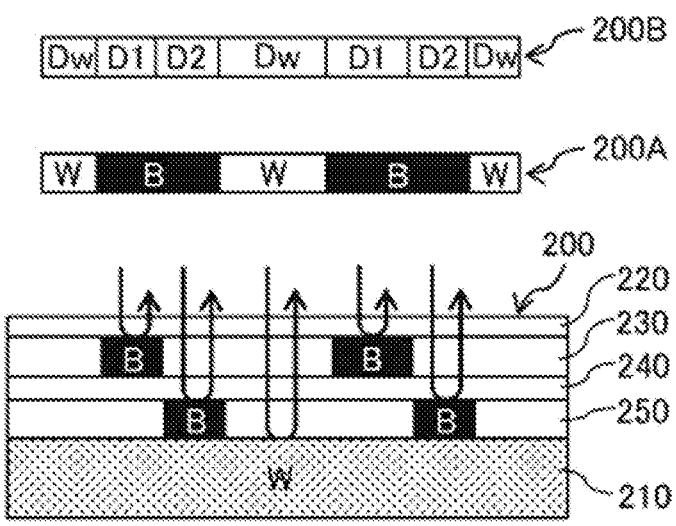

[ FIG. 54 ]
READING FROM INFORMATION MEDIUM 300 IN FIG. 13
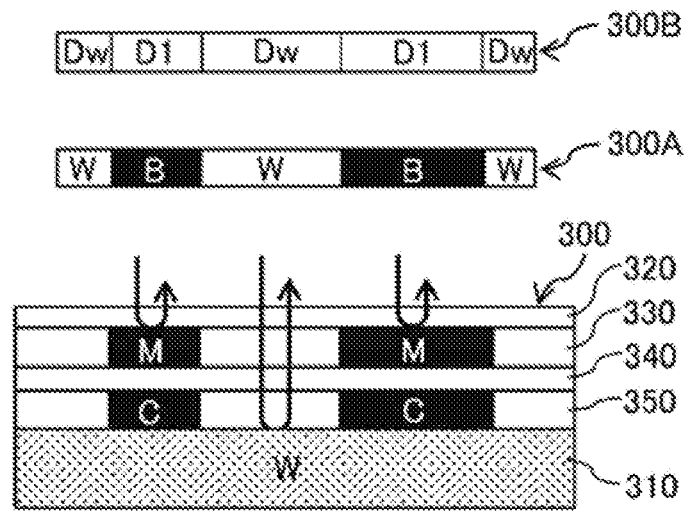
[ FIG. 55 ]
READING FROM INFORMATION MEDIUM 300 IN FIG. 21
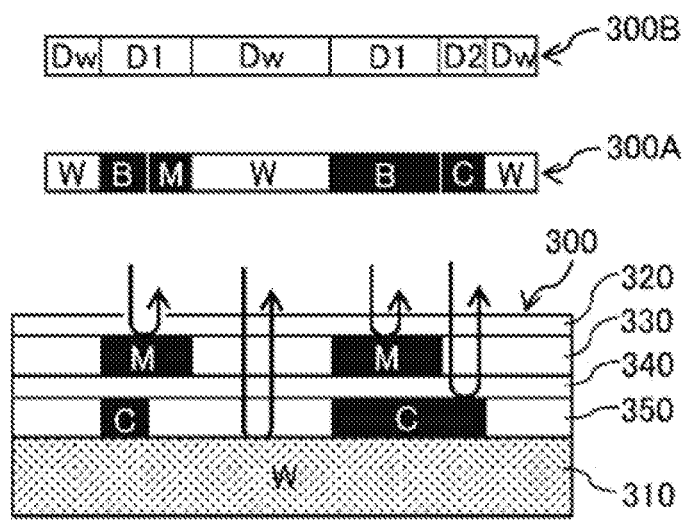

[ FIG. 56 ]
READING FROM INFORMATION MEDIUM 100 IN FIG. 3
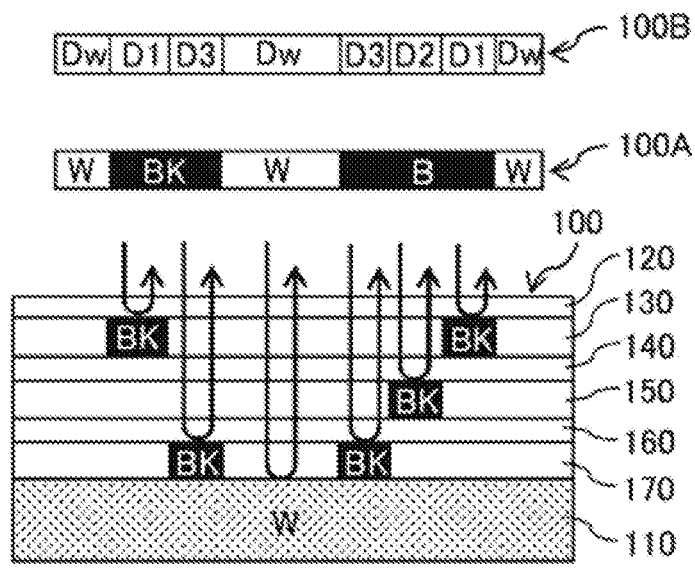
[ FIG. 57 ]
READING FROM INFORMATION MEDIUM 200 IN FIG. 9
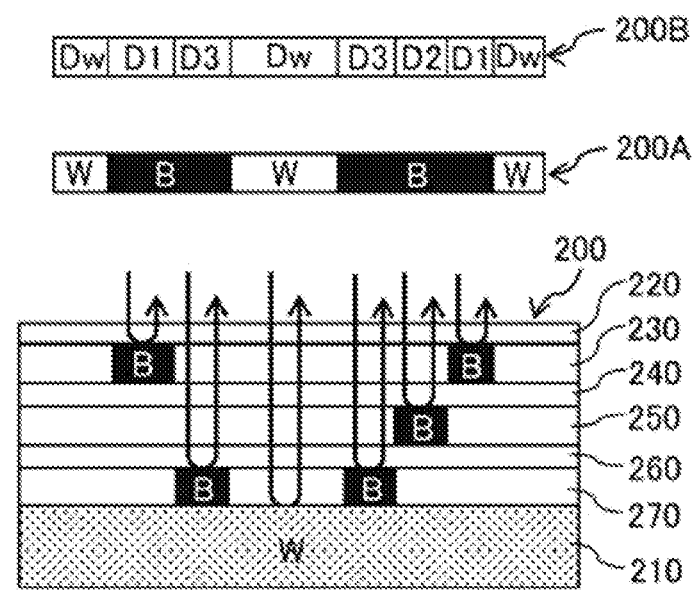

[ FIG. 58 ]
READING FROM INFORMATION MEDIUM 300 IN FIG. 15
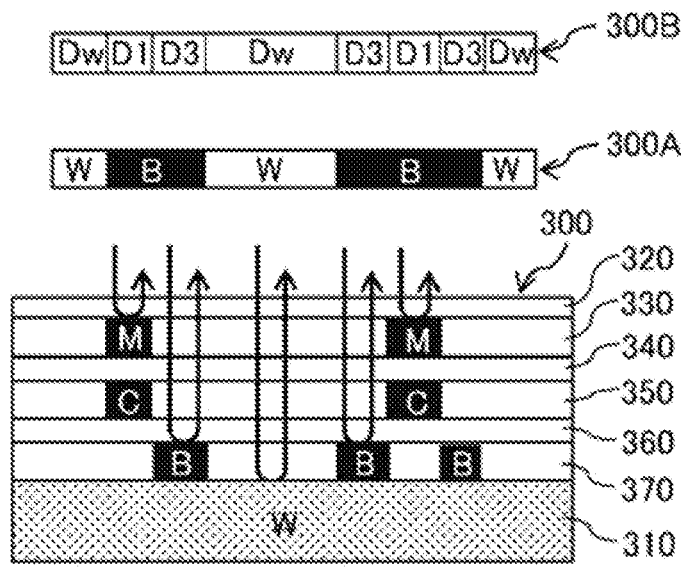
[ FIG. 59 ]
READING FROM INFORMATION MEDIUM 300 IN FIG. 22
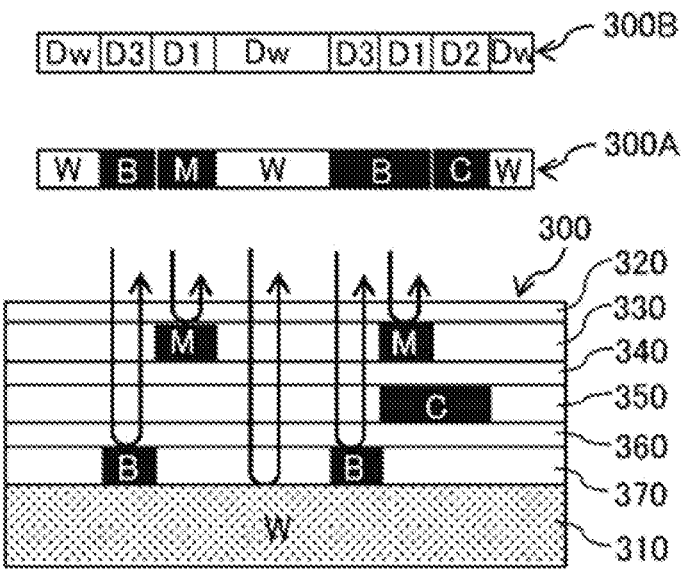

[FIG. 60]
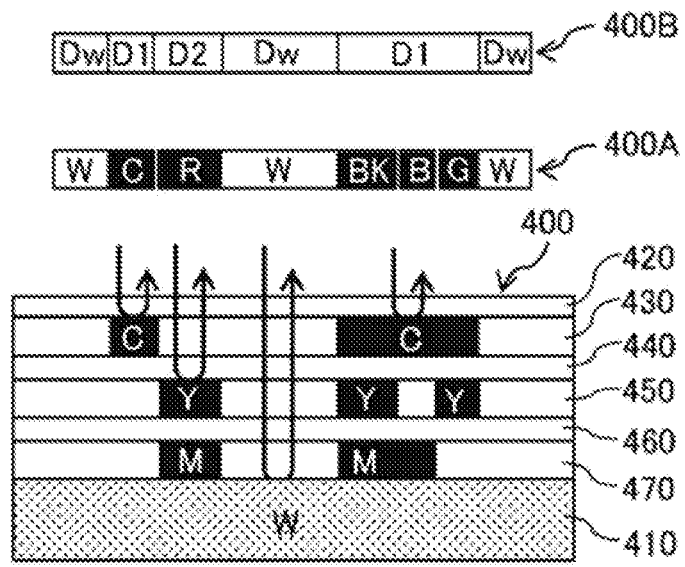
READING FROM INFORMATION MEDIUM 400 IN FIG. 25
[FIG. 61]
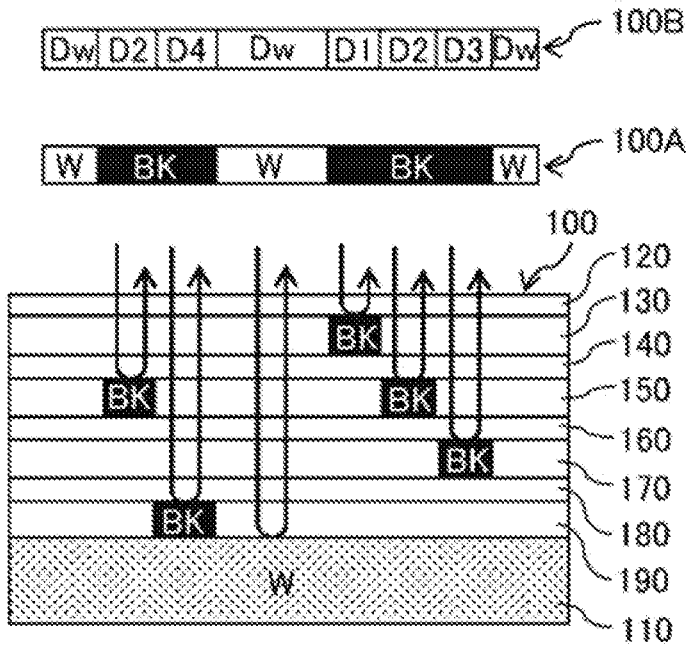
READING FROM INFORMATION MEDIUM 100 IN FIG. 5

[ FIG. 62 ]
READING FROM INFORMATION MEDIUM 200 IN FIG. 11
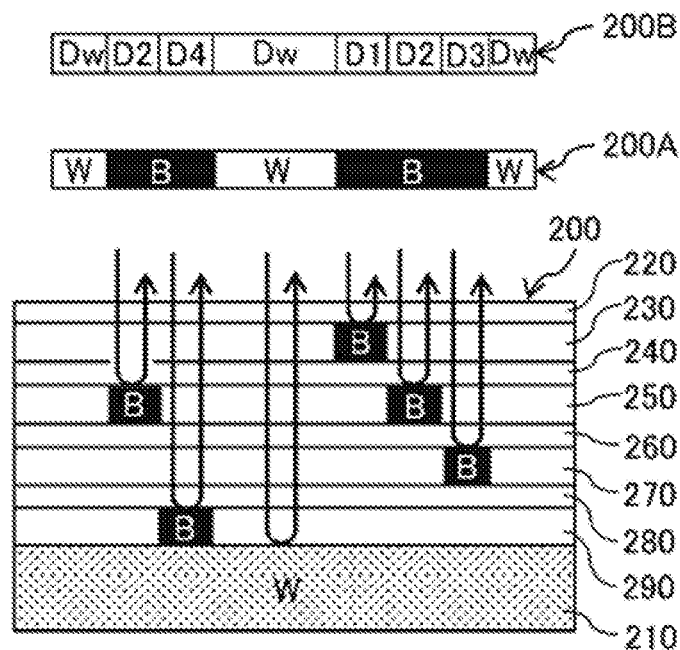
[ FIG. 63 ]
READING FROM INFORMATION MEDIUM 300 IN FIG. 17
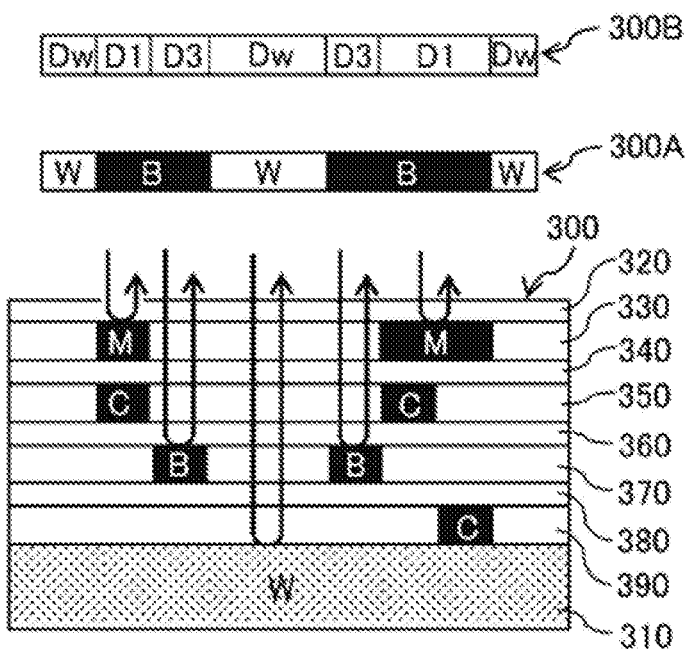

[ FIG. 64 ]
READING FROM INFORMATION MEDIUM 300 IN FIG. 19
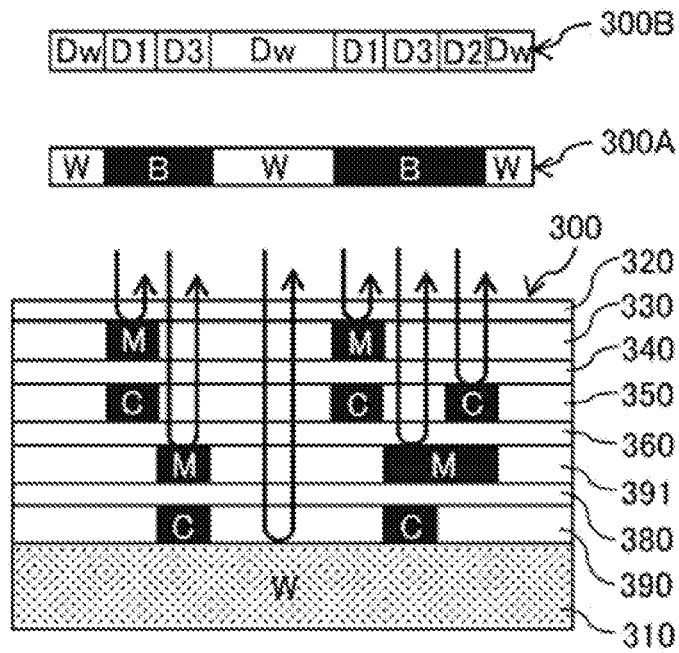
[ FIG. 65 ]
READING FROM INFORMATION MEDIUM 300 IN FIG. 23
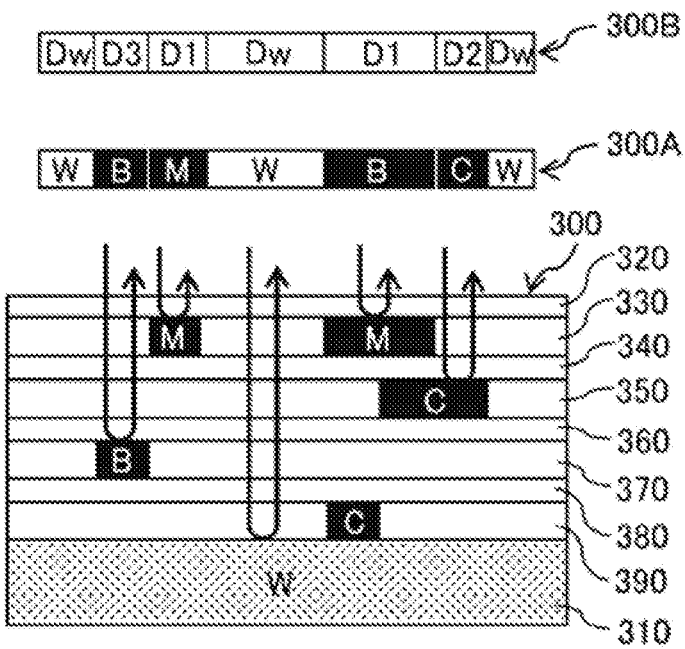

[ FIG. 66 ]
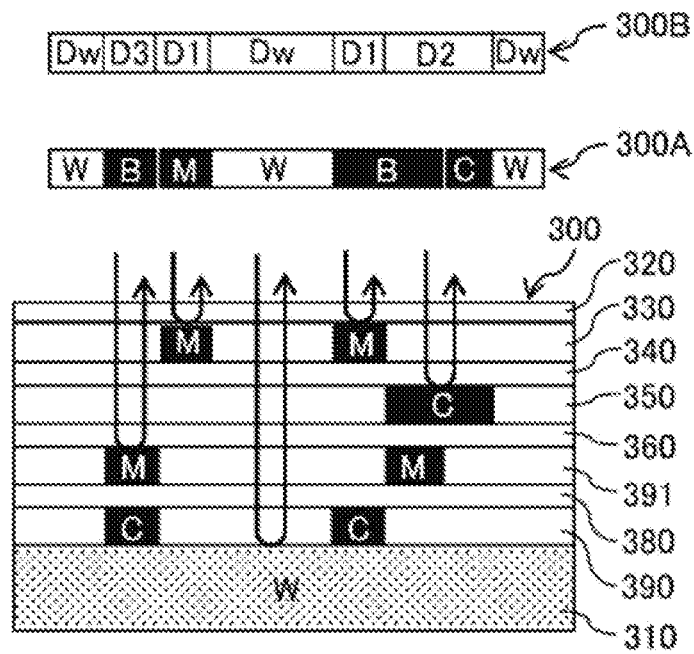
READING FROM INFORMATION MEDIUM 300 IN FIG. 24
[ FIG. 67 ]
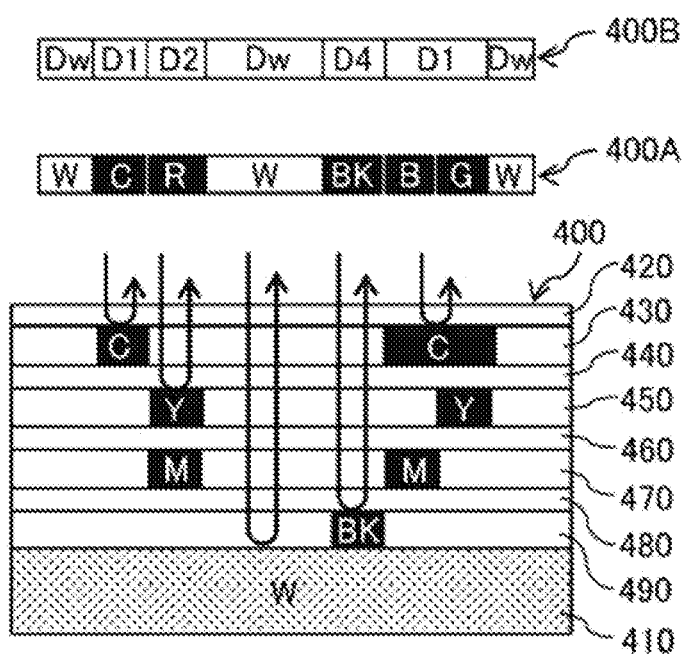
READING FROM INFORMATION MEDIUM 400 IN FIG. 27

[ FIG. 68 ]
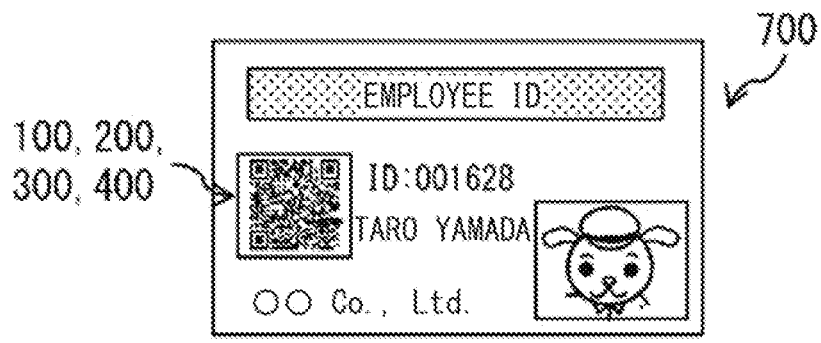
[ FIG. 69 ]

INFORMATION MEDIUM, RECORDING APPARATUS, AND READING APPARATUS

TECHNICAL FIELD

The present disclosure relates to an information medium, a recording apparatus, and a reading apparatus.

BACKGROUND ART

In recent years, two-dimensional information codes typified by a QR code (registered trademark) have been used in various fields including various types of payment, medical care, transportation, logistics, leisure, etc. Depending on the use, confidentiality is required, and a code displayed on a display device is increased in confidentiality, for example, by being changed every time. A code that has already been printed cannot be subjected to such a code change, therefore requiring, depending on the use, personal management of the code to prevent the code from being seen by others.

CITATION LIST

Patent Literature

PTL 1: Japanese Unexamined Patent Application Publication No. 2004-234318
PTL 2: International Publication No. WO07/010650

SUMMARY OF THE INVENTION

For example, take a paper wallet on which a private key of a virtual currency is printed, as an example. It has been pointed out that, if the private key is photographed by a camera of a smartphone or the like and a photographed image is printed, there is a risk of loss of an asset when the photographed image is used. As described above, the two-dimensional information code typified by the QR code (registered trademark) can be easily forged by photographing with a camera, a video camera, or the like, printing, or being displayed on a display device. Therefore, there is a need for a secure information medium difficult to forge.

Further, in the two-dimensional information code such as the QR code (registered trademark) described above, a code having a complicated pattern is recorded. However, it is printed in a limited region, and the image pattern is also limited. In order to increase this capacity (the image pattern), for example, there are proposed: a method of reducing the area of each cell forming the pattern and thereby increasing the number of cells; a method of using a color pattern such as a red pattern or a blue pattern in addition to an existing black-and-white pattern; and the like (see PTLs 1 and 2 described above). However, no countermeasures are taken from the viewpoint of forgery described above.

It is therefore desirable to provide an information medium difficult to forge. It is also desirable to provide: a recording apparatus that is able to record information on such an information medium; and a reading apparatus that is able to read information from such an information medium.

An information medium according to an embodiment of the present technology includes two or more data layers provided on a support base. The two or more data layers have two or more pieces of visible information recorded on the two or more data layers. The two or more pieces of visible information are obtained by decomposing two-dimensional visible information and thereby allowing synthesis of the two or more pieces of visible information to result in the two-dimensional visible information.

In the information medium according to the embodiment of the present disclosure, the two or more data layers have the two or more pieces of visible information recorded thereon. The two or more pieces of visible information are obtained by decomposing the two-dimensional visible information and thereby allowing synthesis of the two or more pieces of visible information to result in the two-dimensional visible information. Accordingly, when a usual reading apparatus is used, the usual reading apparatus can only read the two-dimensional visible information.

A recording apparatus according to an embodiment of the present disclosure is an apparatus that records information on an information medium. The information medium includes two or more data layers stacked on a support base. This recording apparatus includes a generating unit and a recording unit. The generating unit generates two or more pieces of visible information by decomposing two-dimensional visible information and thereby allowing synthesis of the two or more pieces of visible information to result in the two-dimensional visible information. The recording unit records, on the two or more data layers, the two or more pieces of visible information generated by the generating unit.

In the recording apparatus according to the embodiment of the present disclosure, the two or more pieces of visible information are recorded on the two or more data layers. The two or more pieces of visible information are obtained by decomposing the two-dimensional visible information and thereby allowing synthesis of the two or more pieces of visible information to result in the two-dimensional visible information. Accordingly, when a usual reading apparatus is used, the usual reading apparatus can only read the two-dimensional visible information.

A reading apparatus according to an embodiment of the present disclosure includes a first detecting unit and a generating unit. The first detecting unit detects, from an information medium in which two or more data layers are stacked on a support base and first visible information is recorded on each of the data layers, three-dimensional position information of the first visible information recorded on each of the data layers. The generating unit generates the first visible information, recorded on each of the data layers, on the basis of the three-dimensional position information detected by the first detecting unit.

In the reading apparatus according to the embodiment of the present disclosure, the three-dimensional position information of the first visible information recorded on each of the data layers is detected from the information medium, and the first visible information, recorded on each of the data layers, is generated on the basis of the detected three-dimensional position information. A usual reading apparatus is only able to detect the two-dimensional visible information which results from synthesis of the two or more pieces of first visible information recorded on the respective data layers. However, the reading apparatus according to the embodiment of the present disclosure is able to detect the first visible information recorded on each of the data layers by detecting the three-dimensional position information.

BRIEF DESCRIPTION OF THE DRAWINGS

FIG. 1 is a diagram illustrating an example of a cross-sectional configuration of an information medium according to a first embodiment of the present disclosure.

(A) of FIG. 2 is a diagram illustrating an example of a visible image that is visually recognized when the information medium in FIG. 1 is viewed from above. (B) of FIG. 2 is a diagram illustrating an enlarged part of (A) of FIG. 2. (C) of FIG. 2 is a diagram illustrating an example of a cross-sectional configuration of a part corresponding to (B) of FIG. 2 of the information medium in (A) of FIG. 2.

FIG. 3 is a diagram illustrating a modification of the cross-sectional configuration of the information medium in FIG. 1.

(A) of FIG. 4 is a diagram illustrating an enlarged part of a visible image that is visually recognized when the information medium in FIG. 3 is viewed from above. (B) of FIG. 4 is a diagram illustrating an example of a cross-sectional configuration of a part corresponding to (A) of FIG. 4 of the information medium in FIG. 3.

FIG. 5 is a diagram illustrating a modification of the cross-sectional configuration of the information medium in FIG. 1.

(A) of FIG. 6 is a diagram illustrating an enlarged part of the visible image that is visually recognized when the information medium in FIG. 5 is viewed from above. (B) of FIG. 6 is a diagram illustrating an example of a cross-sectional configuration of a part corresponding to (A) of FIG. 6 of the information medium in FIG. 5.

FIG. 7 is a diagram illustrating an example of a cross-sectional configuration of an information medium according to a second embodiment of the present disclosure.

(A) of FIG. 8 is a diagram illustrating an example of a visible image that is visually recognized when the information medium in FIG. 7 is viewed from above. (B) of FIG. 8 is a diagram illustrating an enlarged part of (A) of FIG. 8. (C) of FIG. 8 is a diagram illustrating an example of a cross-sectional configuration of a part corresponding to (B) of FIG. 8 of the information medium in (A) of FIG. 8.

FIG. 9 is a diagram illustrating a modification of a cross-sectional configuration of the information medium in FIG. 7.

(A) of FIG. 10 is a diagram illustrating an enlarged part of the visible image that is visually recognized when the information medium in FIG. 9 is viewed from above. (B) of FIG. 10 is a diagram illustrating an example of a cross-sectional configuration of a part corresponding to (A) of FIG. 10 of the information medium in FIG. 9.

FIG. 11 is a diagram illustrating a modification of the cross-sectional configuration of the information medium in FIG. 7.

(A) of FIG. 12 is a diagram illustrating an enlarged part of the visible image that is visually recognized when the information medium in FIG. 11 is viewed from above. (B) of FIG. 12 is a diagram illustrating an example of a cross-sectional configuration of a part corresponding to (A) of FIG. 12 of the information medium in FIG. 11.

FIG. 13 is a diagram illustrating an example of a cross-sectional configuration of an information medium according to a third embodiment of the present disclosure.

(A) of FIG. 14 is a diagram illustrating an example of a visible image that is visually recognized when the information medium in FIG. 13 is viewed from above. (B) of FIG. 14 is a diagram illustrating an enlarged part of (A) of FIG. 14. (C) of FIG. 14 is a diagram illustrating an example of a cross-sectional configuration of a part corresponding to (B) of FIG. 14 of the information medium in (A) of FIG. 14.

FIG. 15 is a diagram illustrating a modification of the cross-sectional configuration of the information medium in FIG. 13.

(A) of FIG. 16 is a diagram illustrating an enlarged part of the visible image that is visually recognized when the information medium in FIG. 15 is viewed from above. (B) of FIG. 16 is a diagram illustrating a cross-sectional configuration of a part corresponding to (A) of FIG. 16 of the information medium in FIG. 15.

FIG. 17 is a diagram illustrating a modification of the cross-sectional configuration of the information medium in FIG. 13.

(A) of FIG. 18 is a diagram illustrating an enlarged part of the visible image that is visually recognized when the information medium in FIG. 17 is viewed from above. (B) of FIG. 18 is a diagram illustrating an example of a cross-sectional configuration of a part corresponding to (A) of FIG. 18 of the information medium in FIG. 17.

FIG. 19 is a diagram illustrating a modification of the cross-sectional configuration of the information medium in FIG. 13.

(A) of FIG. 20 is a diagram illustrating an enlarged part of the visible image that is visually recognized when the information medium in FIG. 19 is viewed from above. (B) of FIG. 20 is a diagram illustrating an example of a cross-sectional configuration of a part corresponding to (A) of FIG. 20 of the information medium in FIG. 19.

(A) of FIG. 21 is a diagram illustrating an example of a visible image that is visually recognized when the information medium in FIG. 13 is viewed from above. (B) of FIG. 21 is a diagram illustrating an enlarged part of (A) of FIG. 21. (C) of FIG. 21 is a diagram illustrating an example of a cross-sectional configuration of a part corresponding to (B) of FIG. 21 of the information medium in (A) of FIG. 21.

(A) of FIG. 22 is a diagram illustrating an example of a visible image that is visually recognized when the information medium in FIG. 15 is viewed from above. (B) of FIG. 22 is a diagram illustrating an enlarged part of (A) of FIG. 22. (C) of FIG. 22 is a diagram illustrating an example of a cross-sectional configuration of a part corresponding to (B) of FIG. 22 of the information medium in (A) of FIG. 22.

(A) of FIG. 23 is a diagram illustrating an example of a visible image that is visually recognized when the information medium in FIG. 17 is viewed from above. (B) of FIG. 23 is a diagram illustrating an enlarged part of (A) of FIG. 23. (C) of FIG. 23 is a diagram illustrating an example of a cross-sectional configuration of a part corresponding to (B) of FIG. 23 of the information medium in (A) of FIG. 23.

(A) of FIG. 24 is a diagram illustrating an example of a visible image that is visually recognized when the information medium in FIG. 19 is viewed from above. (B) of FIG. 24 is a diagram illustrating an enlarged part of (A) of FIG. 24. (C) of FIG. 24 is a diagram illustrating an example of a cross-sectional configuration of a part corresponding to (B) of FIG. 24 of the information medium in (A) of FIG. 24.

FIG. 25 is a diagram illustrating an example of a cross-sectional configuration of an information medium according to a fourth embodiment of the present disclosure.

(A) of FIG. 26 is a diagram illustrating an example of a visible image that is visually recognized when the information medium in FIG. 25 is viewed from above. (B) of FIG. 26 is a diagram illustrating an enlarged part of (A) of FIG. 26. (C) of FIG. 26 is a diagram illustrating an example of a cross-sectional configuration of a part corresponding to (B) of FIG. 26 of the information medium in (A) of FIG. 26.

FIG. 27 is a diagram illustrating a modification of the cross-sectional configuration of the information medium in FIG. 26.

(A) of FIG. 28 is a diagram illustrating an enlarged part of the visible image that is visually recognized when the information medium in FIG. 27 is viewed from above. (B) of FIG. 28 is a diagram illustrating an example of a cross-sectional configuration of a part corresponding to (A) of FIG. 28 of the information medium in FIG. 27.

FIG. 29 is a diagram illustrating an example of a schematic configuration of a recording apparatus according to an embodiment of the present disclosure.

FIG. 30 is a diagram illustrating an example of a schematic configuration of a recording unit in FIG. 29.

FIG. 31 is a diagram illustrating an example of a procedure for recording information on the information medium, in the recording apparatus in FIG. 29.

FIG. 32 is a diagram illustrating an example of writing on the information medium in FIG. 1.

FIG. 33 is a diagram illustrating an example of writing on the information medium in FIG. 7.

FIG. 34 is a diagram illustrating an example of writing on the information medium in FIG. 13.

FIG. 35 is a diagram illustrating an example of writing on the information medium in FIG. 21.

FIG. 36 is a diagram illustrating a modification of a schematic configuration of the recording unit in FIG. 29.

FIG. 37 is a diagram illustrating an example of writing on the information medium in FIG. 3.

FIG. 38 is a diagram illustrating an example of writing on the information medium in FIG. 9.

FIG. 39 is a diagram illustrating an example of writing on the information medium in FIG. 15.

FIG. 40 is a diagram illustrating an example of writing on the information medium in FIG. 22.

FIG. 41 is a diagram illustrating an example of writing on the information medium in FIG. 25.

FIG. 42 is a diagram illustrating a modification of the schematic configuration of the recording unit in FIG. 29.

FIG. 43 is a diagram illustrating an example of writing on the information medium in FIG. 5.

FIG. 44 is a diagram illustrating an example of writing on the information medium in FIG. 11.

FIG. 45 is a diagram illustrating an example of writing on the information medium in FIG. 17.

FIG. 46 is a diagram illustrating an example of writing on the information medium in FIG. 19.

FIG. 47 is a diagram illustrating an example of writing on the information medium in FIG. 23.

FIG. 48 is a diagram illustrating an example of writing on the information medium in FIG. 24.

FIG. 49 is a diagram illustrating an example of writing on the information medium in FIG. 27.

FIG. 50 is a diagram illustrating a schematic configuration example of a reading apparatus according to an embodiment of the present disclosure.

FIG. 51 is a diagram illustrating an example of a procedure for reading information from the information medium, in the reading apparatus in FIG. 50.

FIG. 52 is a diagram illustrating an example of reading information from the information medium in FIG. 1.

FIG. 53 is a diagram illustrating an example of reading information from the information medium in FIG. 7.

FIG. 54 is a diagram illustrating an example of reading information from the information medium in FIG. 13.

FIG. 55 is a diagram illustrating an example of reading information from the information medium in FIG. 21.

FIG. 56 is a diagram illustrating an example of reading information from the information medium in FIG. 3.

FIG. 57 is a diagram illustrating an example of reading information from the information medium in FIG. 9.

FIG. 58 is a diagram illustrating an example of reading information from the information medium in FIG. 15.

FIG. 59 is a diagram illustrating an example of reading information from the information medium in FIG. 22.

FIG. 60 is a diagram illustrating an example of reading information from the information medium in FIG. 25.

FIG. 61 is a diagram illustrating an example of reading information from the information medium in FIG. 5.

FIG. 62 is a diagram illustrating an example of reading information from the information medium in FIG. 11.

FIG. 63 is a diagram illustrating an example of reading information from the information medium in FIG. 17.

FIG. 64 is a diagram illustrating an example of reading information from the information medium in FIG. 19.

FIG. 65 is a diagram illustrating an example of reading information from the information medium in FIG. 23.

FIG. 66 is a diagram illustrating an example of reading information from the information medium in FIG. 24.

FIG. 67 is a diagram illustrating an example of reading information from the information medium in FIG. 27.

FIG. 68 is a diagram illustrating an example of application, to an employee ID card, of the information medium according to the embodiments and the modifications thereof described above.

FIG. 69 is a diagram illustrating an example of application, to a member card, of the information medium according to the embodiments and the modifications thereof described above.

MODES FOR CARRYING OUT THE INVENTION

Hereinafter, embodiments for carrying out the present disclosure are described in detail with reference to the drawings. The following description is a specific example of the present disclosure, and the present disclosure is not limited to the following embodiments. Note that the description will be given in the following order.
1. First Embodiment (FIGS. 1 and 2)
   An example in which the information medium is provided with two data layers of a single color of black
2. Modifications of First Embodiment
   Modification A: An example in which the information medium is provided with three data layers (FIGS. 3 and 4)
   Modification B: An example in which the information medium is provided with four data layers (FIGS. 5 and 6)
3. Second Embodiment (FIGS. 7 and 8)
   An example in which an information medium is provided with two data layers of a single color of blue
4. Modifications of Second Embodiment
   Modification C: An example in which the information medium is provided with three data layers (FIGS. 9 and 10)
   Modification D: An example in which the information medium is provided with four data layers (FIGS. 11 and 12)
5. Third Embodiment (FIGS. 13 and 14)
   An example in which the information medium is provided with a magenta data layer and a cyan data layer
6. Modifications of Third Embodiment
   Modification E: An example in which the information medium is provided with a magenta data layer, a cyan data layer, and a blue data layer (FIGS. 15 and 16)
   Modification F: An example in which the information medium is provided with a magenta data layer, two cyan data layers, and a blue data layer (FIGS. 17 and 18)
   Modification G: An example in which the information medium is provided with two magenta data layers and two cyan data layers (FIGS. 19 and 20)

Modification H: An example in which a three-color visible image is formed on the information medium with a magenta data layer and a cyan data layer (FIG. 21)

Modification I: An example in which a three-color visible image is formed on the information medium with a magenta data layer, a cyan data layer, and a blue data layer (FIG. 22)

Modification J: An example in which a three-color visible image is formed on the information medium with a magenta data layer, two cyan data layers, and a blue data layer (FIG. 23)

Modification K: An example in which a three-color visible image is formed on the information medium with two magenta data layers and two cyan data layers (FIG. 24)

7. Fourth Embodiment (FIGS. 25 and 26)

An example in which the information medium is provided with a magenta data layer, a cyan data layer, and a yellow data layer 8. Modification of Fourth Embodiment Modification L: An example in which the information medium is provided with a magenta data layer, a cyan data layer, a yellow data layer, and a black data layer (FIGS. 27 and 28)

9. Fifth Embodiment (FIGS. 29 to 49)

An example in which a recording apparatus is used to write information on the information medium 10. Sixth Embodiment (FIGS. 50 to 67)

An example in which a reading apparatus is used to read information from the information medium 11. Modification Common to First to Fourth Embodiments and Modifications Thereof 12. Application Examples (FIGS. 68 and 69)

Examples in which the information medium according to any of the first to the fourth embodiments and the modifications thereof is applied to an employee ID card and a member card 13. Other Modifications An example in which a photochromic material is used An example in which a phase change material is used

1. First Embodiment

[Configuration]

An information medium 100 according to a first embodiment of the present disclosure is described. FIG. 1 illustrates an example of a cross-sectional configuration of the information medium 100 according to the present embodiment. For example, as illustrated in FIG. 1, the information medium 100 includes two data layers 130 and 150 on a support base 110. The information medium 100 further includes, for example, an intermediate layer 140 that suppresses interference between the two data layers 130 and 150 adjacent to each other. The information medium 100 further includes, for example, a cover layer 120 that protects the two data layers 130 and 150.

The support base 110 is for supporting the two data layers 130 and 150. It is preferable that the support base 110 include a base having a high reflectance from a viewpoint of improving visibility of visible information (visible images) recorded on the two data layers 130 and 150. Examples of the base having the high reflectance include a white resin film. Note that the support base 110 is not limited to the white resin film. The support base 100 is not particularly limited in color, material, and thickness. The support base 110 may be bonded to some surface. The support base 110 may be flat or curved when the information medium 100 is used.

The cover layer 120 is provided, for example, on an outermost surface of the information medium 100. The cover layer 120 includes, for example, a resin film having a pencil hardness of 2 or more defined by JISS6006. The cover layer 120 may have a function as an ultraviolet protection layer to protect the two data layers 130 and 150. The intermediate layer 140 is provided between the data layer 130 and the data layer 150. The intermediate layer 140 suppresses interference between the two data layers 130 and 150 adjacent to each other. Specifically, the intermediate layer 140 is, for example, a heat insulating layer that suppresses thermal interference between the two data layers 130 and 150 adjacent to each other. It is preferable that the heat insulating layer used in the intermediate layer 140 have a thickness of at least 10 μm. It is preferable that both the cover layer 120 and the intermediate layer 140 include a material that is transparent in a visible wavelength range.

The two data layers 130 and 150 each include a modulation material having an optical characteristic that is modulatable. The modulation material is, for example, a reversible material that is able to make transition between a colored state and a decolored state in the visible wavelength range. Modulation of the modulation material causes the visible information to be recorded on the two data layers 130 and 150. The two data layers 130 and 150 include, for example: a leuco dye (a reversible thermosensitive coloring composition) as the reversible material; and a photothermal conversion agent that generates heat upon writing. A light absorption characteristic of the photothermal conversion agent defines a modulation condition of the modulation material (the leuco dye). The two data layers 130 and 150 each further include, for example, a developer and a polymer.

The leuco dye is bonded with the developer by heat to be in the colored state in the visible wavelength range, or is separated from the developer to be in the decolored state in the visible wavelength range. The leuco dye included in the two data layers 130 and 150 is, for example, bonded with the developer by heat to develop a predetermined color in the visible wavelength range. According to the present embodiment, the leuco dye included in the two data layers 130 and 150 develops a black color. That is, the two data layers 130 and 150 are the same as each other in color tone at the time of color development of the modulation material. Further, each of the data layers 130 and 150 has a single color tone in a plane at the time of the color development of the modulation material. In addition, the two data layers 130 and 150 become transparent in the visible wavelength range in the decolored state. The photothermal conversion agent absorbs light in a near-infrared range (700 nm to 2500 nm) to generate heat, for example. Note that, herein, the near-infrared range refers to a wavelength band from 700 nm to 2500 nm. The photothermal conversion agent included in the data layer 130 has, for example, an absorption peak at a wavelength $\lambda 1$ (700 nm≤$\lambda 1$≤2500 nm). The photothermal conversion agent included in the data layer 150 has, for example, an absorption peak at a wavelength $\lambda 2$ ($\lambda 2 \neq \lambda 1$, 700 nm≤$\lambda 2$≤2500 nm). Therefore, the two data layers 130 and 150 are different from each other in modulation condition of the modulation material (the leuco dye). According to the present embodiment, the data layer 150 is disposed at a position deeper than that of the data layer 130 when viewed from the cover layer 120. In this case, the wavelength $\lambda 2$ of the absorption peak of the photothermal conversion agent included in the data layer 150 is longer than the wavelength $\lambda 1$ of the absorption peak of the photothermal conversion agent included in the data layer 130. A reason for this is that, for example, in a case where writing or erasing is performed on the data layer 150 via the data layer 130 with use of a recording apparatus 500 described later, it is more difficult for a laser beam having the wavelength λ2 to be absorbed by the data layer 130.

(A) of FIG. 2 is a diagram illustrating an example of two-dimensional visible information 100A that is visually recognized when the information medium 100 is viewed from above. (B) of FIG. 2 is an enlarged view of a part of the two-dimensional visible information 100A illustrated in (A) of FIG. 2. (C) of FIG. 2 is a diagram illustrating an example of a cross-sectional configuration of a part corresponding to (B) of FIG. 2 of the information medium 100 in (A) of FIG. 2.

The two-dimensional visible information 100A is, for example, a black two-dimensional visible image. As illustrated in (B) and (C) of FIG. 2, the two-dimensional visible information 100A is a synthesis image of visible information 130A and visible information 150A recorded on the two data layers 130 and 150, respectively. In other words, recorded on the two data layers 130 and 150 are the two pieces of visible information 130A and 150A obtained by decomposing the two-dimensional visible information 100A into two pieces of visible information and thereby allowing synthesis of the two pieces of visible information to result in the two-dimensional visible information 100A. (C) of FIG. 2 illustrates an example case where the visible information 130A and the visible information 150A have no part overlapping with each other. Note that the visible information 130A and the visible information 150A may partially overlap with each other.

In a case where an image of the information medium 100 is captured by an imaging device such as a camera, the captured image obtained by the imaging is the single-color two-dimensional visible information 100A itself. Therefore, the visible information 130A and the visible information 150A cannot be separated from the captured image. Accordingly, even if the imaging device such as the camera is used, the visible information 130A or 150A recorded on the information medium 100 cannot be copied. As described above, it is possible to provide the information medium 100 difficult to forge.

According to the present embodiment, the data layers 130 and 150 each include the modulation material having an optical characteristic that is modulatable, and the modulation of the modulation material causes the visible information 130A and the visible information 150A to be recorded. This makes it possible to write the visible information 130A or 150A on the information medium 100, and to erase the written visible information 130A or 150A from the information medium 100.

According to the present embodiment, the intermediate layer 140 is provided. This allows for suppression of the interference between the two data layers 130 and 150 adjacent to each other, making it possible to write the visible information 130A and the visible information 150A on the information medium 100 with high accuracy.

The data layers 130 and 150 according to the present embodiment each have the single color tone in the plane at the time of the color development of the modulation material. The visible information 130A and the visible information 150A recorded on the information medium 100 cannot be copied even if the imaging device such as the camera is used also in such a case. Accordingly, it is possible to provide the information medium 100 difficult to forge.

The data layers 130 and 150 according to the present embodiment are the same as each other in color tone at the time of the color development of the modulation material. The visible information 130A and the visible information 150A recorded on the information medium 100 cannot be copied even if the imaging device such as the camera is used also in such a case. Accordingly, it is possible to provide the information medium 100 difficult to forge.

According to the present embodiment, the data layers 130 and 150 are different from each other in modulation condition of the modulation material. This makes it possible to record the visible information 130A and the visible information 150A on the data layers 130 and 150 independently of each other.

2. Modifications of First Embodiment

[Modification A]

In the first embodiment described above, for example, as illustrated in FIG. 3, the information medium 100 may further include an intermediate layer 160 and a data layer 170. In this case, the intermediate layer 160 is provided between the two data layers 150 and 170 adjacent to each other. The intermediate layer 160 is, for example, a heat insulating layer that suppresses thermal interference between the two data layers 150 and 170 adjacent to each other. It is preferable that the heat insulating layer used in the intermediate layer 160 have a thickness of at least 10 μm. It is preferable that the intermediate layer 160 include a material that is transparent in the visible wavelength range.

The data layer 170 includes a modulation material having an optical characteristic that is modulatable. The modulation material is, for example, a reversible material that is able to make transition between a colored state and a decolored state in the visible wavelength range. The data layer 170 includes, for example: a leuco dye (a reversible thermosensitive coloring composition) as the reversible material; and a photothermal conversion agent that generates heat upon writing. The data layer 170 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 170 is, for example, bonded with the developer by heat to develop a predetermined color in the visible wavelength range. According to the present modification, the leuco dye included in the data layer 170 develops a black color. In addition, the data layer 170 becomes transparent in the visible wavelength range in the decolored state. The photothermal conversion agent absorbs light in a near-infrared range (700 nm to 2500 nm) to generate heat, for example. The photothermal conversion agent included in the data layer 170 has, for example, an absorption peak at a wavelength λ3 (λ3≠λ1, λ2, 700 nm≤λ3≤2500 nm). Therefore, the three data layers 130, 150, and 170 are different from one another in the modulation condition of the modulation material (the leuco dye). According to the present modification, the data layer 170 is disposed at a position deeper than those of the data layers 130 and 150 when viewed from the cover layer 120. In this case, the wavelength λ3 of the absorption peak of the photothermal conversion agent included in the data layer 170 is longer than the wavelengths λ1 and λ2 of the absorption peaks of the photothermal conversion agents included respectively in the data layers 130 and 150. A reason for this is that, for example, in a case where writing or erasing is performed on the data layer 170 via the data layers 130 and 150 with use of the recording apparatus 500 described later, it is more difficult for a laser beam having the wavelength $\lambda 3$ to be absorbed by the data layers 130 and 150.

(A) of FIG. 4 is an enlarged view of a part of the two-dimensional visible information 100A that is visually recognized when the information medium 100 illustrated in FIG. 3 is viewed from above. (B) of FIG. 4 is a diagram illustrating an example of a cross-sectional configuration of a part corresponding to (A) of FIG. 4 in the information medium 100 illustrated in FIG. 3. Note that, when the information medium 100 in FIG. 3 is viewed from the above, for example, the two-dimensional visible information 100A as illustrated in (A) of FIG. 2 is visually recognized.

The two-dimensional visible information 100A is, for example, a black two-dimensional visible image. As illustrated in (A) and (B) of FIG. 2, the two-dimensional visible information 100A is a synthesis image of the visible information 130A, the visible information 150A, and visible information 170A recorded on the three data layers 130, 150, and 170, respectively. In other words, recorded on the three data layers 130, 150, and 170 are the three pieces of visible information 130A, 150A, and 170A obtained by decomposing the two-dimensional visible information 100A into three pieces of visible information and thereby allowing synthesis of the three pieces of visible information to result in the two-dimensional visible information 100A. (B) of FIG. 4 illustrates an example case where two or more of the visible information 130A, the visible information 150A, and the visible information 170A have no part overlapping with each other. Note that two or more of the visible information 130A, the visible information 150A, and the visible information 170A may partially overlap with each other.

In a case where an image of the information medium 100 is captured by an imaging device such as a camera, the captured image obtained by the imaging is the single-color two-dimensional visible information 100A itself. Therefore, the visible information 130A, the visible information 150A, and the visible information 170A cannot be separated from the captured image. Accordingly, even if the imaging device such as the camera is used, the visible information 130A, 150A, or 170A recorded on the information medium 100 cannot be copied. As described above, it is possible to provide the information medium 100 difficult to forge.

[Modification B]

In Modification A described above, for example, as illustrated in FIG. 5, the information medium 100 may further include an intermediate layer 180 and a data layer 190. In this case, the intermediate layer 180 is provided between the two data layers 170 and 190 adjacent to each other. The intermediate layer 180 is, for example, a heat insulating layer that suppresses thermal interference between the two data layers 170 and 190 adjacent to each other. It is preferable that the heat insulating layer used in the intermediate layer 180 have a thickness of at least 10 μm. It is preferable that the intermediate layer 180 include a material that is transparent in the visible wavelength range.

The data layer 190 includes a modulation material having an optical characteristic that is modulatable. The modulation material is, for example, a reversible material that is able to make transition between a colored state and a decolored state in the visible wavelength range. The data layer 190 includes, for example: a leuco dye (a reversible thermosensitive coloring composition) as the reversible material; and a photothermal conversion agent that generates heat upon writing. The data layer 190 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 190 is, for example, bonded with the developer by heat to develop a predetermined color in the visible wavelength range. According to the present modification, the leuco dye included in the data layer 190 develops a black color. In addition, the data layer 190 becomes transparent in the visible wavelength range in the decolored state. The photothermal conversion agent absorbs light in a near-infrared range (700 nm to 2500 nm) to generate heat, for example. The photothermal conversion agent included in the data layer 190 has, for example, an absorption peak at a wavelength $\lambda 4$ ($\lambda 4 \neq \lambda 1$, $\lambda 2$, $\lambda 3$, 700 nm $\leq \lambda 4 \leq$ 2500 nm). Therefore, the four data layers 130, 150, 170, and 190 are different from one another in the modulation condition of the modulation material (the leuco dye). According to the present modification, the data layer 190 is disposed at a position deeper than those of the data layers 130, 150, and 170 when viewed from the cover layer 120. In this case, the wavelength $\lambda 4$ of the absorption peak of the photothermal conversion agent included in the data layer 190 is longer than the wavelengths $\lambda 1$, $\lambda 2$, and $\lambda 3$ of the absorption peaks of the photothermal conversion agents included respectively in the data layers 130, 150, and 170. A reason for this is that, for example, in a case where writing or erasing is performed on the data layer 190 via the data layers 130, 150, and 170 with use of the recording apparatus 500 described later, it is more difficult for a laser beam having the wavelength $\lambda 4$ to be absorbed by the data layers 130, 150, and 170.

(A) of FIG. 6 is an enlarged view of a part of the two-dimensional visible information 100A that is visually recognized when the information medium 100 illustrated in FIG. 5 is viewed from above. (B) of FIG. 6 is a diagram illustrating an example of a cross-sectional configuration of a part corresponding to (A) of FIG. 6 in the information medium 100 illustrated in FIG. 6. Note that, when the information medium 100 in FIG. 5 is viewed from the above, for example, the two-dimensional visible information 100A as illustrated in (A) of FIG. 2 is visually recognized.

The two-dimensional visible information 100A is, for example, a black two-dimensional visible image. As illustrated in (A) and (B) of FIG. 6, the two-dimensional visible information 100A is a synthesis image of the visible information 130A, the visible information 150A, the visible information 170A, and visible information 190A recorded on the four data layers 130, 150, 170, and 190, respectively. In other words, recorded on the four data layers 130, 150, 170, and 190 are the four pieces of visible information 130A, 150A, 170A, and 190A obtained by decomposing the two-dimensional visible information 100A into four pieces of visible information and thereby allowing synthesis of the four pieces of visible information to result in the two-dimensional visible information 100A. (B) of FIG. 6 illustrates an example case where two or more of the visible information 130A, the visible information 150A, the visible information 170A, and the visible information 190A have no part overlapping with each other. Note that two or more of the visible information 130A, the visible information 150A, the visible information 170A, and the visible information 190A may partially overlap with each other.

In a case where an image of the information medium 100 is captured by an imaging device such as a camera, the captured image obtained by the imaging is the single-color two-dimensional visible information 100A itself. Therefore, the visible information 130A, the visible information 150A, the visible information 170A, and the visible information 190A cannot be separated from the captured image. Accordingly, even if the imaging device such as the camera is used, the visible information 130A, 150A, 170A, or 190A recorded on the information medium 100 cannot be copied. As described above, it is possible to provide the information medium 100 difficult to forge.

3. Second Embodiment

[Configuration]

An information medium 200 according to a second embodiment of the present disclosure is described. FIG. 7 illustrates an example of a cross-sectional configuration of the information medium 200 according to the present embodiment. For example, as illustrated in FIG. 7, the information medium 200 includes two data layers 230 and 250 on a support base 210. The information medium 200 further includes, for example, an intermediate layer 240 that suppresses interference between the two data layers 230 and 250 adjacent to each other. The information medium 200 further includes, for example, a cover layer 220 that protects the two data layers 230 and 250.

The support base 210 is for supporting the two data layers 230 and 250. It is preferable that the support base 210 include a base having a high reflectance from a viewpoint of improving visibility of visible information (visible images) recorded on the two data layers 230 and 250. Examples of the base having the high reflectance include a white resin film. Note that the support base 210 is not limited to the white resin film. The support base 200 is not particularly limited in color, material, and thickness. The support base 210 may be bonded to some surface. The support base 210 may be flat or curved when the information medium 200 is used.

The cover layer 220 is provided, for example, on an outermost surface of the information medium 200. The cover layer 220 includes, for example, a resin film having a pencil hardness of 2 or more defined by JISS6006. The cover layer 220 may have a function as an ultraviolet protection layer to protect the two data layers 230 and 250. The intermediate layer 240 is provided between the data layer 230 and the data layer 250. The intermediate layer 240 is, for example, a heat insulating layer that suppresses thermal interference between the two data layers 230 and 250 adjacent to each other. It is preferable that the heat insulating layer used in the intermediate layer 240 have a thickness of at least 10 µm. It is preferable that both the cover layer 220 and the intermediate layer 240 include a material that is transparent in the visible wavelength range.

The two data layers 230 and 250 each include a modulation material having an optical characteristic that is modulatable. The modulation material is, for example, a reversible material that is able to make transition between a colored state and a decolored state in the visible wavelength range. The two data layers 230 and 250 include, for example: a leuco dye (a reversible thermosensitive coloring composition) as the reversible material; and a photothermal conversion agent that generates heat upon writing. A light absorption characteristic of the photothermal conversion agent defines a modulation condition of the modulation material (the leuco dye). The two data layers 230 and 250 each further include, for example, a developer and a polymer.

The leuco dye is bonded with the developer by heat to be in the colored state in the visible wavelength range, or is separated from the developer to be in the decolored state in the visible wavelength range. The leuco dye included in the two data layers 230 and 250 is, for example, bonded with the developer by heat to develop a predetermined color in the visible wavelength range. According to the present embodiment, the leuco dye included in the two data layers 230 and 250 develops a blue color. In addition, the two data layers 230 and 250 become transparent in the visible wavelength range in the decolored state. The photothermal conversion agent absorbs light in a near-infrared range (700 nm to 2500 nm) to generate heat, for example. Note that, herein, the near-infrared range refers to a wavelength band from 700 nm to 2500 nm. The photothermal conversion agent included in the data layer 230 has, for example, an absorption peak at a wavelength $\lambda 1$ (700 nm≤$\lambda 1$≤2500 nm). The photothermal conversion agent included in the data layer 250 has, for example, an absorption peak at a wavelength $\lambda 2$ ($\lambda 2 \neq \lambda 1$, 700 nm≤$\lambda 2$≤2500 nm). Therefore, the two data layers 230 and 250 are different from each other in the modulation condition of the modulation material (the leuco dye). According to the present embodiment, the data layer 250 is disposed at a position deeper than that of the data layer 230 when viewed from the cover layer 220. In this case, the wavelength $\lambda 2$ of the absorption peak of the photothermal conversion agent included in the data layer 250 is longer than the wavelength $\lambda 1$ of the absorption peak of the photothermal conversion agent included in the data layer 230. A reason for this is that, for example, in a case where writing or erasing is performed on the data layer 250 via the data layer 230 with use of the recording apparatus 500 described later, it is more difficult for a laser beam having the wavelength $\lambda 2$ to be absorbed by the data layer 230.

(A) of FIG. 8 is a diagram illustrating an example of two-dimensional visible information 200A that is visually recognized when the information medium 200 is viewed from above. (B) of FIG. 8 is an enlarged view of a part of the two-dimensional visible information 200A illustrated in (A) of FIG. 8. (C) of FIG. 8 is a diagram illustrating an example of a cross-sectional configuration of a part corresponding to (B) of FIG. 8 in the information medium 200 illustrated in (A) of FIG. 8.

The two-dimensional visible information 200A is, for example, a blue two-dimensional visible image. As illustrated in (B) and (C) of FIG. 8, the two-dimensional visible information 200A is a synthesis image of visible information 230A and visible information 250A recorded on the two data layers 230 and 250, respectively. In other words, recorded on the two data layers 230 and 250 are the two pieces of visible information 230A and 250A obtained by decomposing the two-dimensional visible information 200A into two pieces of visible information and thereby allowing synthesis of the two pieces of visible information to result in the two-dimensional visible information 200A. (C) of FIG. 8 illustrates an example case where the visible information 230A and the visible information 250A have no part overlapping with each other. Note that the visible information 230A and the visible information 250A may partially overlap with each other.

In a case where an image of the information medium 200 is captured by an imaging device such as a camera, the captured image obtained by the imaging is the single-color two-dimensional visible information 200A itself. Therefore, the visible information 230A and the visible information 250A cannot be separated from the captured image. Accordingly, even if the imaging device such as the camera is used, the visible information 230A or 250A recorded on the information medium 200 cannot be copied. As described above, it is possible to provide the information medium 200 difficult to forge.

According to the present embodiment, the data layers 230 and 250 each include the modulation material having an optical characteristic that is modulatable, and the modulation of the modulation material causes the visible information 230A and the visible information 250A to be recorded. This makes it possible to write the visible information 230A or 250A on the information medium 200, and to erase the written visible information 230A or 250A from the information medium 200.

According to the present embodiment, the intermediate layer 240 is provided. This allows for suppression of the interference between the two data layers 230 and 250 adjacent to each other, making it possible to write the visible information 230A and the visible information 250A on the information medium 200 with high accuracy.

The data layers 230 and 250 according to the present embodiment each have the single color tone in the plane at the time of the color development of the modulation material. The visible information 230A and the visible information 250A recorded on the information medium 200 cannot be copied even if the imaging device such as the cameras is used also in such a case. Accordingly, it is possible to provide the information medium 200 difficult to forge.

The data layers 230 and 250 according to the present embodiment are the same as each other in the color tone at the time of the color development of the modulation material. The visible information 230A and the visible information 250A recorded on the information medium 200 cannot be copied even if the imaging device such as the camera is used also in such a case. Accordingly, it is possible to provide the information medium 200 difficult to forge.

According to the present embodiment, the data layers 230 and 250 are different from each other in the modulation condition of the modulation material. This makes it possible to record the visible information 230A and the visible information 250A on the data layers 230 and 250 independently of each other.

4. Modifications of Second Embodiment

[Modification C]

In the second embodiment described above, for example, as illustrated in FIG. 9, the information medium 200 may further include an intermediate layer 260 and a data layer 270. In this case, the intermediate layer 260 is provided between the two data layers 250 and 270 adjacent to each other. The intermediate layer 260 is, for example, a heat insulating layer that suppresses thermal interference between the two data layers 250 and 270 adjacent to each other. It is preferable that the heat insulating layer used in the intermediate layer 260 have a thickness of at least 10 μm. It is preferable that the intermediate layer 260 include a material that is transparent in the visible wavelength range.

The data layer 270 includes a modulation material having an optical characteristic that is modulatable. The modulation material is, for example, a reversible material that is able to make transition between a colored state and a decolored state in the visible wavelength range. The data layer 270 includes, for example: a leuco dye (a reversible thermosensitive coloring composition) as the reversible material; and a photothermal conversion agent that generates heat upon writing. The data layer 270 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 270 is, for example, bonded with the developer by heat to develop a predetermined color in the visible wavelength range. According to the present modification, the leuco dye included in the data layer 270 develops a blue color. In addition, the data layer 270 becomes transparent in the visible wavelength range in the decolored state. The photothermal conversion agent absorbs light in a near-infrared range (700 nm to 2500 nm) to generate heat, for example. The photothermal conversion agent included in the data layer 270 has, for example, an absorption peak at a wavelength $\lambda 3$ ($\lambda 3 \neq \lambda 1$, $\lambda 2$, 700 nm$\leq \lambda 3 \leq$2500 nm). Therefore, the three data layers 230, 250, and 270 are different from one another in the modulation condition of the modulation material (the leuco dye). According to the present modification, the data layer 270 is disposed at a position deeper than those of the data layers 230 and 250 when viewed from the cover layer 220. In this case, the wavelength $\lambda 3$ of the absorption peak of the photothermal conversion agent included in the data layer 270 is longer than the wavelengths $\lambda 1$ and $\lambda 2$ of the absorption peaks of the photothermal conversion agents included respectively in the data layers 230 and 250. A reason for this is that, for example, in a case where writing or erasing is performed on the data layer 270 via the data layers 230 and 250 with use of the recording apparatus 500 described later, it is more difficult for a laser beam having the wavelength $\lambda 3$ to be absorbed by the data layers 230 and 250.

(A) of FIG. 10 is an enlarged view of a part of the two-dimensional visible information 200A that is visually recognized when the information medium 200 in FIG. 9 is viewed from above. (B) of FIG. 10 is a diagram illustrating an example of a cross-sectional configuration of a part corresponding to (A) of FIG. 10 of the information medium 200 in FIG. 9. Note that, when the information medium 200 in FIG. 9 is viewed from the above, for example, the two-dimensional visible information 200A as illustrated in (A) of FIG. 8 is visually recognized.

The two-dimensional visible information 200A is, for example, a blue two-dimensional visible image. As illustrated in (A) and (B) of FIG. 10, the two-dimensional visible information 200A is a synthesis image of the visible information 230A, the visible information 250A, and visible information 270A recorded on the three data layers 230, 250, and 270, respectively. In other words, recorded on the three data layers 230, 250, and 270 are the three pieces of visible information 230A, 250A, and 270A obtained by decomposing the two-dimensional visible information 200A into three pieces of visible information and thereby allowing synthesis of the three pieces of visible information to result in the two-dimensional visible information 200A. (B) of FIG. 10 illustrates an example case where two or more of the visible information 230A, the visible information 250A, and the visible information 270A have no part overlapping with each other. Note that two or more of the visible information 230A, the visible information 250A, and the visible information 270A may partially overlap with each other.

In a case where an image of the information medium 200 is captured by an imaging device such as a camera, the captured image obtained by the imaging is the single-color two-dimensional visible information 200A itself. Therefore, the visible information 230A, the visible information 250A, and the visible information 270A cannot be separated from the captured image. Accordingly, even if the imaging device such as the camera is used, the visible information 230A, 250A, or 270A recorded on the information medium 200 cannot be copied. As described above, it is possible to provide the information medium 200 difficult to forge.

[Modification D]

In Modification C described above, for example, as illustrated in FIG. 11, the information medium 200 may further include an intermediate layer 280 and a data layer 290. In this case, the intermediate layer 280 is provided between the two data layers 270 and 290 adjacent to each other. The intermediate layer 280 is, for example, a heat insulating layer that suppresses thermal interference between the two data layers 270 and 290 adjacent to each other. It is preferable that the heat insulating layer used in the intermediate layer 280 have a thickness of at least 10 µm. It is preferable that the intermediate layer 280 include a material that is transparent in the visible wavelength range.

The data layer 290 includes a modulation material having an optical characteristic that is modulatable. The modulation material is, for example, a reversible material that is able to make transition between a colored state and a decolored state in the visible wavelength range. The data layer 290 includes, for example: a leuco dye (a reversible thermosensitive coloring composition) as the reversible material; and a photothermal conversion agent that generates heat upon writing. The data layer 290 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 290 is, for example, bonded with the developer by heat to develop a predetermined color in the visible wavelength range. According to the present modification, the leuco dye included in the data layer 290 develops a blue color. In addition, the data layer 290 becomes transparent in the visible wavelength range in the decolored state. The photothermal conversion agent absorbs light in a near-infrared range (700 nm to 2500 nm) to generate heat, for example. The photothermal conversion agent included in the data layer 290 has, for example, an absorption peak at a wavelength $\lambda 4$ ($\lambda 4 \neq \lambda 1$, $\lambda 2$, $\lambda 3$, 700 nm$\leq \lambda 4 \leq$2500 nm). Therefore, the four data layers 230, 250, 270, and 290 are different from one another in the modulation condition of the modulation material (the leuco dye). According to the present modification, the data layer 290 is disposed at a position deeper than those of the data layers 230, 250, and 270 when viewed from the cover layer 220. In this case, the wavelength $\lambda 4$ of the absorption peak of the photothermal conversion agent included in the data layer 290 is longer than the wavelengths $\lambda 1$, $\lambda 2$, and $\lambda 3$ of the absorption peaks of the photothermal conversion agents included respectively in the data layers 230, 250, and 270. A reason for this is that, for example, in a case where writing or erasing is performed on the data layer 290 via the data layers 230, 250, and 270 with use of the recording apparatus 500 described later, it is more difficult for a laser beam having the wavelength $\lambda 4$ to be absorbed by the data layers 230, 250, and 270.

(A) of FIG. 12 is an enlarged view of a part of the two-dimensional visible information 200A that is visually recognized when the information medium 200 illustrated in FIG. 11 is viewed from above. (B) of FIG. 12 is a diagram illustrating an example of a cross-sectional configuration of a part corresponding to (A) of FIG. 12 of the information medium 200 in FIG. 11. Note that, when the information medium 200 in FIG. 11 is viewed from the above, for example, the two-dimensional visible information 200A as illustrated in (A) of FIG. 8 is visually recognized.

The two-dimensional visible information 200A is, for example, a blue two-dimensional visible image. As illustrated in (A) and (B) of FIG. 12, the two-dimensional visible information 200A is a synthesis image of the visible information 230A, the visible information 250A, the visible information 270A, and visible information 290A recorded on the four data layers 230, 250, 270, and 290, respectively. In other words, recorded on the four data layers 230, 250, 270, and 290 are the four pieces of visible information 230A, 250A, 270A, and 290A obtained by decomposing the two-dimensional visible information 200A into four pieces of visible information and thereby allowing synthesis of the four pieces of visible information to result in the two-dimensional visible information 200A. (B) of FIG. 12 illustrates an example case where two or more of the visible information 230A, the visible information 250A, the visible information 270A, and the visible information 290A have no part overlapping with each other. Note that two or more of the visible information 230A, the visible information 250A, the visible information 270A, and the visible information 290A may partially overlap with each other.

In a case where an image of the information medium 200 is captured by an imaging device such as a camera, the captured image obtained by the imaging is the single-color two-dimensional visible information 200A itself. Therefore, the visible information 230A, the visible information 250A, the visible information 270A, and the visible information 290A cannot be separated from the captured image. Accordingly, even if the imaging device such as the camera is used, the visible information 230A, 250A, 270A, or 290A recorded on the information medium 200 cannot be copied. As described above, it is possible to provide the information medium 200 difficult to forge.

5. Third Embodiment

[Configuration]

An information medium 300 according to a third embodiment of the present disclosure is described. FIG. 13 illustrates an example of a cross-sectional configuration of the information medium 300 according to the present embodiment. For example, as illustrated in FIG. 13, the information medium 300 includes two data layers 330 and 350 on a support base 310. The information medium 300 further includes, for example, an intermediate layer 340 that suppresses interference between the two data layers 330 and 350 adjacent to each other. The information medium 300 further includes, for example, a cover layer 320 that protects the two data layers 330 and 350.

The support base 310 is for supporting the two data layers 330 and 350. It is preferable that the support base 310 include a base having a high reflectance from a viewpoint of improving visibility of visible information (visible images) recorded on the two data layers 330 and 350. Examples of the base having the high reflectance include a white resin film. Note that the support base 310 is not limited to the white resin film. The support base 300 is not particularly limited in color, material, and thickness. The support base 310 may be bonded to some surface. The support base 310 may be flat or curved when the information medium 300 is used.

The cover layer 320 is provided, for example, on an outermost surface of the information medium 300. The cover layer 320 includes, for example, a resin film having a pencil hardness of 2 or more defined by JISS6006. The cover layer 320 may have a function as an ultraviolet protection layer to protect the two data layers 330 and 350. The intermediate layer 340 is provided between the data layer 330 and the data layer 350. The intermediate layer 340 is, for example, a heat insulating layer that suppresses thermal interference between the two data layers 330 and 350 adjacent to each other. It is preferable that the heat insulating layer used in the intermediate layer 340 have a thickness of at least 10 μm. It is preferable that both the cover layer 320 and the intermediate layer 340 include a material that is transparent in the visible wavelength range.

The two data layers 330 and 350 include a modulation material having an optical characteristic that is modulatable. The modulation material is, for example, a reversible material that is able to make transition between a colored state and a decolored state in the visible wavelength range. The two data layers 330 and 350 include, for example: a leuco dye (a reversible thermosensitive coloring composition) as the reversible material; and a photothermal conversion agent that generates heat upon writing. A light absorption characteristic of the photothermal conversion agent defines a modulation condition of the modulation material (the leuco dye). The two data layers 330 and 350 further include, for example, a developer and a polymer.

The leuco dye is bonded with the developer by heat to be in the colored state in the visible wavelength range, or is separated from the developer to be in the decolored state in the visible wavelength range. The leuco dye included in the two data layers 330 and 350 is, for example, bonded with the developer by heat to develop a predetermined color in the visible wavelength range. According to the present embodiment, the leuco dye included in the data layer 330 develops a magenta color and the leuco dye included in the data layer 350 develops a cyan color. That is, the data layers 330 and 350 are different from each other in color tone at the time of the color development of the modulation material. In addition, the two data layers 330 and 350 become transparent in the visible wavelength range in the decolored state. The photothermal conversion agent absorbs light in a near-infrared range (700 nm to 2500 nm) to generate heat, for example. Note that, herein, the near-infrared range refers to a wavelength band from 700 nm to 2500 nm. The photothermal conversion agent included in the data layer 330 has, for example, an absorption peak at a wavelength $\lambda 1$ (700 nm$\leq\lambda 1\leq$2500 nm). The photothermal conversion agent included in the data layer 350 has, for example, an absorption peak at a wavelength $\lambda 2$ ($\lambda 2\neq\lambda 1$, 700 nm$\leq\lambda 2\leq$2500 nm). Therefore, the two data layers 330 and 350 are different from each other in the modulation condition of the modulation material (the leuco dye). According to the present embodiment, the data layer 350 is disposed at a position deeper than that of the data layer 330 when viewed from the cover layer 320. In this case, the wavelength $\lambda 2$ of the absorption peak of the photothermal conversion agent included in the data layer 350 is longer than the wavelength $\lambda 1$ of the absorption peak of the photothermal conversion agent included in the data layer 330. A reason for this is that, for example, in a case where writing or erasing is performed on the data layer 350 via the data layer 330 with use of the recording apparatus 500 described later, it is more difficult for a laser beam having the wavelength $\lambda 2$ to be absorbed by the data layer 330.

(A) of FIG. 14 is a diagram illustrating an example of two-dimensional visible information 300A that is visually recognized when the information medium 300 is viewed from above. (B) of FIG. 14 is an enlarged view of a part of the two-dimensional visible information 300A illustrated in (A) of FIG. 14. (C) of FIG. 14 is a diagram illustrating an example of a cross-sectional configuration of a part corresponding to (B) of FIG. 14 of the information medium 300 illustrated in (A) of FIG. 14.

The two-dimensional visible information 300A is, for example, a blue two-dimensional visible image. As illustrated in (B) and (C) of FIG. 14, the two-dimensional visible information 300A is a synthesis image of visible information 330A and visible information 350A recorded on the two data layers 330 and 350, respectively. In other words, recorded on the two data layers 330 and 350 are the two pieces of visible information 330A and 350A obtained by decomposing the two-dimensional visible information 300A into two pieces of visible information and thereby allowing synthesis of the two pieces of visible information to result in the two-dimensional visible information 300A.

Here, the two pieces of visible information 330A and 350A overlap with each other, as illustrated in (C) of FIG. 14. This allows for generation of a blue color as a mixture of the magenta color and the cyan color. Therefore, in a case where an image of the information medium 100 is captured by an imaging device such as a camera, the captured image obtained by the imaging is the blue two-dimensional visible information 300A. Therefore, the magenta visible information 330A and the cyan visible information 350A cannot be generated from the captured image. Accordingly, even if the imaging device such as the camera is used, the visible information 330A or 350A recorded on the information medium 300 cannot be copied. As described above, it is possible to provide the information medium 300 difficult to forge.

According to the present embodiment, the data layers 330 and 350 each include the modulation material having an optical characteristic that is modulatable, and the modulation of the modulation material causes the visible information 330A and the visible information 350A to be recorded. This makes it possible to write the visible information 330A or 350A on the information medium 300, and to erase the written visible information 330A or 350A from the information medium 300.

According to the present embodiment, the intermediate layer 340 is provided. This allows for suppression of the interference between the two data layers 330 and 350 adjacent to each other, making it possible to write the visible information 330A and the visible information 350A on the information medium 300 with high accuracy.

The data layers 330 and 350 according to the present embodiment each have the single color tone in the plane at the time of the color development of the modulation material. The visible information 330A and the visible information 350A recorded on the information medium 300 cannot be copied even if the imaging device such as the camera is used also in such a case. Accordingly, it is possible to provide the information medium 300 difficult to forge.

The data layers 330 and 350 according to the present embodiment are different from each other in the color tone at the time of the color development of the modulation material. The visible information 330A and the visible information 350A recorded on the information medium 300 cannot be copied even if the imaging device such as the camera is used also in such a case. Accordingly, it is possible to provide the information medium 300 difficult to forge.

According to the present embodiment, the data layers 330 and 350 are different from each other in the modulation condition of the modulation material. This makes it possible to record the visible information 330A and the visible information 350A on the data layers 330 and 350 independently of each other.

According to the present embodiment, the data layers 330 and 350 have respective colored parts that partially or fully overlap with each other in a stacking direction. Accordingly, even if the imaging device such as the camera is used, it is possible to prevent the visible information 330A or 350A recorded on the information medium 300 from being copied. It is therefore possible to provide the information medium 300 difficult to forge.

6. Modifications of Third Embodiment

[Modification E]

In the third embodiment described above, for example, as illustrated in FIG. 15, the information medium 300 may further include an intermediate layer 360 and a data layer 370. In this case, the intermediate layer 360 is provided between the two data layers 350 and 370 adjacent to each other. The intermediate layer 360 is, for example, a heat insulating layer that suppresses thermal interference between the two data layers 350 and 370 adjacent to each other. It is preferable that the heat insulating layer used in the intermediate layer 360 have a thickness of at least 10 µm. It is preferable that the intermediate layer 360 include a material that is transparent in the visible wavelength range.

The data layer 370 includes a modulation material having an optical characteristic that is modulatable. The modulation material is, for example, a reversible material that is able to make transition between a colored state and a decolored state in the visible wavelength range. The data layer 370 includes, for example: a leuco dye (a reversible thermosensitive coloring composition) as the reversible material; and a photothermal conversion agent that generates heat upon writing. The data layer 370 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 370 is, for example, bonded with the developer by heat to develop a predetermined color in the visible wavelength range. According to the present modification, the leuco dye included in the data layer 370 develops a blue color. That is, according to the present modification, the data layers 330, 350, and 370 are different from each other in color tone at the time of the color development of the modulation material. In addition, the data layer 370 becomes transparent in the visible wavelength range in the decolored state. The photothermal conversion agent absorbs light in a near-infrared range (700 nm to 2500 nm) to generate heat, for example. The photothermal conversion agent included in the data layer 370 has, for example, an absorption peak at a wavelength $\lambda 3$ ($\lambda 3 \neq \lambda 1$, $\lambda 2$, 700 nm$\leq \lambda 3 \leq$2500 nm). Therefore, the three data layers 330, 350, and 370 are different from one another in the modulation condition of the modulation material (the leuco dye). According to the present modification, the data layer 370 is disposed at a position deeper than those of the data layers 330 and 350 when viewed from the cover layer 320. In this case, the wavelength $\lambda 3$ of the absorption peak of the photothermal conversion agent included in the data layer 370 is longer than the wavelengths $\lambda 1$ and $\lambda 2$ of the absorption peaks of the photothermal conversion agents included respectively in the data layers 330 and 350. A reason for this is that, for example, in a case where writing or erasing is performed on the data layer 370 via the data layers 330 and 350 with use of the recording apparatus 500 described later, it is more difficult for a laser beam having the wavelength $\lambda 3$ to be absorbed by the data layers 330 and 350.

(A) of FIG. 16 is an enlarged view of a part of the two-dimensional visible information 300A that is visually recognized when the information medium 300 illustrated in FIG. 15 is viewed from above. (B) of FIG. 16 is a diagram illustrating an example of a cross-sectional configuration of a part corresponding to (A) of FIG. 16 of the information medium 100 in FIG. 15. Note that, when the information medium 300 in FIG. 15 is viewed from the above, for example, the two-dimensional visible information 300A as illustrated in (A) of FIG. 14 is visually recognized.

The two-dimensional visible information 300A is, for example, a blue two-dimensional visible image. As illustrated in (A) and (B) of FIG. 16, the two-dimensional visible information 300A is a synthesis image of the visible information 330A, the visible information 350A, and visible information 370A recorded on the three data layers 330, 350, and 370, respectively. In other words, recorded on the three data layers 330, 350, and 370 are the three pieces of visible information 330A, 350A, and 370A obtained by decomposing the two-dimensional visible information 300A into three pieces of visible information and thereby allowing synthesis of the three pieces of visible information to result in the two-dimensional visible information 300A.

Here, the two pieces of visible information 330A and 350A overlap with each other, as illustrated in (B) of FIG. 16. This allows for generation of a blue color as a mixture of the magenta color and the cyan color. In addition, each of the two pieces of visible information 330A and 350A and the visible information 370A have no part overlapping with each other, as illustrated in (B) of FIG. 16. Therefore, the blue two-dimensional visible information 300A is generated from: a blue synthesis image that is generated from the two pieces of visible information 330A and 350A; and a blue image generated from the visible information 370A.

Here, it is preferable that the blue synthesis image (hereinafter, referred to as a "first image") that is generated by synthesis of the two pieces of visible information 330A and 350A and the blue image (hereinafter, referred to as a "second image") generated from the visible information 370A have a small difference in hue that is at least undistinguishable by human eyes. Note that, in a case where an image of the information medium 300 is captured by the imaging device such as the camera, even if the first image and the second image can be separated from the captured image obtained by the imaging, it is not possible to determine that the first image is formed by synthesis of the image formed on the uppermost data layer 330 and the image formed on the intermediate data layer 350. Accordingly, even if the imaging device such as the camera is used, the visible information 330A, 350A, or 370A recorded on the information medium 300 cannot be copied. As described above, it is possible to provide the information medium 300 difficult to forge.

[Modification F]

In Modification E described above, for example, as illustrated in FIG. 17, the information medium 300 may further include an intermediate layer 380 and a data layer 390. In this case, the intermediate layer 380 is provided between the two data layers 370 and 390 adjacent to each other. The intermediate layer 380 is, for example, a heat insulating layer that suppresses thermal interference between the two data layers 370 and 390 adjacent to each other. It is preferable that the heat insulating layer used in the intermediate layer 380 have a thickness of at least 10 µm. It is preferable that the intermediate layer 380 include a material that is transparent in the visible wavelength range.

The data layer 390 includes a modulation material having an optical characteristic that is modulatable. The modulation material is, for example, a reversible material that is able to make transition between a colored state and a decolored state in the visible wavelength range. The data layer 390 includes, for example: a leuco dye (a reversible thermosensitive coloring composition) as the reversible material; and a photothermal conversion agent that generates heat upon writing. The data layer 390 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 390 is, for example, bonded with the developer by heat to develop a predetermined color in the visible wavelength range. According to the present modification, the leuco dye included in the data layer 390 develops a cyan color. In addition, the data layer 390 becomes transparent in the visible wavelength range in the decolored state. The photothermal conversion agent absorbs light in a near-infrared range (700 nm to 2500 nm) to generate heat, for example. The photothermal conversion agent included in the data layer 390 has, for example, an absorption peak at a wavelength $\lambda 4$ ($\lambda 4 \ne \lambda 1$, $\lambda 2$, $\lambda 3$, 700 nm$\le \lambda 4 \le$2500 nm). Therefore, the four data layers 330, 350, 370, and 390 are different from one another in the modulation condition of the modulation material (the leuco dye). According to the present modification, the data layer 390 is disposed at a position deeper than those of the data layers 330, 350, and 370 when viewed from the cover layer 320. In this case, the wavelength $\lambda 4$ of the absorption peak of the photothermal conversion agent included in the data layer 390 is longer than the wavelengths $\lambda 1$, $\lambda 2$, and $\lambda 3$ of the absorption peaks of the photothermal conversion agents included respectively in the data layers 330, 350, and 370. A reason for this is that, for example, in a case where writing or erasing is performed on the data layer 390 via the data layers 330, 350, and 370 with use of the recording apparatus 500 described later, it is more difficult for a laser beam having the wavelength $\lambda 4$ to be absorbed by the data layers 330, 350, and 370.

(A) of FIG. 18 is an enlarged view of a part of the two-dimensional visible information 300A that is visually recognized when the information medium 300 in FIG. 17 is viewed from above. (B) of FIG. 18 is a diagram illustrating an example of a cross-sectional configuration of a part corresponding to (A) of FIG. 18 of the information medium 300 in FIG. 17. Note that, when the information medium 300 illustrated in FIG. 17 is viewed from the above, for example, the two-dimensional visible information 300A as illustrated in (A) of FIG. 14 is visually recognized.

The two-dimensional visible information 300A is, for example, a blue two-dimensional visible image. As illustrated in (A) and (B) of FIG. 18, the two-dimensional visible information 300A is a synthesis image of the visible information 330A, the visible information 350A, the visible information 370A, and the visible information 390A recorded on the four data layers 330, 350, 370, and 390, respectively. In other words, recorded on the four data layers 330, 350, 370, and 390 are the four pieces of visible information 330A, 350A, 370A, and 390A obtained by decomposing the two-dimensional visible information 300A into four pieces of visible information and thereby allowing synthesis of the four pieces of visible information to result in the two-dimensional visible information 300A.

Here, the visible information 350A and the visible information 390A have no part overlapping with each other, as illustrated in (B) of FIG. 18. In contrast, each of the two pieces of visible information 350A and 390A and the visible information 330A overlap with each other, as illustrated in (B) of FIG. 18. This allows for generation of a blue color as a mixture of the magenta color and the cyan color. In addition, each of the three pieces of visible information 330A, 350A, and 390A and the visible information 370A have no part overlapping with each other, as illustrated in (B) of FIG. 18. Therefore, the blue two-dimensional visible information 300A is generated from: a blue synthesis image that is generated from the three pieces of visible information 330A, 350A, and 390A; and a blue image generated from the visible information 370A.

Here, it is preferable that the blue synthesis image (hereinafter, referred to as a "first image") that is generated by synthesis of the three pieces of visible information 330A, 350A, and 390A and the blue image (hereinafter, referred to as a "second image") generated from the visible information 370A have a small difference in hue that is at least undistinguishable by human eyes. Note that, in a case where an image of the information medium 300 is captured by the imaging device such as the camera, even if the first image and the second image can be separated from the captured image obtained by the imaging, it is not possible to determine that the first image is formed by synthesis of the image formed on the uppermost data layer 330, the image formed on the second uppermost data layer 350, and the image formed on the lowermost data layer 390. Accordingly, even if the imaging device such as the camera is used, the visible information 330A, 350A, 370A, or 390A recorded on the information medium 300 cannot be copied. As described above, it is possible to provide the information medium 300 difficult to forge.

[Modification G]

In Modification F described above, for example, as illustrated in FIG. 19, the information medium 300 may include a data layer 391 instead of the data layer 370. The data layer 391 includes a modulation material having an optical characteristic that is modulatable. The modulation material is, for example, a reversible material that is able to make transition between a colored state and a decolored state in the visible wavelength range. The data layer 391 includes, for example: a leuco dye (a reversible thermosensitive coloring composition) as the reversible material; and a photothermal conversion agent that generates heat upon writing. The data layer 391 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 391 is, for example, bonded with the developer by heat to develop a predetermined color in the visible wavelength range. According to the present modification, the leuco dye included in the data layer 391 develops a magenta color. In addition, the data layer 391 becomes transparent in the visible wavelength range in the decolored state. The photothermal conversion agent absorbs light in a near-infrared range (700 nm to 2500 nm) to generate heat, for example. The photothermal conversion agent included in the data layer 391 has, for example, an absorption peak at a wavelength $\lambda 3$ ($\lambda 3 \ne \lambda 1$, $\lambda 2$, $\lambda 4$, 700 nm$\le \lambda 3 \le$2500 nm). Therefore, the four data layers 330, 350, 390, and 391 are different from one another in the modulation condition of the modulation material (the leuco dye). According to the present modification, the data layer 391 is disposed at a position that is deeper than those of the data layers 330 and 350 when viewed from the cover layer 320 but is shallower than that of the data layer 390 when viewed from the cover layer 320. In this case, the wavelength $\lambda 3$ of the absorption peak of the photothermal conversion agent included in the data layer 391 is longer than the wavelengths λ1 and λ2 of the absorption peaks of the photothermal conversion agents included respectively in the data layers 330 and 350, and is shorter than the wavelength λ4 of the absorption peak of the photothermal conversion agent included in the data layer 390. A reason for this is that, for example, in a case where writing or erasing is performed on the data layer 391 via the data layers 330 and 350 with use of the recording apparatus 500 described later, it is more difficult for a laser beam having the wavelength λ3 to be absorbed by the data layers 330 and 350.

(A) of FIG. 20 is an enlarged view of a part of the two-dimensional visible information 300A that is visually recognized when the information medium 300 in FIG. 20 is viewed from above. (B) of FIG. 20 is a diagram illustrating an example of a cross-sectional configuration of a part corresponding to (A) of FIG. 20 of the information medium 300 illustrated in FIG. 19. Note that, when the information medium 300 in FIG. 19 is viewed from the above, for example, the two-dimensional visible information 300A as illustrated in (A) of FIG. 14 is visually recognized.

The two-dimensional visible information 300A is, for example, a blue two-dimensional visible image. As illustrated in (A) and (B) of FIG. 20, the two-dimensional visible information 300A is a synthesis image of the visible information 330A, the visible information 350A, the visible information 390A, and the visible information 391A recorded on the four data layers 330, 350, 390, and 391, respectively. In other words, recorded on the four data layers 330, 350, 390, and 391 are the four pieces of visible information 330A, 350A, 390A, and 391A obtained by decomposing the two-dimensional visible information 300A into four pieces of visible information and thereby allowing synthesis of the four pieces of visible information to result in the two-dimensional visible information 300A.

Here, the visible information 350A and the visible information 390A have no part overlapping with each other, as illustrated in (B) of FIG. 20. Further, the visible information 330A and the visible information 391A have no part overlapping with each other, as illustrated in (B) of FIG. 20. In contrast, the two pieces of visible information 350A and 390A and the two pieces of visible information 330A and 391A overlap with each other, as illustrated in (B) of FIG. 20. Therefore, the blue two-dimensional visible information 300A is generated from: a cyan synthesis image that is generated from the two pieces of visible information 350A and 390A; and a magenta image generated from the two pieces of visible information 330A and 391A.

As described above, according to the present modification, the cyan synthesis image generated from the two pieces of visible information 350A and 390A and the magenta image generated from the two pieces of visible information 330A and 391A overlap with each other. This allows for generation of a blue color as a mixture of the magenta color and the cyan color. Therefore, in a case where an image of the information medium 300 is captured by an imaging device such as a camera, the captured image obtained by the imaging is the blue two-dimensional visible information 300A. Therefore, the cyan synthesis image generated from the two pieces of visible information 350A and 390A and the magenta image generated from the two pieces of visible information 330A and 391A cannot be generated from the captured image. Accordingly, even if the imaging device such as the camera is used, the visible information 330A, 350A, 390A, or 391A recorded on the information medium 300 cannot be copied. As described above, it is possible to provide the information medium 300 difficult to forge.

[Modification H]

In the third embodiment described above, the single-color two-dimensional visible information 300A is formed on the information medium 300 illustrated in FIG. 13. However, the two-dimensional visible information 300A of three colors (blue, magenta, and cyan) may be formed on the information medium 300 illustrated in FIG. 13.

(A) of FIG. 21 is a diagram illustrating an example of the two-dimensional visible information 300A that is visually recognized when the information medium 300 according to the present modification is viewed from above. (B) of FIG. 21 is an enlarged view of a part of the two-dimensional visible information 300A illustrated in (A) of FIG. 21. (C) of FIG. 21 is a diagram illustrating an example of a cross-sectional configuration of a part corresponding to (B) of FIG. 21 of the information medium 300 illustrated in (A) of FIG. 21.

According to the present modification, as illustrated in (C) of FIG. 21, the visible information 330A and the visible information 350A only partially overlap with each other. Therefore, as illustrated in (B) and (C) of FIG. 21, a blue image (hereinafter, referred to as a "first image") as a mixture of the magenta color and the cyan color is generated at the overlapping parts of the visible information 330A and the visible information 350A. At the non-overlapping parts of the visible information 330A and the visible information 350A, an image of a combination of a magenta image (hereinafter, referred to as a "second image") and a cyan image (hereinafter, referred to as a "third image") is generated.

Here, in a case where an image of the information medium 300 is captured by the imaging device such as the camera, the first image, the second image, and the third image can be separated from the captured image obtained by the imaging. However, is. Any of the first image, the second image, and the third image is not recorded on the two data layers 330 and 350 of the information medium 300. Recorded on the two data layers 330 and 350 of the information medium 300 are the visible information 330A and the visible information 350A different from the first image, the second image, and the third image. Accordingly, even if the imaging device such as the camera is used, the visible information 330A or 350A recorded on the information medium 300 cannot be copied. As described above, it is possible to provide the information medium 300 difficult to forge.

[Modification I]

In Modification E described above, the single-color two-dimensional visible information 300A is formed on the information medium 300 illustrated in FIG. 15. However, the two-dimensional visible information 300A of three colors (blue, magenta, and cyan) may be formed on the information medium 300 illustrated in FIG. 15.

(A) of FIG. 22 is a diagram illustrating an example of the two-dimensional visible information 300A that is visually recognized when the information medium 300 according to the present modification is viewed from above. (B) of FIG. 22 is an enlarged view of a part of the two-dimensional visible information 300A in (A) of FIG. 22. (C) of FIG. 22 is a diagram illustrating an example of a cross-sectional configuration of a part corresponding to (B) of FIG. 22 of the information medium 300 in (A) of FIG. 22.

According to the present modification, as illustrated in (C) of FIG. 22, the visible information 330A and the visible information 350A only partially overlap with each other.

Further, each of the two pieces of visible information 330A and 350A and the visible information 370A have no part overlapping with each other. Therefore, as illustrated in (B) and (C) of FIG. 22, a blue image (hereinafter, referred to as a "first image") as a mixture of the magenta color and the cyan color is generated at the overlapping parts of the visible information 330A and the visible information 350A. At the non-overlapping parts of the visible information 330A and the visible information 350A, an image of a combination of a magenta image (hereinafter, referred to as a "second image") and a cyan image (hereinafter, referred to as a "third image") is generated. Further, a blue image (hereinafter, referred to as a "fourth image") is generated from the visible information 370A.

Here, it is preferable that the first image and the fourth image have a small difference in hue that is at least undistinguishable by human eyes. In this case where an image of the information medium 300 is captured by the imaging device such as the camera, a synthesis image of the first image and the fourth image, the second image, and the third image can be separated from the captured image obtained by the imaging. However, any of the synthesis image of the first image and the fourth image, the second image, and the third image is not recorded on the three data layers 330, 350, and 370 of the information medium 300. Recorded on the three data layers 330, 350, and 370 of the information medium 300 are the visible information 330A, the visible information 350A, and the visible information 370A different from the synthesis image of the first image and the fourth image, the second image, and the third image. Accordingly, even if the imaging device such as the camera is used, the visible information 330A, 350A, or 370A recorded on the information medium 300 cannot be copied. As described above, it is possible to provide the information medium 300 difficult to forge.

Note that, in a case where the first image and the fourth image have a small difference in hue that is distinguishable by human eyes, the visible information 370A recorded on the information medium 300 can be separated from the captured image obtained by the imaging. However, it is not possible to determine which layer of the information medium 300 the visible information 370A is provided in. Accordingly, it is possible to provide the information medium 300 difficult to forge also in this case.

[Modification J]

In Modification F described above, the single-color two-dimensional visible information 300A is formed on the information medium 300 illustrated in FIG. 17. However, the two-dimensional visible information 300A of three colors (blue, magenta, and cyan) may be formed on the information medium 300 illustrated in FIG. 17.

(A) of FIG. 23 is a diagram illustrating an example of the two-dimensional visible information 300A that is visually recognized when the information medium 300 according to the present modification is viewed from above. (B) of FIG. 23 is an enlarged view of a part of the two-dimensional visible information 300A in (A) of FIG. 23. (C) of FIG. 23 is a diagram illustrating an example of a cross-sectional configuration of a part corresponding to (B) of FIG. 23 of the information medium 300 in (A) of FIG. 23.

According to the present modification, as illustrated in (C) of FIG. 23, the visible information 330A and each of the visible information 350A and the visible information 390A only partially overlap with each other. Further, each of the three pieces of visible information 330A, 350A, and 390A and the visible information 370A have no part overlapping with each other. Therefore, as illustrated in (B) and (C) of FIG. 23, a blue image (hereinafter, referred to as a "first image") as a mixture of the magenta color and the cyan color is generated at the overlapping parts of the visible information 330A and each of the visible information 350A and the visible information 390A. At the non-overlapping parts of the visible information 330A and each of the visible information 350A and the visible information 390A, an image of a combination of a magenta image (hereinafter, referred to as a "second image") and a cyan image (hereinafter, referred to as a "third image") is generated. Further, a blue image (hereinafter, referred to as a "fourth image") is generated from the visible information 370A.

Here, it is preferable that the first image and the fourth image have a small difference in hue that is at least undistinguishable by human eyes. In this case where an image of the information medium 300 is captured by the imaging device such as the camera, a synthesis image of the first image and the fourth image, the second image, and the third image can be separated from the captured image obtained by the imaging. However, any of the synthesis image of the first image and the fourth image, the second image, and the third image is not recorded on the four data layers 330, 350, 370, and 390 of the information medium 300. Recorded on the four data layers 330, 350, 370, and 390 of the information medium 300 are the visible information 330A, the visible information 350A, the visible information 370A, and the visible information 390A different from the synthesis image of the first image and the fourth image, the second image, and the third image. Accordingly, even if the imaging device such as the camera is used, the visible information 330A, 350A, 370A, or 390A recorded on the information medium 300 cannot be copied. As described above, it is possible to provide the information medium 300 difficult to forge.

Note that, in a case where the first image and the fourth image have a small difference in hue that is distinguishable by human eyes, the visible information 370A recorded on the information medium 300 can be separated from the captured image obtained by the imaging. However, it is not possible to determine which layer of the information medium 300 the visible information 370A is provided in. Accordingly, it is possible to provide the information medium 300 difficult to forge also in this case.

[Modification K]

In Modification G described above, the single-color two-dimensional visible information 300A is formed on the information medium 300 illustrated in FIG. 19. However, the two-dimensional visible information 300A of three colors (blue, magenta, and cyan) may be formed on the information medium 300 illustrated in FIG. 19.

(A) of FIG. 24 is a diagram illustrating an example of the two-dimensional visible information 300A that is visually recognized when the information medium 300 according to the present modification is viewed from above. (B) of FIG. 24 is an enlarged view of a part of the two-dimensional visible information 300A illustrated in (A) of FIG. 24. (C) of FIG. 24 is a diagram illustrating an example of a cross-sectional configuration of a part corresponding to (B) of FIG. 24 of the information medium 300 illustrated in (A) of FIG. 24.

According to the present modification, as illustrated in (C) of FIG. 24, the pieces of visible information 330A and 391A and the pieces of visible information 350A and 390A only partially overlap with each other. Therefore, as illustrated in (B) and (C) of FIG. 24, a blue image (hereinafter, referred to as a "first image") as a mixture of the magenta color and the cyan color is generated at the overlapping parts of the pieces of visible information 330A and 391A and the pieces of visible information 350A and 390A. At the non-overlapping parts of the pieces of visible information 330A and 391A and the pieces of visible information 350A and 390A, an image of a combination of a magenta image (hereinafter, referred to as a "second image") and a cyan image (hereinafter, referred to as a "third image") is generated.

Here, in a case where an image of the information medium 300 is captured by the imaging device such as the camera, the first image, the second image, and the third image can be separated from the captured image obtained by the imaging. However, any of the first image, the second image, and the third image is not recorded on the four data layers 330, 350, 390, and 391 of the information medium 300. Recorded on the four data layers 330, 350, 390, and 391 of the information medium 300 are the visible information 330A, the visible information 350A, the visible information 390A, and the visible information 391A different from the first image, the second image, and the third image. Accordingly, even if the imaging device such as the camera is used, the visible information 330A, 350A, 390A, or 391A recorded on the information medium 300 cannot be copied. As described above, it is possible to provide the information medium 300 difficult to forge.

7. Fourth Embodiment

[Configuration]

An information medium 400 according to a fourth embodiment of the present disclosure is described. FIG. 25 illustrates an example of a cross-sectional configuration of the information medium 400 according to the present embodiment. For example, as illustrated in FIG. 25, the information medium 400 includes three data layers 430, 450, and 470 on a support base 410. The information medium 400 further includes, for example: an intermediate layer 440 that suppresses interference between the two data layers 430 and 450 adjacent to each other; and an intermediate layer 460 that suppresses interference between the two data layers 450 and 470 adjacent to each other. The information medium 400 further includes, for example, a cover layer 420 that protects the three data layers 430, 450, and 470.

The support base 410 is for supporting the three data layers 430, 450, and 470. It is preferable that the support base 410 include a base having a high reflectance from a viewpoint of improving visibility of visible information (visible images) recorded on the three data layers 430, 450, and 470. Examples of the base having the high reflectance include a white resin film. Note that the support base 410 is not limited to the white resin film. The support base 400 is not particularly limited in color, material, and thickness. The support base 410 may be bonded to some surface. The support base 410 may be flat or curved when the information medium 400 is used.

The cover layer 420 is provided, for example, on an outermost surface of the information medium 400. The cover layer 420 includes, for example, a resin film having a pencil hardness of 2 or more defined by JISS6006. The cover layer 420 may have a function as an ultraviolet protection layer to protect the three data layers 430, 450, and 470. The intermediate layer 440 is provided between the data layer 430 and the data layer 450. The intermediate layer 440 is, for example, a heat insulating layer that suppresses thermal interference between the two data layers 430 and 450 adjacent to each other. The intermediate layer 460 is provided between the data layer 450 and the data layer 470. The intermediate layer 460 is, for example, a heat insulating layer that suppresses thermal interference between the two data layers 450 and 470 adjacent to each other. It is preferable that the heat insulating layer used in the intermediate layers 440 and 460 have a thickness of at least 10 μm. It is preferable that all of the cover layer 420 and the intermediate layers 440 and 460 include a material that is transparent in the visible wavelength range.

The three data layers 430, 450, and 470 include a modulation material having an optical characteristic that is modulatable. The modulation material is, for example, a reversible material that is able to make transition between a colored state and a decolored state in the visible wavelength range. The three data layers 430, 450, and 470 include, for example: a leuco dye (a reversible thermosensitive coloring composition) as the reversible material; and a photothermal conversion agent that generates heat upon writing. A light absorption characteristic of the photothermal conversion agent defines a modulation condition of the modulation material (the leuco dye). The three data layers 430, 450, and 470 each further include, for example, a developer and a polymer.

The leuco dye is bonded with the developer by heat to be in the colored state in the visible wavelength range, or is separated from the developer to be in the decolored state in the visible wavelength range. The leuco dye included in the three data layers 430, 450, and 470 is, for example, bonded with the developer by heat to develop a predetermined color in the visible wavelength range. According to the present embodiment, the leuco dye included in the data layer 430 develops a cyan color, the leuco dye included in the data layer 450 develops a yellow color, and the leuco dye included in the data layer 470 develops a magenta color. In addition, the three data layers 430, 450, and 470 become transparent in the visible wavelength range in the decolored state. The photothermal conversion agent absorbs light in a near-infrared range (700 nm to 2500 nm) to generate heat, for example. Note that, herein, the near-infrared range refers to a wavelength band from 700 nm to 2500 nm. The photothermal conversion agent included in the data layer 430 has, for example, an absorption peak at a wavelength $\lambda 1$ (700 nm≤$\lambda 1$≤2500 nm). The photothermal conversion agent included in the data layer 450 has, for example, an absorption peak at a wavelength $\lambda 2$ ($\lambda 2 \neq \lambda 1$, 700 nm≤$\lambda 2$≤2500 nm). The photothermal conversion agent included in the data layer 470 has, for example, an absorption peak at a wavelength $\lambda 3$ ($\lambda 3 \neq \lambda 1, \lambda 2$, 700 nm≤$\lambda 3$≤2500 nm). Therefore, the three data layers 430, 450, and 470 are different from each other in the modulation condition of the modulation material (the leuco dye). According to the present embodiment, the data layer 470 is disposed at a position deeper than those of the data layers 430 and 450 when viewed from the cover layer 420. In this case, the wavelength $\lambda 3$ of the absorption peak of the photothermal conversion agent included in the data layer 470 is longer than the wavelengths $\lambda 1$ and $\lambda 2$ of the absorption peaks of the photothermal conversion agents included in the data layers 430 and 450. A reason for this is that, for example, in a case where writing or erasing is performed on the data layer 470 via the data layers 430 and 450 with use of the recording apparatus 500 described later, it is more difficult for a laser beam having the wavelength $\lambda 3$ to be absorbed by the data layers 430 and 450.

(A) of FIG. 26 is a diagram illustrating an example of two-dimensional visible information 400A that is visually recognized when the information medium 400 is viewed from above. (B) of FIG. 26 is an enlarged view of a part of the two-dimensional visible information 400A in (A) of FIG. 26. (C) of FIG. 26 is a diagram illustrating an example of a cross-sectional configuration of a part corresponding to (B) of FIG. 26 of the information medium 400 in (A) of FIG. 26.

The two-dimensional visible information 400A is a single-color or multicolor two-dimensional visible image. The possible color of the two-dimensional visible information 400A is, for example, one or more of cyan, yellow, magenta, red, green, and blue. As illustrated in (B) and (C) of FIG. 26, the two-dimensional visible information 400A is a synthesis image of visible information 430A, visible information 450A, and visible information 470A recorded on the three data layers 430, 450, and 470, respectively. In other words, recorded on the three data layers 430, 450, and 470 are the three pieces of visible information 430A, 450A, and 470A obtained by decomposing the two-dimensional visible information 400A into three pieces of visible information and thereby allowing synthesis of the three pieces of visible information to result in the two-dimensional visible information 400A.

Here, at the overlapping parts of the visible information 430A and the visible information 450A, a green color is generated as a mixture of the cyan color and the yellow color. At the overlapping parts of the visible information 430A and the visible information 470A, a blue color is generated as a mixture of the cyan color and the magenta color. At the overlapping parts of the visible information 450A and the visible information 470A, a red color is generated as a mixture of the yellow color and the magenta color. At the overlapping parts of the visible information 430A, the visible information 450A, and the visible information 470A, a black color is generated as a mixture of the cyan color, the yellow color, and the magenta color. At the non-overlapping parts of the visible information 430A, the visible information 450A, and the visible information 470A, mixture of colors does not occur, and the cyan color, the yellow color, or the magenta color is generated.

As described above, according to the present embodiment, the two-dimensional visible information 400A include a mixture of various colors and single colors generated by the three pieces of visible information 430A, 450A, and 470A. Therefore, in a case where an image of the information medium 400 is captured by the imaging device such as the camera, the three pieces of visible information 430A, 450A, and 470A cannot be separated from the captured image. Accordingly, even if the imaging device such as the camera is used, the visible information 430A, 450A, or 470A recorded on the information medium 300 cannot be copied. As described above, it is possible to provide the information medium 400 difficult to forge.

According to the present embodiment, the data layers 430, 450, and 470 each include the modulation material having an optical characteristic that is modulatable, and the modulation of the modulation material causes the visible information 430A, the visible information 450A, and the visible information 470A to be recorded. This makes it possible to write the visible information 430A, 450A, or 470A on the information medium 400, and to erase the written visible information 430A, 450A, or 470A from the information medium 400.

According to the present embodiment, the intermediate layers 440 and 460 are provided. This allows for suppression of the interference between the two data layers 430 and 450 adjacent to each other and suppression of the interference between the two data layers 450 and 470 adjacent to each other. This makes it possible to write the visible information 430A, the visible information 450A, and the visible information 470A on the information medium 400 with high accuracy.

The data layers 430, 450, and 470 according to the present embodiment each have the single color tone in the plane at the time of the color development of the modulation material. The visible information 430A, the visible information 450A, and the visible information 470A recorded on the information medium 400 cannot be copied even if the imaging device such as the camera is used also in such a case. Accordingly, it is possible to provide the information medium 400 difficult to forge.

The data layers 430, 450, and 470 according to the present embodiment are different from each other in the color tone at the time of the color development of the modulation material. The visible information 430A, the visible information 450A, and the visible information 470A recorded on the information medium 400 cannot be copied even if the imaging device such as the camera is used also in such a case. Accordingly, it is possible to provide the information medium 400 difficult to forge.

According to the present embodiment, the data layers 430, 450, and 470 are different from each other in the modulation condition of the modulation material. This makes it possible to record the visible information 430A and the visible information 450A on the data layers 430, 450, and 470 independently of each other.

According to the present embodiment, at least two layers of the data layers 430, 450, and 470 have respective colored parts that partially or fully overlap with each other in a stacking direction. Accordingly, even if the imaging device such as the camera is used, it is possible to prevent the visible information 430A, 450A, or 470A recorded on the information medium 300 from being copied. It is therefore possible to provide the information medium 400 difficult to forge.

[Modification L]

In the fourth embodiment described above, for example, as illustrated in FIG. 27, the information medium 400 may further include an intermediate layer 480 and a data layer 490. In this case, the intermediate layer 480 is provided between the two data layers 470 and 490 adjacent to each other. The intermediate layer 480 is, for example, a heat insulating layer that suppresses thermal interference between the two data layers 470 and 490 adjacent to each other. It is preferable that the heat insulating layer used in the intermediate layer 480 have a thickness of at least 10 μm. It is preferable that the intermediate layer 480 include a material that is transparent in the visible wavelength range.

The data layer 490 includes a modulation material having an optical characteristic that is modulatable. The modulation material is, for example, a reversible material that is able to make transition between a colored state and a decolored state in the visible wavelength range. The data layer 490 includes, for example: a leuco dye (a reversible thermosensitive coloring composition) as the reversible material; and a photothermal conversion agent that generates heat upon writing. The data layer 490 further includes, for example, a developer and a polymer.

The leuco dye is bonded with the developer by heat to be in the colored state in the visible wavelength range, or is separated from the developer to be in the decolored state in the visible wavelength range. The leuco dye included in the data layer 490 is, for example, bonded with the developer by heat to develop a predetermined color in the visible wavelength range. According to the present modification, the leuco dye included in the data layer 490 develops a black color. In addition, the data layer 490 becomes transparent in the visible wavelength range in the decolored state. The photothermal conversion agent absorbs light in a near-infrared range (700 nm to 2500 nm) to generate heat, for example. The photothermal conversion agent included in the data layer 490 has, for example, an absorption peak at a wavelength λ4 (λ4≠λ1, λ2, λ3, 700 nm≤λ4≤2500 nm). Therefore, the four data layers 430, 450, 470, and 490 are different from one another in the modulation condition of the modulation material (the leuco dye). According to the present modification, the data layer 490 is disposed at a position deeper than those of the data layers 430, 450, and 470 when viewed from the cover layer 420. In this case, the wavelength λ4 of the absorption peak of the photothermal conversion agent included in the data layer 490 is longer than the wavelengths λ1, λ2, and λ3 of the absorption peaks of the photothermal conversion agents included respectively in the data layers 430, 450, and 470. A reason for this is that, for example, in a case where writing or erasing is performed on the data layer 490 via the data layers 430, 450, and 470 with use of the recording apparatus 500 described later, it is more difficult for a laser beam having the wavelength λ4 to be absorbed by the data layers 430, 450, and 470.

(A) of FIG. 28 is an enlarged view of a part of the two-dimensional visible information 400A that is visually recognized when the information medium 400 in FIG. 27 is viewed from above. (B) of FIG. 28 is a diagram illustrating an example of a cross-sectional configuration of a part corresponding to (A) of FIG. 28 of the information medium 400 in FIG. 27. Note that, when the information medium 400 in FIG. 27 is viewed from the above, for example, the two-dimensional visible information 400A as illustrated in (A) of FIG. 26 is visually recognized.

The two-dimensional visible information 400A is, for example, a single-color or multicolor two-dimensional visible image. The possible color of the two-dimensional visible information 400A is, for example, one or more of cyan, yellow, magenta, red, green, and blue. As illustrated in (A) and (B) of FIG. 28, the two-dimensional visible information 400A is a synthesis image of visible information 430A, visible information 450A, visible information 470A, and visible information 490A recorded on the four data layers 430, 450, 470, and 490, respectively. In other words, recorded on the four data layers 430, 450, 470, and 490 are the four pieces of visible information 430A, 450A, 470A, and 490A obtained by decomposing the two-dimensional visible information 400A into four pieces of visible information and thereby allowing synthesis of the four pieces of visible information to result in the two-dimensional visible information 400A.

Here, at the overlapping parts of the visible information 430A and the visible information 450A, a green color is generated as a mixture of the cyan color and the yellow color. At the overlapping parts of the visible information 430A and the visible information 470A, a blue color is generated as a mixture of the cyan color and the magenta color. At the overlapping parts of the visible information 450A and the visible information 470A, a red color is generated as a mixture of the yellow color and the magenta color. At the overlapping parts of the visible information 430A, the visible information 450A, and the visible information 470A, a black color is generated as a mixture of the cyan color, the yellow color, and the magenta color. At the non-overlapping parts of the visible information 430A, the visible information 450A, and the visible information 470A, mixture of colors does not occur, and the cyan color, the yellow color, or the magenta color is generated. At a part on which the visible information 490A is formed, a black color is generated.

As described above, according to the present modification, the two-dimensional visible information 400A includes a mixture of various colors and single colors generated by the four pieces of visible information 430A, 450A, 470A, and 490A. Therefore, in a case where an image of the information medium 400 is captured by the imaging device such as the camera, the four pieces of visible information 430A, 450A, 470A, and 490A cannot be separated from the captured image. Accordingly, even if the imaging device such as the camera is used, the visible information 430A, 450A, 470A, or 490A recorded on the information medium 400 cannot be copied. As described above, it is possible to provide the information medium 400 difficult to forge.

9. Fifth Embodiment

[Configuration]
The recording apparatus 500 according to a fifth embodiment of the present disclosure is described. FIG. 29 illustrates an example of a schematic configuration of the recording apparatus 500 according to the present embodiment. The recording apparatus 500 records information on the information medium 100, 200, 300, or 400. The recording apparatus 500 includes, for example, a communication unit 510, an input unit 520, a display unit 530, a storage unit 540, a record 550, and an information processing unit 560. The recording apparatus 500 is coupled to a network via the communication unit 510. The network is, for example, a communication line such as a LAN or WAN. A terminal device is coupled to the network. The recording apparatus 500 is configured to be able to communicate with the terminal device via the network. The terminal device is, for example, a mobile terminal, and is configured to be able to communicate with the recording apparatus 500 via the network.

The communication unit 510 performs communication with an external device such as a terminal device. The communication unit 510 supplies input data received from the external device such as the mobile terminal to the information processing unit 560, for example. The information processing unit 560 stores the input data supplied from the communication unit 510 in the storage unit 540. The input data includes, for example, first information and second information. The first information is, for example, data to be converted into the above-described two-dimensional visible information 100A, 200A, 300A, or 400A by a predetermined encryption algorithm. The second information is, for example, data to be converted into two or more pieces of visible information in accordance with the type of the information medium by a predetermined encryption algorithm. A relationship between the type of the information medium and the pieces of visible information to be converted is as follows, for example.

[Information Medium 100 in FIG. 1]
Two pieces of visible information 130A and 150A
[Information Medium 100 in FIG. 3]
Three pieces of visible information 130A, 150A, and 170A
[Information Medium 100 in FIG. 5]
Four pieces of visible information 130A, 150A, 170A, and 190A
[Information Medium 200 in FIG. 7]
Two pieces of visible information 230A and 250A
[Information Medium 200 in FIG. 9]
Three pieces of visible information 230A, 250A, and 270A

[Information Medium 200 in FIG. 11]
Four pieces of visible information 230A, 250A, 270A, and 290A
[Information Medium 300 in FIG. 13]
Two pieces of visible information 330A and 350A
[Information Medium 300 in FIG. 15]
Three pieces of visible information 330A, 350A, and 370A
[Information Medium 300 in FIG. 17]
Four pieces of visible information 330A, 350A, 370A, and 390A
[Information Medium 300 in FIG. 19]
Four pieces of visible information 330A, 350A, 390A, and 391A
[Information Medium 300 in (A) of FIG. 21]
Two pieces of visible information 330A and 350A
[Information Medium 300 in (A) of FIG. 22]
Three pieces of visible information 330A, 350A, and 370A
[Information Medium 300 in (A) of FIG. 23]
Four pieces of visible information 330A, 350A, 370A, and 390A
[Information Medium 300 in (A) of FIG. 24]
Four pieces of visible information 330A, 350A, 390A, and 391A
[Information Medium 400 in FIG. 25]
Three pieces of visible information 430A, 450A, and 470A
[Information Medium 300 in FIG. 27]
Four pieces of visible information 430A, 450A, 470A, and 490A The input unit 520 accepts input from a user (for example, an execution instruction). The input unit 520 supplies information inputted by the user to the information processing unit 560. The information processing unit 560 executes a predetermined process on the basis of the information supplied from the input unit 520. The display unit 530 performs screen display on the basis of various types of screen data created by the information processing unit 560. The display unit 530 includes, for example, a liquid crystal panel, an organic EL (Electro Luminescence) panel, or the like.

The storage unit 540 holds, for example, a program 541. The program 541 includes, for example, a series of procedures for encrypting the input data to write the input data on the information medium 100, 200, 300, or 400 and a series of procedures for writing the visible information obtained by encrypting the input data on the information medium 100, 200, 300, or 400. Note that a series of procedures executed by the program 541 will be described in detail later.

The storage unit 540 holds, for example, input data 542 and image data 543. The input data 542 is, for example, input data supplied from the communication unit 510. The image data 543 is visible information (visible image) obtained by encryption by the program 541, and is, for example, data in which gradation-level values of respective drawing coordinates are described.

The information processing unit 560 executes, by loading the program 541, the series of procedures for encrypting the input data and the series of procedures for writing the visible information obtained by encryption on the information medium 100, 200, 300, or 400. The information processing unit 560 includes, for example, a CPU (Central Processing Unit) and a GPU (Graphics Processing Unit). Executing of the programs 541 in the information processing unit 560 will be described in detail later.

Next, the recording unit 550 will be described. FIG. 30 illustrates an example of a schematic configuration of the recording unit 550. FIG. 30 illustrates an example of a configuration of the recording unit 550 that performs writing on the information medium 100, 200, or 300 using two-wavelength laser light. The recording unit 550 has, for example, a signal processing circuit 551, a laser drive circuit 552, a light source unit 553, an adjustment mechanism 554, a scanner drive circuit 555, and a scanner unit 556. The recording unit 550 performs recording on each of the data layers by controlling each of the data layers in accordance with the modulation condition of each of the data layers. Specifically, the recording unit 550 controls output of the light source unit 553 on the basis of an output setting value supplied from the information processing unit 560, thereby performing writing on the information medium 100, 200, or 300. The output setting value is, for example, a command voltage value corresponding to the gradation-level value of each drawing coordinate of the image data 543.

The signal processing circuit 551 acquires, as an image signal Din, the output setting value supplied from the information processing unit 560. The signal processing circuit 551 generates, for example, from the image signal Din, a pixel signal Dout corresponding to scanner operation of the scanner unit 556. The pixel signal Dout causes the light source unit 553 to output laser light of power corresponding to the output setting value. The signal processing circuit 551 controls, together with the laser drive circuit 552, a peak value of a current pulse to be applied to the light source unit 553 (light sources 553A and 553B) or the like in accordance with the pixel signal Dout.

The laser drive circuit 552 drives the light sources 553A and 553B of the light source unit 553 in accordance with the pixel signal Dout, for example. The laser drive circuit 552 controls luminance (light and dark) of the laser light to draw an image corresponding to the pixel signal Dout, for example. The laser drive circuit 552 includes, for example, a drive circuit 552A that drives the light source 553A and a drive circuit 552B that drives the light source 553B. The light sources 553A and 553B output the laser light having the power corresponding to the output setting value to the information medium 100, 200, or 300, thereby performing writing on the information medium 100, 200, or 300. The light sources 553A and 553B emit laser light in the near-infrared range. The light source 553A is, for example, a semiconductor laser that emits laser light La having a wavelength λ1. The light source 553B is, for example, a semiconductor laser that emits laser light Lb having a wavelength λ2 (λ2>λ1).

The light source unit 553 has two or more light sources having light-emission wavelengths different from each other in the near-infrared range. The light source unit 553 has, for example, the two light sources 553A and 553B. The light source unit 553 further includes, for example, an optical system that combines laser light emitted from two or more light sources (for example, the two light sources 553A and 553B). The light source unit 553 includes, for example, a reflecting mirror 553a, a dichroic mirror 553b, and a lens 553e, as such an optical system.

Each of the laser light La and the laser light Lb emitted from the two light sources 553A and 553B is made substantially parallel light (collimated light) by a collimating lens, for example. Thereafter, for example, the laser light La is reflected by the reflecting mirror 553a and is reflected by the dichroic mirror 553b, and the laser light Lb passes through the dichroic mirror 553b, whereby the laser light La and the laser light La are combined. Combined light Lm of the laser light La and the laser light La passes through the lens 553e. The light source unit 553 outputs the combined light Lm obtained by combining by the optical system described above to the scanner unit 556, for example.

The adjustment mechanism 554 is a mechanism for adjusting focusing of the light (the combined light Lm) emitted from the light source unit 553. The adjustment mechanism 554 is a mechanism that adjusts a position of the lens 553e by manual operation by the user, for example. Note that the adjustment mechanism 554 may be a mechanism that adjusts the position of the lens 553e by mechanical operation.

The scanner drive circuit 555 drives the scanner unit 556 in synchronization with a projection image clock signal supplied from the signal processing circuit 551, for example. Further, for example, in a case where a signal related to an application angle of a two-axis scanner 556A described later or the like is supplied from the scanner unit 556, the scanner drive circuit 555 drives the scanner unit 556 so that a desired application angle is achieved on the basis of the signal.

The scanner unit 556 performs raster scanning with the light (the combined light Lm) entering from the light source unit 553 on the surface of the information medium 100, 200, or 300, for example. The scanner unit 556 includes, for example, the two-axis scanner 556A and an fθ lens 556B. The two-axis scanner 556A is, for example, a galvano-mirror. The fθ lens 556B converts a constant-velocity rotational motion by the two-axis scanner 556A into a constant-velocity linear motion of a spot moving on a focal plane (the surface of the information medium 100, 200, or 300). Note that the scanner unit 556 may include a one-axis scanner and a fθ lens. In this case, it is preferable that a one-axis stage is provided that displaces the information medium 100, 200, or 300 in a direction perpendicular to a scanning direction of the one-axis scanner.

Next, an example of writing on the information medium 100, 200, or 300 in the recording apparatus 500 will be described.

[Writing]

FIG. 31 illustrates an example of a procedure for writing on the information medium 100, 200, or 300 in the recording apparatus 500. First, the user prepares the information medium 100, 200, or 300 that has not developed any color, and sets it in the recording unit 550. Next, the user instructs, via the input unit 520, the information processing unit 560 to perform writing. Then, the information processing unit 560 converts the first information included in the input data 542 read from the storage unit 540 into the two-dimensional visible information 100A, 200A, or 300A using a predetermined encryption algorithm. The information processing unit 560 thus acquires the two-dimensional visible information 100A, 200A, or 300A (step S101).

Subsequently, the information processing unit 560 converts the second information included in the input data 542 read from the storage unit 540 into two or more visible information in accordance with the above-described correspondence relationship between the type of the information medium and the two or more pieces of visible information. At this time, the information processing unit 560 generates the two or more pieces of visible information by decomposing the two-dimensional visible information 100A, 200A, or 300A into two or more pieces of visible information and thereby allowing synthesis of the two or more pieces of visible information to result in the two-dimensional visible information 100A, 200A, or 300A (step S102).

Next, the information processing unit 560 sets a print condition required for writing the two or more pieces of visible information on the information medium 100, 200, or 300 (step S103). For example, upon performing writing on the information medium 100 in FIG. 1, the information processing unit 560 sets an output setting value for writing the visible information 130A on the data layer 130 by the laser light La emitted from the light source unit 553A, and sets an output setting value for writing the visible information 150A on the data layer 150 by the laser light Lb emitted from the light source unit 553B.

Next, the information processing unit 560 supplies the set print condition (output setting value) to the recording unit 550. As a result, the recording unit 550 records the two or more pieces of visible information on the two or more data layers of the information medium 100, 200, 300, or 400 on the basis of the supplied print condition (step S104). The recording unit 550 performs recording on each of the data layers by controlling each of the data layers in accordance with the modulation condition of each of the data layers.

For example, as illustrated in FIG. 32, the recording unit 550 applies the combined light Lm with respect to the information medium 100 in FIG. 1, and thereby performs writing on the data layer 130 by the laser light La included in the combined light Lm, and performs writing on the data layer 150 by the laser light Lb included in the combined light Lm. Further, for example, as illustrated in FIG. 33, the recording unit 550 applies the combined light Lm with respect to the information medium 200 in FIG. 7, and thereby performs writing on the data layer 230 by the laser light La included in the combined light Lm, and performs writing on the data layer 250 by the laser light Lb included in the combined light Lm.

Further, for example, as illustrated in FIG. 34, the recording unit 550 applies the combined light Lm with respect to the information medium 300 in FIG. 13, and thereby performs writing on the data layer 330 by the laser light La included in the combined light Lm, and performs writing on the data layer 350 by the laser light Lb included in the combined light Lm. Further, for example, as illustrated in FIG. 35, the recording unit 550 applies the combined light Lm with respect to the information medium 300 in FIG. 21, and thereby performs writing on the data layer 330 by the laser light La included in the combined light Lm, and performs writing on the data layer 350 by the laser light Lb included in the combined light Lm.

In this manner, writing on the information medium 100, 200, or 300 in the recording apparatus 500 is performed.

Next, the recording unit 550 capable of emitting three-wavelength laser light will be described. FIG. 36 illustrates an example of a schematic configuration of the recording unit 550. FIG. 36 illustrates an example of a configuration of the recording unit 550 that performs writing on the information medium 100, 200, 300, or 400 using three-wavelength laser light. The recording unit 550 has, for example, a signal processing circuit 551, a laser drive circuit 552, a light source unit 553, an adjustment mechanism 554, a scanner drive circuit 555, and a scanner unit 556. The recording unit 550 controls output of the light source unit 553 on the basis of the output setting value supplied from the information processing unit 560, thereby performing writing on the information medium 100, 200, 300, or 400. The output setting value is, for example, a command voltage value corresponding to the gradation-level value of each drawing coordinate of the image data 543.

The signal processing circuit 551 acquires, as the image signal Din, the output setting value supplied from the information processing unit 560. The signal processing circuit 551 generates, for example, from the image signal Din, a pixel signal Dout corresponding to scanner operation of the scanner unit 556. The pixel signal Dout causes the light source unit 553 to output laser light of power corresponding to the output setting value. The signal processing circuit 551 controls, together with the laser drive circuit 552, a peak value of a current pulse to be applied to the light source unit 553 (light sources 553A, 553B, and 553C) or the like in accordance with the pixel signal Dout.

The laser drive circuit 552 drives the light sources 553A, 553B, and 553C of the light source unit 553 in accordance with the pixel signal Dout, for example. The laser drive circuit 552 controls luminance (light and dark) of the laser light to draw an image corresponding to the pixel signal Dout, for example. The laser drive circuit 552 includes, for example, a drive circuit 552A that drives the light source 553A, a drive circuit 552B that drives the light source 553B, and a drive circuit 552C that drives the light source 553C. The light sources 553A, 553B, and 553C output the laser light having the power corresponding to the output setting value to the information medium 100, 200, 300, or 400, thereby performing writing on the information medium 100, 200, 300, or 400. The light sources 553A, 553B, and 553C emit laser light in the near-infrared range. The light source 553A is, for example, a semiconductor laser that emits laser light La having a wavelength λ1. The light source 553B is, for example, a semiconductor laser that emits laser light Lb having a wavelength λ2 (λ2>λ1). The light source 553C is, for example, a semiconductor laser that emits laser light Lc having a wavelength λ3 (λ3>λ2).

The light source unit 553 has two or more light sources having light-emission wavelengths different from each other in the near-infrared range. The light source unit 553 has, for example, three light sources 553A, 553B, and 553C. The light source unit 553 further includes, for example, an optical system that combines laser light emitted from two or more light sources (for example, the three light sources 553A, 553B, and 553C). The light source unit 553 includes, for example, reflecting mirrors 553a and 553d, dichroic mirrors 553b and 553c, and a lens 553e, as such an optical system.

Each of the laser light La and the laser light Lb emitted from the two light sources 553A and 553B is made substantially parallel light (collimated light) by a collimating lens, for example. Thereafter, for example, the laser light La is reflected by the reflecting mirror 553a and is reflected by the dichroic mirror 553b, and the laser light Lb passes through the dichroic mirror 553b, whereby the laser light La and the laser light La are combined. Combined light of the laser light La and the laser light La passes through the dichroic mirror 553c.

The laser light Lc emitted from the light source 63C is made substantially parallel light (collimated light) by a collimating lens, for example. Thereafter, for example, the laser light Lc is reflected by the reflecting mirror 63d and is reflected by the dichroic mirror 63c, whereby the above-described combined light that has passed through the dichroic mirror 63c and the laser light Lc reflected by the dichroic mirror 63c are combined. The light source unit 553 outputs the combined light Lm obtained by combining by the optical system described above to the scanner unit 556, for example.

The adjustment mechanism 554 is a mechanism for adjusting focusing of the light (the combined light Lm) emitted from the light source unit 553. The adjustment mechanism 554 is a mechanism that adjusts a position of the lens 553e by manual operation by the user, for example. Note that the adjustment mechanism 554 may be a mechanism that adjusts the position of the lens 553e by mechanical operation.

The scanner drive circuit 555 drives the scanner unit 556 in synchronization with a projection image clock signal supplied from the signal processing circuit 551, for example. Further, for example, in a case where a signal related to an application angle of a two-axis scanner 556A or the like is supplied from the scanner unit 556, the scanner drive circuit 555 drives the scanner unit 556 so that a desired application angle is achieved on the basis of the signal.

The scanner unit 556 performs raster scanning with the light (the combined light Lm) entering from the light source unit 553 on the surface of the information medium 100, 200, 300, or 400, for example. The scanner unit 556 includes, for example, the two-axis scanner 556A and an fθ lens 556B. The two-axis scanner 556A is, for example, a galvano-mirror. The fθ lens 556B converts a constant-velocity rotational motion by the two-axis scanner 556A into a constant-velocity linear motion of a spot moving on a focal plane (the surface of the information medium 100, 200, 300, or 400). Note that the scanner unit 556 may include a one-axis scanner and a fθ lens. In this case, it is preferable that the one-axis stage be provided to displace the information medium 100, 200, 300, or 400 in a direction perpendicular to a scanning direction of the one-axis scanner.

Next, an example of writing on the information medium 100, 200, 300, or 400 in the recording apparatus 500 will be described.

[Writing]

First, the user prepares the information medium 100, 200, 300, or 400 that has not developed any color, and sets it in the recording unit 550. Next, the user instructs, via the input unit 520, the information processing unit 560 to perform writing. Then, the information processing unit 560 converts the first information included in the input data 542 read from the storage unit 540 into the two-dimensional visible information 100A, 200A, 300A, or 400A using a predetermined encryption algorithm. The information processing unit 560 thus acquires the two-dimensional visible information 100A, 200A, 300A, or 400A (step S101).

Subsequently, the information processing unit 560 converts the second information included in the input data 542 read from the storage unit 540 into two or more pieces of visible information in accordance with the above-described correspondence relationship between the type of the information medium and the two or more pieces of visible information. At this time, the information processing unit 560 generates the two or more pieces of visible information by decomposing the two-dimensional visible information 100A, 200A, 300A, or 400A into two or more pieces of visible information and thereby allowing synthesis of the two or more pieces of visible information to result in the two-dimensional visible information 100A, 200A, 300A, or 400A (step S102).

Next, the information processing unit 560 sets a print condition required for writing the two or more pieces of visible information on the information medium 100, 200, 300, or 400 (step S103). For example, upon performing writing on the information medium 100 in FIG. 3, the information processing unit 560 sets an output setting value for writing the visible information 130A on the data layer 130 by the laser light La emitted from the light source unit 553A, and sets an output setting value for writing the visible information 150A on the data layer 150 by the laser light Lb emitted from the light source unit 553B. The information processing unit 560 further sets an output setting value for writing the visible information 170A on the data layer 170 by the laser light Lc emitted from the light source unit 553C, for example.

Next, the information processing unit 560 supplies the set print condition (output setting value) to the recording unit 550. As a result, the recording unit 550 records the two or more pieces of visible information on the two or more data layers of the information medium 100, 200, 300, or 400 on the basis of the supplied print condition (output setting value) (step S104).

For example, as illustrated in FIG. 37, the recording unit 550 applies the combined light Lm with respect to the information medium 100 in FIG. 3, and thereby performs writing on the data layer 130 by the laser light La included in the combined light Lm, performs writing on the data layer 150 by the laser light Lb included in the combined light Lm, and further performs writing on the data layer 170 by the laser light Lc included in the combined light Lm. Further, for example, as illustrated in FIG. 38, the recording unit 550 applies the combined light Lm with respect to the information medium 200 in FIG. 9, and thereby performs writing on the data layer 230 by the laser light La included in the combined light Lm, performs writing on the data layer 250 by the laser light Lb included in the combined light Lm, and further performs writing on the data layer 270 by the laser light Lc included in the combined light Lm.

Further, for example, as illustrated in FIG. 39, the recording unit 550 applies the combined light Lm with respect to the information medium 300 in FIG. 15, and thereby performs writing on the data layer 330 by the laser light La included in the combined light Lm, performs writing on the data layer 350 by the laser light Lb included in the combined light Lm, and further performs writing on the data layer 370 by the laser light Lc included in the combined light Lm. Further, for example, as illustrated in FIG. 40, the recording unit 550 applies the combined light Lm with respect to the information medium 300 in FIG. 22, and thereby performs writing on the data layer 330 by the laser light La included in the combined light Lm, performs writing on the data layer 350 by the laser light Lb included in the combined light Lm, and further performs writing on the data layer 370 by the laser light Lc included in the combined light Lm.

Further, for example, as illustrated in FIG. 41, the recording unit 550 applies the combined light Lm with respect to the information medium 400 in FIG. 25, and thereby performs writing on the data layer 430 by the laser light La included in the combined light Lm, performs writing on the data layer 450 by the laser light Lb included in the combined light Lm, and further performs writing on the data layer 470 by the laser light Lc included in the combined light Lm.

In this manner, writing on the information medium 100, 200, 300, or 400 in the recording apparatus 500 is performed.

Next, the recording unit 550 capable of emitting four-wavelength laser light will be described. FIG. 42 illustrates an example of a schematic configuration of the recording unit 550. FIG. 42 illustrates an example of a configuration of the recording unit 550 that performs writing on the information medium 100, 200, 300, or 400 using the four-wavelength laser light. The recording unit 550 has, for example, a signal processing circuit 551, a laser drive circuit 552, a light source unit 553, an adjustment mechanism 554, a scanner drive circuit 555, and a scanner unit 556. The recording unit 550 controls output of the light source unit 553 on the basis of the output setting value supplied from the information processing unit 560, thereby performing writing on the information medium 100, 200, 300, or 400. The output setting value is, for example, a command voltage value corresponding to the gradation-level value of each drawing coordinate of the image data 543.

The signal processing circuit 551 acquires, as the image signal Din, the output setting value supplied from the information processing unit 560. The signal processing circuit 551 generates, for example, from the image signal Din, a pixel signal Dout corresponding to scanner operation of the scanner unit 556. The pixel signal Dout causes the light source unit 553 to output laser light of power corresponding to the output setting value. The signal processing circuit 551 controls, together with the laser drive circuit 552, a peak value of a current pulse to be applied to the light source unit 553 (light sources 553A, 553B, 553C, and 553D) or the like in accordance with the pixel signal Dout.

The laser drive circuit 552 drives the light sources 553A, 553B, 553C, and 553D of the light source unit 553 in accordance with the pixel signal Dout, for example. The laser drive circuit 552 controls luminance (light and dark) of the laser light to draw an image corresponding to the pixel signal Dout, for example. The laser drive circuit 552 includes, for example, a drive circuit 552A that drives the light source 553A, a drive circuit 552B that drives the light source 553B, a drive circuit 552C that drives the light source 553C, and a drive circuit 552D that drives the light source 553D. The light sources 553A, 553B, 553C, and 553D output the laser light having the power corresponding to the output setting value to the information medium 100, 200, 300, or 400, thereby performing writing on the information medium 100, 200, 300, or 400. The light sources 553A, 553B, 553C, and 553D emit laser light in the near-infrared range. The light source 553A is, for example, a semiconductor laser that emits laser light La having a wavelength $\lambda 1$. The light source 553B is, for example, a semiconductor laser that emits laser light Lb having a wavelength $\lambda 2$ ($\lambda 2 > \lambda 1$). The light source 553C is, for example, a semiconductor laser that emits laser light Lc having a wavelength $\lambda 3$ ($\lambda 3 > \lambda 2$). The light source 553D is, for example, a semiconductor laser that emits laser light Ld having a wavelength $\lambda 4$ ($\lambda 4 > \lambda 3$).

The light source unit 553 has two or more light sources having light-emission wavelengths different from each other in the near-infrared range. The light source unit 553 has, for example, four light sources 553A, 553B, 553C, and 553D. The light source unit 553 further includes, for example, an optical system that combines laser light emitted from two or more light sources (for example, the four light sources 553A, 553B, 553C, and 553D). The light source unit 553 includes, for example, reflecting mirrors 553a and 553f, dichroic mirrors 553b, 553c, and 553g, and a lens 553e, as such an optical system.

Each of the laser light La and the laser light Lb emitted from the two light sources 553A and 553B is made substantially parallel light (collimated light) by a collimating lens, for example. Thereafter, for example, the laser light La is reflected by the reflecting mirror 553a and is reflected by the dichroic mirror 553b, and the laser light Lb passes through the dichroic mirror 553b, whereby the laser light La and the laser light La are combined. The combined light of the laser light La and the laser light La passes through the dichroic mirror 553c.

The laser light Lc and the laser light Ld emitted from the two light sources 553C and 553D are each made substantially parallel light (collimated light) by a collimating lens, for example. Thereafter, for example, the laser light Ld is reflected by the reflecting mirror 553g, passes through the dichroic mirror 553f, and is further reflected by the dichroic mirror 553c. The laser light Lc is reflected by the dichroic mirror 553f and is reflected by the dichroic mirror 553c. Thereby, the laser light Lc and the laser light Ld are combined. The light source unit 553 outputs the combined light Lm obtained by combining by the optical system described above to the scanner unit 556, for example.

The adjustment mechanism 554 is a mechanism for adjusting focusing of the light (the combined light Lm) emitted from the light source unit 553. The adjustment mechanism 554 is a mechanism that adjusts a position of the lens 553e by manual operation by the user, for example. Note that the adjustment mechanism 554 may be a mechanism that adjusts the position of the lens 553e by mechanical operation.

The scanner drive circuit 555 drives the scanner unit 556 in synchronization with a projection image clock signal supplied from the signal processing circuit 551, for example. Further, for example, in a case where a signal related to an application angle of a two-axis scanner 556A or the like is supplied from the scanner unit 556, the scanner drive circuit 555 drives the scanner unit 556 so that a desired application angle is achieved on the basis of the signal.

The scanner unit 556 performs raster scanning with the light (the combined light Lm) entering from the light source unit 553 on the surface of the information medium 100, 200, 300, or 400, for example. The scanner unit 556 includes, for example, the two-axis scanner 556A and an fθ lens 556B. The two-axis scanner 556A is, for example, a galvanomirror. The fθ lens 556B converts a constant-velocity rotational motion by the two-axis scanner 556A into a constant-velocity linear motion of a spot moving on a focal plane (the surface of the information medium 100, 200, 300, or 400). Note that the scanner unit 556 may include a one-axis scanner and a fθ lens. In this case, it is preferable that the one-axis stage be provided that displaces the information medium 100, 200, 300, or 400 in a direction perpendicular to a scanning direction of the one-axis scanner.

Next, an example of writing on the information medium 100, 200, 300, or 400 in the recording apparatus 500 will be described.

[Writing]

First, the user prepares the information medium 100, 200, 300, or 400 that has not developed any color, and sets it in the recording unit 550. Next, the user instructs, via the input unit 520, the information processing unit 560 to perform writing. Then, the information processing unit 560 converts the first information included in the input data 542 read from the storage unit 540 into the two-dimensional visible information 100A, 200A, 300A, or 400A using a predetermined encryption algorithm. The information processing unit 560 thus acquires the two-dimensional visible information 100A, 200A, 300A, or 400A (step S101).

Subsequently, the information processing unit 560 converts the second information included in the input data 542 read from the storage unit 540 into two or more pieces of visible information in accordance with the above-described correspondence relationship between the type of the information medium and the two or more pieces of visible information. At this time, the information processing unit 560 generates the two or more pieces of visible information by decomposing the two-dimensional visible information 100A, 200A, 300A, or 400A into two or more pieces of visible information and thereby allowing synthesis of the two or more pieces of visible information to result in the two-dimensional visible information 100A, 200A, 300A, or 400A (step S102).

Next, the information processing unit 560 sets a print condition required for writing the two or more pieces of visible information on the information medium 100, 200, 300, or 400 (step S103). For example, upon performing writing on the information medium 100 in FIG. 5, the information processing unit 560 sets an output setting value for writing the visible information 130A on the data layer 130 by the laser light La emitted from the light source unit 553A, and sets an output setting value for writing the visible information 150A on the data layer 150 by the laser light Lb emitted from the light source unit 553B. Further, the information processing unit 560 sets an output setting value for writing the visible information 170A on the data layer 170 by the laser light Lc emitted from the light source unit 553C, and sets an output setting value for writing the visible information 190A on the data layer 190 by the laser light Ld emitted from the light source unit 553D, for example.

Next, the information processing unit 560 supplies the set print condition (output setting value) to the recording unit 550. As a result, the recording unit 550 records the two or more pieces of visible information on the two or more data layers of the information medium 100, 200, 300, or 400 on the basis of the supplied print condition (output setting value) (step S104).

For example, as illustrated in FIG. 43, the recording unit 550 applies the combined light Lm with respect to the information medium 100 in FIG. 5, and thereby performs writing on the data layer 130 by the laser light La included in the combined light Lm, performs writing on the data layer 150 by the laser light Lb included in the combined light Lm, further performs writing on the data layer 170 by the laser light Lc included in the combined light Lm, and performs writing on the data layer 190 by the laser light Ld included in the combined light Lm. Further, for example, as illustrated in FIG. 44, the recording unit 550 applies the combined light Lm with respect to the information medium 200 in FIG. 11, and thereby performs writing on the data layer 230 by the laser light La included in the combined light Lm, performs writing on the data layer 250 by the laser light Lb included in the combined light Lm, further performs writing on the data layer 270 by the laser light Lc included in the combined light Lm, and further performs writing on the data layer 290 by the laser light Ld included in the combined light Lm.

Further, for example, as illustrated in FIG. 45, the recording unit 550 applies the combined light Lm with respect to the information medium 300 in FIG. 17, and thereby performs writing on the data layer 330 by the laser light La included in the combined light Lm, performs writing on the data layer 350 by the laser light Lb included in the combined light Lm, further performs writing on the data layer 370 by the laser light Lc included in the combined light Lm, and further performs writing on the data layer 390 by the laser light Ld included in the combined light Lm. Further, for example, as illustrated in FIG. 46, the recording unit 550 applies the combined light Lm with respect to the information medium 300 in FIG. 19, and thereby performs writing on the data layer 330 by the laser light La included in the combined light Lm, performs writing on the data layer 350 by the laser light Lb included in the combined light Lm, further performs writing on the data layer 391 by the laser light Lc included in the combined light Lm, and performs writing on the data layer 390 by the laser light Ld included in the combined light Lm.

Further, for example, as illustrated in FIG. 47, the recording unit 550 applies the combined light Lm with respect to the information medium 300 in FIG. 23, and thereby performs writing on the data layer 330 by the laser light La included in the combined light Lm, performs writing on the data layer 350 by the laser light Lb included in the combined light Lm, further performs writing on the data layer 370 by the laser light Lc included in the combined light Lm, and performs writing on the data layer 390 by the laser light Ld included in the combined light Lm. Further, for example, as illustrated in FIG. 48, the recording unit 550 applies the combined light Lm with respect to the information medium 300 in FIG. 24, and thereby performs writing on the data layer 330 by the laser light La included in the combined light Lm, performs writing on the data layer 350 by the laser light Lb included in the combined light Lm, further performs writing on the data layer 391 by the laser light Lc included in the combined light Lm, and performs writing on the data layer 390 by the laser light Ld included in the combined light Lm.

Further, for example, as illustrated in FIG. 49, the recording unit 550 applies the combined light Lm with respect to the information medium 400 in FIG. 27, and thereby performs writing on the data layer 430 by the laser light La included in the combined light Lm, performs writing on the data layer 450 by the laser light Lb included in the combined light Lm, further performs writing on the data layer 470 by the laser light Lc included in the combined light Lm, and performs writing on the data layer 490 by the laser light Ld included in the combined light Lm.

In this manner, writing on the information medium 100, 200, 300, or 400 in the recording apparatus 500 is performed.

In the present embodiment, in the recording apparatus 500, for example, the two pieces of visible information 130A and 150A are generated by decomposing the two-dimensional visible information 100A into two pieces of visible information and thereby allowing synthesis of the two pieces of visible information to result in the two-dimensional visible information 100A. Further, the two pieces of visible information 130A and 150A thus generated are recorded on the two data layers 130 and 150. Thus, even if an imaging device such as a camera is used, it is possible to prevent the pieces of visible information 130A and 150A recorded on the information medium 100 from being copied. Accordingly, it is possible to provide the information medium 100 difficult to forge.

Further, in the present embodiment, in the recording apparatus 500, for example, the two pieces of visible information 230A and 250A are generated by decomposing the two-dimensional visible information 200A into two pieces of visible information and thereby allowing synthesis of the two pieces of visible information to result in the two-dimensional visible information 200A. Further, the two pieces of visible information 230A and 250A thus generated are recorded on the two the data layers 230 and 250. Thus, even if an imaging device such as a camera is used, it is possible to prevent the pieces of visible information 230A and 250A recorded on the information medium 200 from being copied. Accordingly, it is possible to provide the information medium 200 difficult to forge.

Further, in the present embodiment, in the recording apparatus 500, for example, the two pieces of visible information 330A and 350A are generated by decomposing the two-dimensional visible information 300A into two pieces of visible information and thereby allowing synthesis of the two pieces of visible information to result in the two-dimensional visible information 300A. Further, the two pieces of visible information 330A and 350A thus generated are recorded on the two data layers 330 and 350. Thus, even if an imaging device such as a camera is used, it is possible to prevent the pieces of visible information 330A and 350A recorded on the information medium 300 from being copied. Accordingly, it is possible to provide the information medium 300 difficult to forge.

Further, in the present embodiment, in the recording apparatus 500, for example, the two pieces of visible information 430A and 450A are generated by decomposing the two-dimensional visible information 400A into two pieces of visible information and thereby allowing synthesis of the two pieces of visible information to result in the two-dimensional visible information 400A. Further, the two pieces of visible information 430A and 450A thus generated are recorded on the two data layers 430 and 450. Thus, even if an imaging device such as a camera is used, it is possible to prevent the pieces of visible information 430A and 450A recorded on the information medium 400 from being copied. Accordingly, it is possible to provide the information medium 400 difficult to forge.

Moreover, in the present embodiment, the first information is converted into the two-dimensional visible information 100, 200, 300, or 400, and the second information is converted into two or more pieces of visible information. As a result, the second information can be prevented from being read from the two-dimensional visible information 100, 200, 300, or 400 even if an imaging device such as a camera is used. Therefore, it is possible to prevent the second information from being read from the two-dimensional visible information 100, 200, 300, or 400 by setting information, which is troublesome when the information is copied, to the second information.

Moreover, in the present embodiment, recording is performed on each of the data layers 130A and 150A by controlling each of the data layers 130A and 150A in accordance with the modulation condition of each of the data layers 130A and 150A. As a result, it is possible to write the visible information 130A and 150A on the information medium 100 with high accuracy.

Moreover, in the present embodiment, recording is performed on each of the data layers 230A and 250A by controlling each of the data layers 230A and 250A in accordance with the modulation condition of each of the data layers 230A and 250A. As a result, it is possible to write the visible information 230A and 250A on the information medium 200 with high accuracy.

Moreover, in the present embodiment, by controlling each of the data layers 330A and 350A in accordance with the modulation condition of each of the data layers 330A and 350A, recording on each of the data layers 330A and 350A is performed. As a result, it is possible to write the visible information 330A and 350A on the information medium 300 with high accuracy.

Moreover, in the present embodiment, by controlling each of the data layers 430A and 450A in accordance with the modulation condition of each of the data layers 430A and 450A, recording on each of the data layers 430A and 450A is performed. As a result, it is possible to write the visible information 430A and 450A on the information medium 400 with high accuracy.

10. Sixth Embodiment

[Configuration]

A reading apparatus 600 according to a sixth embodiment of the present disclosure is described. FIG. 50 illustrates a schematic configuration example of the reading apparatus 600 according to the present embodiment. The reading apparatus 600 reads information from the information medium 100, 200, 300, or 400. The reading apparatus 600 includes, for example, a communication unit 610, an input unit 620, a display unit 630, a storage unit 640, a two-dimensional scanner unit 650, a three-dimensional scanner 66, and an information processing unit 670. The reading apparatus 600 is coupled to a network via the communication unit 610. The network is, for example, a communication line such as a LAN or WAN. A terminal device is coupled to the network. The reading apparatus 600 is configured to be able to communicate with the terminal device via the network. The terminal device is, for example, a mobile terminal, and is configured to be able to communicate with the reading apparatus 600 via the network.

The communication unit 610 performs communication with an external device such as a terminal device. The communication unit 610 transmits, as output data, information (for example, the above-described first information or the above-described second information) read from the information medium 100, 200, 300, or 400 to the external device such as the mobile terminal, for example. Here, in a case where the external device such as the mobile terminal is not authorized to acquire the above-described second information, the information processing unit 670 transmits only the above-described first information as the output data to the external device such as the mobile terminal via the communication unit 610. In contrast, in a case where the external device such as the mobile terminal is authorized to acquire the above-described second information, the information processing unit 670 transmits the above-described first information and the above-described second information as the output data to the external device such as the mobile terminal via the communication unit 610.

The input unit 620 accepts input (for example, an execution instruction) from a user. The input unit 620 supplies information inputted by the user to the information processing unit 670. The information processing unit 670 executes a predetermined process on the basis of the information supplied from the input unit 620. The display unit 630 performs screen display on the basis of various types of screen data created by the information processing unit 670. The display unit 630 includes, for example, a liquid crystal panel, an organic EL panel, or the like.

The storage unit 640 holds, for example, a program 641. The program 641 includes, for example, a series of procedures for reading information from the information medium 100, 200, 300, or 400, a series of procedures for decoding the read information, and a series of procedures for transmitting the information obtained by decoding to the external device such as the mobile terminal. Note that a series of procedures executed by the program 641 will be described in detail later.

The information processing unit 670 executes, by loading the program 641, the series of procedures for reading information from the information medium 100, 200, 300, or 400, the series of procedures for decoding the read information, and the series of procedures for transmitting the information obtained by the decoding to the external device such as the mobile terminal. The information processing unit 670 includes, for example, a CPU and a GPU. Executing of the program 641 in the information processing unit 670 will be described in detail later.

The two-dimensional scanner unit 650 performs measurement in response to a measurement command from the information processing unit 670. The two-dimensional scanner unit 650 acquires the two-dimensional visible information 100A, 200A, 300A, or 400A visually recognized on a surface of the information medium 100, 200, 300, or 400 by measuring the surface of the information medium 100, 200, 300, or 400, for example. The two-dimensional scanner unit 650 supplies the obtained two-dimensional visible information 100A, 200A, 300A, or 400A to the information processing unit 670. The information processing unit 670 acquires the above-described first information by decoding the two-dimensional visible information 100A, 200A, 300A, or 400A supplied from the two-dimensional scanner unit 650 by a predetermined decoding algorithm.

The three-dimensional scanner 660 performs measurement in response to a measurement command from the information processing unit 670. The three-dimensional scanner 660 acquires three-dimensional position information of the two or more pieces of visible information recorded on the two or more data layers existing in the information medium 100, 200, 300, or 400 by performing measurement of a depth difference or a reflectance difference with respect to the two or more data layers existing in the information medium 100, 200, 300, or 400, for example. The three-dimensional scanner 660 supplies the acquired three-dimensional position information to the information processing unit 670. On the basis of the three-dimensional position information supplied from the three-dimensional scanner 660, the information processing unit 670 acquires two or more pieces of visible information (hereinafter, referred to as "two or more pieces of visible information Dx") which do not have hue information but are provided with depth information.

Next, an example of reading information from the information medium 100, 200, or 300 in the reading apparatus 600 will be described.

[Reading]

FIG. 51 illustrates an example of a procedure of reading information from the information medium 100, 200, or 300 in the reading apparatus 600. First, the user prepares the information medium 100, 200, 300, or 400 in the colored state, and sets it in the two-dimensional scanner unit 650. Next, the user instructs, via the input unit 620, the information processing unit 670 to perform reading. The information processing unit 670 instructs the two-dimensional scanner unit 650 to perform reading. Then, the two-dimensional scanner unit 650 acquires the two-dimensional visible information 100A, 200A, 300A, or 400A visually recognized on the surface of the information medium 100, 200, 300, or 400 by measuring the surface of the information medium 100, 200, 300, or 400. The two-dimensional scanner unit 650 supplies the obtained two-dimensional visible information 100A, 200A, 300A, or 400A to the information processing unit 670. In this way, the information processing unit 670 acquires the two-dimensional visible information 100A, 200A, 300A, or 400A (step S201). Subsequently, the information processing unit 670 detects hue information from the obtained two-dimensional visible information 100A, 200A, 300A, or 400A (step S202).

Next, the information processing unit 670 requests, via the display unit 630, that the information medium 100, 200, 300, or 400 be set in the three-dimensional scanner 660, for example. In response to the request, the user sets the information medium 100, 200, 300, or 400 in the three-dimensional scanner 660. Thereafter, the user instructs, via the input unit 620, the information processing unit 670 to perform reading. The information processing unit 670 instructs the three-dimensional scanner 660 to perform reading. Then, the three-dimensional scanner 660 acquires the three-dimensional position information of the two or more pieces of visible information recorded on the two or more data layers existing in the information medium 100, 200, 300, or 400 by performing measurement of a depth difference or a reflectance difference with respect to the two or more data layers existing in the information medium 100, 200, 300, or 400. The three-dimensional scanner 660 supplies the acquired three-dimensional position information to the information processing unit 670. In this manner, the information processing unit 670 acquires the three-dimensional position information (step S203).

Next, the information processing unit 670 acquires the two or more pieces of visible information Dx on the basis of the three-dimensional position information supplied from the three-dimensional scanner 660. Thereafter, the information processing unit 670 generates the two or more pieces of visible information recorded on the two or more data layers existing in the information medium 100, 200, 300, or 400 on the basis of the two or more pieces of acquired visible information Dx and the hue information obtained from the two-dimensional visible information 100A, 200A, 300A, or 400A (step S204). At this time, depth information is also added to the two or more pieces of visible information. Next, the information processing unit 670 decodes the two-dimensional visible information 100A, 200A, 300A, or 400A by a predetermined decoding algorithm to generate the above-described first information (step S205). Further, the information processing unit 670 generates the above-described second information by decoding the two or more pieces of visible information, to which the depth information is added, by a predetermined decoding algorithm (step S206). In this way, the above-described first information and the above-described second information are read from the information medium 100, 200, 300, or 400. The information processing unit 670 supplies the generated first information described above and the generated second information described above to the communication unit 610.

Note that, in a case where the external device such as the mobile terminal is not authorized to acquire the above-described second information, the information processing unit 670 does not execute the above-described step S206 or does not supply the above-described second information to the communication unit 610.

Incidentally, in a case where the visible information as illustrated in FIG. 52 is recorded on the information medium 100 in FIG. 1, the two-dimensional scanner unit 650 acquires the two-dimensional visible information 100A as described in a middle part of FIG. 52. The two-dimensional visible information 100A has a gradation-level value of black at coordinates corresponding to a black-colored part in the data layers 130 and 150, and has a gradation-level value of white at coordinates corresponding to other parts. At this time, the hue information is, for example, a gradation-level value similar to that of the two-dimensional visible information 100A.

Further, in a case where the visible information illustrated in FIG. 52 is recorded on the information medium 100 in FIG. 1, the three-dimensional scanner 660 acquires the three-dimensional position information 100B illustrated in an upper part of FIG. 52. The three-dimensional position information 100B has a value D1 corresponding to the depth of the data layer 130 at coordinates corresponding to the black-colored part in the data layer 130, and has a value D2 corresponding to the depth of the data layer 150 at coordinates corresponding to the black-colored part in the data layer 150. Further, the three-dimensional position information 100B has a value Dw corresponding to the depth of the support base 110 at coordinates corresponding to other parts.

Further, in a case where the visible information as illustrated in FIG. 53 is recorded on the information medium 200 in FIG. 7, the two-dimensional scanner unit 650 acquires the two-dimensional visible information 200A as described in a middle part of FIG. 53. The two-dimensional visible information 200A has a gradation-level value of blue at coordinates corresponding to a blue-colored part of the data layers 230 and 250, and has a gradation-level value of white at coordinates corresponding to other parts. At this time, the hue information is, for example, a gradation-level value similar to that of the two-dimensional visible information 200A.

Further, in a case where the visible information as illustrated in FIG. 53 is recorded on the information medium 200 in FIG. 7, the three-dimensional scanner 660 acquires the three-dimensional position information 200B as described in an upper part of FIG. 53. The three-dimensional position information 200B has a value D1 corresponding to the depth of the data layer 230 at coordinates corresponding to the blue-colored part of the data layer 230, and has a value D2 corresponding to the depth of the data layer 250 at coordinates corresponding to the blue-colored part in the data layer 250. Further, the three-dimensional position information 200B has a value Dw corresponding to the depth of the support base 210 at coordinates corresponding to other parts.

Further, in a case where the visible information as illustrated in FIG. 54 is recorded on the information medium 300 in FIG. 13, the two-dimensional scanner unit 650 acquires the two-dimensional visible information 300A as described in a middle part of FIG. 54. The two-dimensional visible information 300A has a gradation-level value of blue at coordinates corresponding to a colored part in the data layers 330 and 350, and has a gradation-level value of white at coordinates corresponding to other parts. At this time, the hue information is, for example, a gradation-level value similar to that of the two-dimensional visible information 300A.

Further, in a case where the visible information illustrated in FIG. 54 is recorded on the information medium 300 in FIG. 13, the three-dimensional scanner 660 acquires the three-dimensional position information 300B illustrated in an upper part of FIG. 54. The three-dimensional position information 300B has a value D1 corresponding to the depth of the data layer 330 at coordinates corresponding to the colored part in the data layers 330 and 350, and has a value Dw corresponding to the depth of the support base 310 at coordinates corresponding to other parts.

Further, in a case where the visible information as illustrated in FIG. 55 is recorded on the information medium 300 in FIG. 21, the two-dimensional scanner unit 650 acquires the two-dimensional visible information 300A as described in a middle part of FIG. 55. The two-dimensional visible information 300A has a gradation-level value of blue at coordinates corresponding to parts opposing each other of a magenta-colored part in the data layer 330 and a cyan-colored part in the data layer 350. Further, the two-dimensional visible information 300A has a gradation-level value of magenta at coordinates corresponding to parts opposing each other of a magenta-colored part in the data layer 330 and a non-cyan-colored part (i.e., a part without color development) in the data layer 350. Further, the two-dimensional visible information 300A has a gradation-level value of cyan at coordinates corresponding to parts opposing each other of a cyan-colored part in the data layer 350 and a non-magenta-colored part (i.e., a part without color development) in the data layer 330. Further, the two-dimensional visible information 300A has a gradation-level value of white at coordinates corresponding to other parts. At this time, the hue information is, for example, a gradation-level value similar to that of the two-dimensional visible information 100A.

Further, in a case where the visible information as illustrated in FIG. 55 is recorded on the information medium 300 in FIG. 21, the three-dimensional scanner 660 acquires the three-dimensional position information 300B illustrated in an upper part of FIG. 55. The three-dimensional position information 300B has a value D1 corresponding to the depth of the data layer 330 at coordinates corresponding to a magenta-colored part in the data layer 330, and has a value D2 corresponding to the depth of the data layer 350 at coordinates corresponding to parts opposing each other of a cyan-colored part in the data layer 350 and a non-magenta-colored part (i.e., a part without color development) in the data layer 330. Further, the three-dimensional position information 300B has a value Dw corresponding to the depth of the support base 310 at coordinates corresponding to other parts.

Further, in a case the visible information as illustrated in FIG. 56 is recorded on the information medium 100 in FIG. 3, the two-dimensional scanner unit 650 acquires the two-dimensional visible information 100A as illustrated in a middle part of FIG. 56. The two-dimensional visible information 100A has a gradation-level value of black at coordinates corresponding to a black-colored part in the data layers 130, 150, and 170, and has a gradation-level value of white at coordinates corresponding to other parts. At this time, the hue information is, for example, a gradation-level value similar to that of the two-dimensional visible information 100A.

Further, in a case where the visible information as illustrated in FIG. 56 is recorded on the information medium 100 in FIG. 3, the three-dimensional scanner 660 acquires the three-dimensional position information 100B illustrated in an upper part of FIG. 56. The three-dimensional position information 100B has a value D1 corresponding to the depth of the data layer 130 at coordinates corresponding to a black-colored part in the data layer 130, and has a value D2 corresponding to the depth of the data layer 150 at coordinates corresponding to a black-colored part in the data layer 150. Further, the three-dimensional position information 100B has a value D3 corresponding to the depth of the data layer 170 at coordinates corresponding to a black-colored part in the data layer 170. The three-dimensional position information 100B has a value Dw corresponding to the depth of the support base 110 at coordinates corresponding to other parts.

Further, in a case where the visible information as illustrated in FIG. 57 is recorded on the information medium 200 in FIG. 9, the two-dimensional scanner unit 650 acquires the two-dimensional visible information 200A as illustrated in a middle part of FIG. 57. The two-dimensional visible information 200A has a gradation-level value of blue at coordinates corresponding to a blue-colored part in the data layers 230, 250, and 270, and has a gradation-level value of white at coordinates corresponding to other parts. At this time, the hue information is, for example, a gradation-level value similar to that of the two-dimensional visible information 200A.

Further, in a case where the visible information as illustrated in FIG. 57 is recorded on the information medium 200 in FIG. 9, the three-dimensional scanner 660 acquires the three-dimensional position information 200B as illustrated in an upper part of FIG. 57. The three-dimensional position information 200B has a value D1 corresponding to the depth of the data layer 230 at coordinates corresponding to a blue-colored part in the data layer 230, and has a value D2 corresponding to the depth of the data layer 250 at coordinates corresponding to a blue-colored part in the data layer 250. Further, the three-dimensional position information 200B has a value D3 corresponding to the depth of the data layer 270 at coordinates corresponding to a blue-colored part in the data layer 270. Further, the three-dimensional position information 200B has a value Dw corresponding to the depth of the support base 210 at coordinates corresponding to other parts.

Further, in a case where the visible information as illustrated in FIG. 58 is recorded on the information medium 300 in FIG. 15, the two-dimensional scanner unit 650 acquires the two-dimensional visible information 300A as illustrated in a middle part of FIG. 58. The two-dimensional visible information 300A has a gradation-level value of blue at coordinates corresponding to parts opposing each other of a magenta-colored part in the data layer 330 and a cyan-colored part in the data layer 350. Further, the two-dimensional visible information 300A has a gradation-level value of blue at coordinates corresponding to a blue-colored part in the data layer 370. Further, the two-dimensional visible information 300A has a gradation-level value of white at coordinates corresponding to other parts. At this time, the hue information is, for example, a gradation-level value similar to that of the two-dimensional visible information 300A.

Further, in a case where the visible information as illustrated in FIG. 58 is recorded on the information medium 300 in FIG. 15, the three-dimensional scanner 660 acquires the three-dimensional position information 300B illustrated in an upper part of FIG. 58. The three-dimensional position information 300B has a value D1 corresponding to the depth of the data layer 330 at coordinates corresponding to the magenta-colored part in the data layer 330, and has a value D3 corresponding to the depth of the data layer 370 at coordinates corresponding to a blue-colored part in the data layer 370. Further, the three-dimensional position information 300B has a value Dw corresponding to the depth of the support base 310 at coordinates corresponding to other parts.

Further, in a case where the visible information as illustrated in FIG. 59 is recorded on the information medium 300 in FIG. 22, the two-dimensional scanner unit 650 acquires the two-dimensional visible information 300A as illustrated in a middle part of FIG. 59. The two-dimensional visible information 300A has a gradation-level value of blue at coordinates corresponding to parts opposing each other of a magenta-colored part in the data layer 330 and a cyan-colored part in the data layer 350. Further, the two-dimensional visible information 300A has a gradation-level value of blue at coordinates corresponding to a blue-colored part in the data layer 370. Further, the two-dimensional visible information 300A has a gradation-level value of magenta at coordinates corresponding to parts opposing each other of a magenta-colored part in the data layer 330 and a non-cyan-colored part (i.e., a part without color development) in the data layer 350. Further, the two-dimensional visible information 300A has a gradation-level value of cyan at coordinates corresponding to parts opposing each other of a cyan-colored part in the data layer 350 and a non-magenta-colored part (i.e., a part without color development) in the data layer 330. Further, the two-dimensional visible information 300A has a gradation-level value of white at coordinates corresponding to other parts. At this time, the hue information is, for example, a gradation-level value similar to that of the two-dimensional visible information 300A.

Further, in a case where the visible information illustrated in FIG. 59 is recorded on the information medium 300 in FIG. 22, the three-dimensional scanner 660 acquires the three-dimensional position information 300B as illustrated in an upper part of FIG. 59. The three-dimensional position information 300B has a value D1 corresponding to the depth of the data layer 330 at coordinates corresponding to a magenta-colored part in the data layer 330, and has a value D2 corresponding to the depth of the data layer 350 at coordinates corresponding to parts opposing each other of a cyan-colored part in the data layer 350 and a non-magenta-colored part (i.e., a part without color development) in the data layer 330. The three-dimensional position information 300B has a value D3 corresponding to the depth of the data layer 370 at coordinates corresponding to a blue-colored part in the data layer 370. Further, the three-dimensional position information 300B has a value Dw corresponding to the depth of the support base 310 at coordinates corresponding to other parts.

Further, in a case where the visible information as illustrated in FIG. 60 is recorded on the information medium 400 in FIG. 25, the two-dimensional scanner unit 650 acquires the two-dimensional visible information 400A as illustrated in a middle part of FIG. 60. The two-dimensional visible information 400A has a gradation-level value of black at coordinates corresponding to parts opposing each other of a cyan-colored part in the data layer 430, a yellow-colored part in the data layer 450, and a magenta-colored part in the data layer 470. Further, the two-dimensional visible information 400A has a gradation-level value of green at coordinates corresponding to parts opposing each other of a cyan-colored part in the data layer 430, a yellow-colored part in the data layer 450, and a non-magenta-colored part (i.e., a part without color development) in the data layer 470. Further, the two-dimensional visible information 400A has a gradation-level value of red at coordinates corresponding to parts opposing each other of a yellow-colored part in the data layer 450, a magenta-colored part in the data layer 470, and a non-cyan-colored part (i.e., a part without color development) in the data layer 330. Further, the two-dimensional visible information 400A has a gradation-level value of blue at coordinates corresponding to parts opposing each other of a cyan-colored part in the data layer 430, a magenta-colored part in the data layer 470, and a non-yellow-colored part (i.e., a part without color development) in the data layer 350. Further, the two-dimensional visible information 400A has a gradation-level value of cyan at coordinates corresponding to parts opposing each other of a cyan-colored part in the data layer 450 and a non-colored part (i.e., a part without color development) in the data layers 450 and 470. Further, the two-dimensional visible information 400A has a gradation-level value of white at coordinates corresponding to other parts. At this time, the hue information is, for example, a gradation-level value similar to that of the two-dimensional visible information 400A.

Further, in a case where the visible information as illustrated in FIG. 60 is recorded on the information medium 400 in FIG. 25, the three-dimensional scanner 660 acquires the three-dimensional position information 400B as illustrated in an upper part of FIG. 60. The three-dimensional position information 400B has a value D1 corresponding to the depth of the data layer 430 at coordinates corresponding to a cyan-colored part in the data layer 430, and has a value D2 corresponding to the depth of the data layer 450 at coordinates corresponding to parts opposing each other of a yellow-colored part in the data layer 450 and a non-cyan-colored part (i.e., a part without color development) in the data layer 430. Further, the three-dimensional position information 400B has a value Dw corresponding to the depth of the support base 410 at coordinates corresponding to other parts.

Further, in a case where visible information as illustrated in FIG. 61 is recorded on the information medium 100 in FIG. 5, the two-dimensional scanner unit 650 acquires the two-dimensional visible information 100A as illustrated in a middle part of FIG. 61. The two-dimensional visible information 100A has a gradation-level value of black at coordinates corresponding to a colored part in the data layers 130, 150, 170, and 190, and has a gradation-level value of white at coordinates corresponding to other parts. At this time, the hue information is, for example, a gradation-level value similar to that of the two-dimensional visible information 100A.

Further, in a case where the visible information as illustrated in FIG. 61 is recorded on the information medium 300 in FIG. 5, the three-dimensional scanner 660 acquires the three-dimensional position information 100B as illustrated in an upper part of FIG. 61. The three-dimensional position information 100B has a value D1 corresponding to the depth of the data layer 130 at coordinates corresponding to a colored part in the data layer 130, and has a value D2 corresponding to the depth of the data layer 150 at coordinates corresponding to a colored part in the data layer 150. Further, the three-dimensional position information 100B has a value D3 corresponding to the depth of the data layer 170 at coordinates corresponding to a colored part in the data layer 170, and has a value D4 corresponding to the depth of the data layer 190 at coordinates corresponding to a colored part in the data layer 190. Further, the three-dimensional position information 100B has a value Dw corresponding to the depth of the support base 110 at coordinates corresponding to other parts.

Further, in a case where the visible information as illustrated in FIG. 62 is recorded on the information medium 200 in FIG. 11, the two-dimensional scanner unit 650 acquires the two-dimensional visible information 200A as described in a middle part of FIG. 62. The two-dimensional visible information 200A has a gradation-level value of blue at coordinates corresponding to a colored part in the data layers 230, 250, 270, and 290, and has a gradation-level value of white at coordinates corresponding to other parts. At this time, the hue information is, for example, a gradation-level value similar to that of the two-dimensional visible information 200A.

Further, in a case where the visible information as illustrated in FIG. 62 is recorded on the information medium 300 in FIG. 11, the three-dimensional scanner 660 acquires the three-dimensional position information 200B as illustrated in an upper part of FIG. 62. The three-dimensional position information 200B has a value D1 corresponding to the depth of the data layer 230 at coordinates corresponding to a colored part in the data layer 230, and has a value D2 corresponding to the depth of the data layer 250 at coordinates corresponding to a colored part in the data layer 250. Further, the three-dimensional position information 200B has a value D3 corresponding to the depth of the data layer 270 at coordinates corresponding to a colored part in the data layer 270, and has a value D4 corresponding to the depth of the data layer 290 at coordinates corresponding to a colored part in the data layer 290. Further, the three-dimensional position information 200B has a value Dw corresponding to the depth of the support base 210 at coordinates corresponding to other parts.

Further, in a case where the visible information as illustrated in FIG. 63 is recorded on the information medium 300 in FIG. 17, the two-dimensional scanner unit 650 acquires the two-dimensional visible information 300A as illustrated in a middle part of FIG. 63. The two-dimensional visible information 300A has a gradation-level value of blue at coordinates corresponding to parts opposing each other of a magenta-colored part in the data layer 330 and a cyan-colored part in the data layers 350 and 390. Further, the two-dimensional visible information 300A has a gradation-level value of blue at coordinates corresponding to a blue-colored part in the data layer 370. Further, the two-dimensional visible information 300A has a gradation-level value of white at coordinates corresponding to other parts. At this time, the hue information is, for example, a gradation-level value similar to that of the two-dimensional visible information 300A.

Further, in a case where the visible information as illustrated in FIG. 63 is recorded on the information medium 300 in FIG. 17, the three-dimensional scanner 660 acquires the three-dimensional position information 300B as illustrated in an upper part of FIG. 63. The three-dimensional position information 300B has a value D1 corresponding to the depth of the data layer 330 at coordinates corresponding to a magenta-colored part in the data layer 330, and has a value D3 corresponding to the depth of the data layer 370 at coordinates corresponding to a blue-colored part in the data layer 370. Further, the three-dimensional position information 300B has a value Dw corresponding to the depth of the support base 310 at coordinates corresponding to other parts.

Further, in a case where the visible information as illustrated in FIG. 64 is recorded on the information medium 300 in FIG. 19, the two-dimensional scanner unit 650 acquires the two-dimensional visible information 300A as illustrated in a middle part of FIG. 64. The two-dimensional visible information 300A has a gradation-level value of blue at coordinates corresponding to parts opposing each other at a magenta-colored part in the data layers 330 and 391 and a cyan-colored part in the data layers 350 and 390. Further, the two-dimensional visible information 300A has a gradation-level value of white at coordinates corresponding to other parts. At this time, the hue information is, for example, a gradation-level value similar to that of the two-dimensional visible information 300A.

Further, in a case where the visible information as illustrated in FIG. 64 is recorded on the information medium 300 in FIG. 19, the three-dimensional scanner 660 acquires the three-dimensional position information 300B as illustrated in an upper part of FIG. 64. The three-dimensional position information 300B has a value D1 corresponding to the depth of the data layer 330 at coordinates corresponding to a magenta-colored part in the data layer 330, and has a value D2 corresponding to the depth of the data layer 350 at coordinates corresponding to parts opposing each other of a cyan-colored part in the data layer 350 and a non-magenta-colored part (i.e., a part without color development) in the data layer 330. Further, the three-dimensional position information 300B has a value Dw corresponding to the depth of the support base 310 at coordinates corresponding to other parts.

Further, in a case where the visible information as illustrated in FIG. 65 is recorded on the information medium 300 in FIG. 23, the two-dimensional scanner unit 650 acquires the two-dimensional visible information 300A as illustrated in a middle part of FIG. 65. The two-dimensional visible information 300A has a gradation-level value of blue at coordinates corresponding to parts opposing each other of a magenta-colored part in the data layer 330 and a cyan-colored part in the data layers 350 and 390. Further, the two-dimensional visible information 300A has a gradation-level value of blue at coordinates corresponding to a blue-colored part in the data layer 370. Further, the two-dimensional visible information 300A has a gradation-level value of cyan at coordinates corresponding to parts opposing each other of a cyan-colored part in the data layer 350 and a non-magenta-colored part (i.e., a part without color development) in the data layer 330. Further, the two-dimensional visible information 300A has a gradation-level value of blue at coordinates corresponding to a blue-colored part in the data layer 370. Further, the two-dimensional visible information 300A has a gradation-level value of white at coordinates corresponding to other parts. At this time, the hue information is, for example, a gradation-level value similar to that of the two-dimensional visible information 300A.

Further, in a case where the visible information as illustrated in FIG. 65 is recorded on the information medium 300 in FIG. 23, the three-dimensional scanner 660 acquires the three-dimensional position information 300B as illustrated in an upper part of FIG. 65. The three-dimensional position information 300B has a value D1 corresponding to the depth of the data layer 330 at coordinates corresponding to a magenta-colored part in the data layer 330, and has a value D2 corresponding to the depth of the data layer 350 at coordinates corresponding to parts opposing each other of a cyan-colored part in the data layer 350 and a non-magenta-colored part (i.e., a part without color development) in the data layer 330. The three-dimensional position information 300B has a value D3 corresponding to the depth of the data layer 370 at coordinates corresponding to a blue-colored part in the data layer 370. Further, the three-dimensional position information 300B has a value Dw corresponding to the depth of the support base 310 at coordinates corresponding to other parts.

Further, in a case where the visible information as illustrated in FIG. 66 is recorded on the information medium 300 of FIG. 24, the two-dimensional scanner unit 650 acquires the two-dimensional visible information 300A as illustrated in a middle part of FIG. 66. The two-dimensional visible information 300A has a gradation-level value of blue at coordinates corresponding to parts opposing each other of a magenta-colored part in the data layers 330 and 391 and a cyan-colored part in the data layers 350 and 390. Further, the two-dimensional visible information 300A has a gradation-level value of magenta at coordinates corresponding to parts opposing each other of a magenta-colored part in the data layers 330 and 391 and a non-cyan-colored part (i.e., a part without color development) in the data layers 350 and 390. Further, the two-dimensional visible information 300A has a gradation-level value of cyan at coordinates corresponding to parts opposing each other of a cyan-colored part in the data layers 350 and 390 and a non-magenta-colored part (i.e., a part without color development) in the data layers 330 and 391. Further, the two-dimensional visible information 300A has a gradation-level value of white at coordinates corresponding to other parts. At this time, the hue information is, for example, a gradation-level value similar to that of the two-dimensional visible information 300A.

Further, in a case where the visible information as illustrated in FIG. 66 is recorded on the information medium 300 in FIG. 24, the three-dimensional scanner 660 acquires the three-dimensional position information 300B as illustrated in an upper part of FIG. 66. The three-dimensional position information 300B has a value D1 corresponding to the depth of the data layer 330 at coordinates corresponding to a magenta-colored part in the data layer 330, and has a value D2 corresponding to the depth of the data layer 350 at coordinates corresponding to parts opposing each other of a cyan-colored part in the data layer 350 and a non-magenta-colored part (i.e., a part without color development) in the data layer 330. The three-dimensional position information 300B has a value D3 corresponding to the depth of the data layer 391 at coordinates corresponding to parts opposing each other of a magenta-colored part in the data layer 391 and a non-colored part (i.e., a part without color development) in the data layers 330 and 350. Further, the three-dimensional position information 300B has a value Dw corresponding to the depth of the support base 310 at coordinates corresponding to other parts.

Further, in a case where the visible information as illustrated in FIG. 67 is recorded on the information medium 400 in FIG. 27, the two-dimensional scanner unit 650 acquires the two-dimensional visible information 400A as illustrated in a middle part of FIG. 67. The two-dimensional visible information 400A has a gradation-level value of green at coordinates corresponding to parts opposing each other of a cyan-colored part in the data layer 430 and a yellow-colored part in the data layer 450. Further, the two-dimensional visible information 400A has a gradation-level value of blue at coordinates corresponding to parts opposing each other of a cyan-colored part in the data layer 430 and a magenta-colored part in the data layer 470. Further, the two-dimensional visible information 400A has a gradation-level value of red at coordinates corresponding to parts opposing each other of a yellow-colored part in the data layer 450 and a magenta-colored part in the data layer 470. Further, the two-dimensional visible information 400A has a gradation-level value of cyan at coordinates corresponding to parts opposing each other of a cyan-colored part in the data layer 430 and a non-colored part (i.e., a part without color development) in the data layers 450, 470, and 490. Further, the two-dimensional visible information 400A has a gradation-level value of black at coordinates corresponding to a black-colored part in the data layer 490. Further, the two-dimensional visible information 400A has a gradation-level value of white at coordinates corresponding to other parts. At this time, the hue information is, for example, a gradation-level value similar to that of the two-dimensional visible information 400A.

Further, in a case where the visible information as illustrated in FIG. 67 is recorded on the information medium 400 in FIG. 27, the three-dimensional scanner 660 acquires the three-dimensional position information 400B as illustrated in an upper part of FIG. 67. The three-dimensional position information 400B has a value D1 corresponding to the depth of the data layer 430 at coordinates corresponding to a cyan-colored part in the data layer 430, and has a value D2 corresponding to the depth of the data layer 450 at coordinates corresponding to parts opposing each other of a yellow-colored part in the data layer 450 and a non-cyan-colored part in the data layer 430 (i.e., a part without color development). Further, the three-dimensional position information 400B has a value D4 corresponding to the depth of the data layer 490 at coordinates corresponding to a black-colored part in the data layer 490. Further, the three-dimensional position information 400B has a value Dw corresponding to the depth of the support base 410 at coordinates corresponding to other parts.

In this manner, the reading apparatus 600 reads information from the information medium 100, 200, or 300.

In the present embodiment, the three-dimensional position information of the two or more pieces of visible information recorded on the two or more data layers existing in the information medium 100, 200, 300, or 400 is acquired by performing measurement of a depth difference or a reflectance difference with respect to the two or more data layers existing in the information medium 100, 200, 300, or 400. Further, two or more pieces of visible information Dx are generated on the basis of the three-dimensional position information. In this manner, by acquiring the depth information, the above-described second information can be restored from the information medium 100, 200, 300, or 400.

Moreover, in the present embodiment, the two or more pieces of visible information recorded on the two or more data layers existing in the information medium 100, 200, 300, or 400 are generated on the basis of the two or more pieces of visible information Dx and the hue information obtained from the two-dimensional visible information 100A, 200A, 300A, or 400A. In this manner, by using the reading apparatus 600, it is possible to restore the second information recorded on the information medium 100, 200, 300, or 400.

Moreover, in the present embodiment, synthesis information (the two-dimensional visible information 100A, 200A, 300A, or 400A) of the pieces of visible information recorded on the respective data layers is detected from the information medium 100, 200, 300, or 400. As a result, it is possible to restore the above-described first information from the synthesis information (the two-dimensional visible information 100A, 200A, 300A, or 400A). Therefore, it is possible to make the information medium 100, 200, 300, or 400 compatible with a two-dimensional bar code or the like that has been conventionally used.

11. Modification Common to First to Fourth Embodiments and Modifications Thereof In the first to the fourth embodiments and the modifications thereof described above, the two or more data layers provided in the information medium 100, 200, 300, or 400 may each be a printed layer in which the corresponding visible information is irreversibly fixed. Also in this case, in a case where an image of the information medium 100, 200, 300, or 400 is captured by an imaging device such as a camera, the captured image obtained by the imaging is a single-color two-dimensional visible information 100A, 200A, 300A, or 400A itself. Therefore, the visible information cannot be separated from the captured image. Therefore, even if the imaging device such as the camera is used, the visible information recorded on the information medium 100, 200, 300, or 400 cannot be copied. From the above, it is possible to provide the information medium 100, 200, 300, or 400 difficult to forge.

12. Application Examples

For example, as illustrated in FIG. 68, the information medium 100, 200, 300, or 400 according to any of the first to the fourth embodiments and the modifications thereof described above can be applied to an employee ID card 700. In this case, as the above-described first information, for example, information described on a surface of the employee ID card 700 can be recorded on the information medium 100, 200, 300, or 400, and as the above-described second information, for example, confidential information which should not be known to a third party can be recorded on the information medium 100, 200, 300, or 400.

Further, for example, as illustrated in FIG. 69, the information medium 100, 200, 300, or 400 according to the first to the fourth embodiments and the modifications thereof described above can be applied to a member card 800. In this case, as the above-described first information, for example, information described on a surface of the member card 800 can be recorded on the information medium 100, 200, 300, or 400, and as the above-described second information, for example, confidential information given only to a particular member (for example, a gold member) can be recorded on the information medium 100, 200, 300, or 400.

13. Other Modifications

In the embodiments and the modifications thereof described above, each of the data layers may include, for example, a photochromic material. Examples of the photochromic material include a diarylethene compound and the like. The photochromic material is configured to be able to make transition between a colored state (a color state) and a decolored state in a visible wavelength range. The photochromic material has an absorption peak in the ultraviolet range in the decolored state. When irradiated with ultraviolet rays having a wavelength in the vicinity of the absorption peak, the absorption peak shifts to the visible light range and the photochromic material becomes the colored state. Accordingly, the photochromic material may be developed by applying ultraviolet rays having a wavelength close to the absorption peak in the decolored state, thereby writing the visible information on each of the data layers.

Further, in the embodiments and the modifications thereof described above, each of the data layers may include, for example, a material capable of controlling an optical transmittance in the visible wavelength range by a phase change, or a material capable of making transition between the colored state and the decolored state in the visible wavelength range by a phase change. As such a material, a phase change material capable of mutually making transition between two phases of amorphous and crystal can be used. For example, a film of germanium-antimony-tellurium alloy $Ge_2Sb_2Te_5$ becomes a transparent amorphous phase when being heated to a high temperature of about 600° C. and being rapidly cooled, and becomes a non-transparent crystalline phase when being heated to a medium temperature of about 160° C. and being slowly cooled. Such a phase change material may be used in each of the data layers to write the visible information on each of the data layers.

Although the present disclosure has been described above with reference to a plurality of embodiments and modifications thereof, the present disclosure is not limited to the above-described embodiments and the like, and various modifications can be made.

It should be noted that the effects described herein are mere examples. The effects of the present disclosure are not limited to the effects described herein. The present disclosure may have effects other than the effects described herein.

For example, the present disclosure may also be configured as follows.

(1)
An information medium including
two or more data layers provided on a support base, in which
the two or more data layers have two or more pieces of visible information recorded on the two or more data layers, the two or more pieces of visible information being obtained by decomposing two-dimensional visible information and thereby allowing synthesis of the two or more pieces of visible information to result in the two-dimensional visible information.

(2)
The information medium according to (1), in which the data layers each include a printed layer to which corresponding one of the two or more pieces of visible information is irreversibly fixed.

(3)
The information medium according to (1), in which
the data layers each include a modulation material having an optical characteristic that is modulatable, and
modulation of the modulation material causes the visible information to be recorded.

(4)
The information medium according to (3), in which the modulation material includes a leuco dye.

(5)
The information medium according to (3), in which the modulation material includes a photochromic material.

(6)
The information medium according to any one of (1) to (5), further including one or more intermediate layers that each suppress interference between two, of the data layers, that are adjacent to each other.

(7)
The information medium according to any one of (3) to (5), in which the data layers a single color tone in a plane at time of color development of the modulation material.

(8)
The information medium according to (7), in which the data layers are the same as each other in color tone at the time of the color development of the modulation material.

(9)
The information medium according to (8), in which the data layers are different from each other in modulation condition of the modulation material.

(10)
The information medium according to any one of (3) to (5), in which at least two layers of the two or more data layers are different from each other in color tone at time of color development of the modulation material.

(11)
The information medium according to (10), in which at least two layers of the two or more data layers have respective colored parts that partially or fully overlap with each other in a stacking direction.

(12)
The information medium according to (10) or (11), in which the data layers are different from each other in modulation condition of the modulation material.

(13)
The information medium according to any one of (3) to (5), in which at least two layers of the two or more data layers are the same as each other in color tone at time of color development of the modulation material.

(14)
The information medium according to (13), in which the data layers are different from each other in modulation condition of the modulation material.

(15)
A recording apparatus that records information on an information medium, the information medium including two or more data layers stacked on a support base, the recording apparatus including:
a generating unit that generates two or more pieces of visible information by decomposing two-dimensional visible information and thereby allowing synthesis of the two or more pieces of visible information to result in the two-dimensional visible information; and
a recording unit that records, on the two or more data layers, the two or more pieces of visible information generated by the generating unit.

(16)
The recording apparatus according to (15), in which the generating unit converts first information into the two-dimensional visible information and converts second information into the two or more pieces of visible information.

(17) The recording apparatus according to (15) or (16), in which the data layers each include a modulation material having an optical characteristic that is modulatable, the data layers are different from each other in modulation condition of the modulation material, and the recording unit controls each of the data layers on the basis of the modulation condition of each of the data layers to perform recording on each of the data layers.

(18) A reading apparatus including:

a first detecting unit that detects, from an information medium in which two or more data layers are stacked on a support base and first visible information is recorded on each of the data layers, three-dimensional position information of the first visible information recorded on each of the data layers; and a generating unit that generates the first visible information, recorded on each of the data layers, on the basis of the three-dimensional position information detected by the first detecting unit.

(19) The reading apparatus according to (18), further including a second detecting unit that detects hue information of the first visible information recorded on each of the data layers, in which the generating unit generates the first visible information, recorded on each of the data layers, on the basis of the three-dimensional position information and the hue information.

(20) The reading apparatus according to (18) or (19), further including a third detecting unit that detects second visible information from the information medium, the second visible information is synthesis of the two or more pieces of first visible information recorded on the respective data layers.

(21) A recording method for an information medium in which two or more data layers are stacked on a support base, the recording method including:

generating two or more pieces of visible information by decomposing two-dimensional visible information and thereby allowing synthesis of the two or more pieces of visible information to result in the two-dimensional visible information; and recording the two or more pieces of generated visible information on the two or more data layers.

(22) The recording method according to (21), further including converting first information into the two-dimensional visible information and converting second information into the two or more pieces of visible information.

(23) The recording method according to (21) or (22), in which the data layers each include a modulation material having an optical characteristic that is modulatable, the data layers are different from each other in modulation condition of the modulation material, and the recording method includes controlling each of the data layers on the basis of the modulation condition of each of the data layers to perform recording on each of the data layers.

(24) A reading method including:

detecting, from an information medium in which two or more data layers are stacked on a support base and first visible information is recorded on each of the data layers, three-dimensional position information of the first visible information recorded on each of the data layers; and generating the first visible information, recorded on each of the data layers, on the basis of the detected three-dimensional position information.

(25) The reading method according to (24), further including detecting hue information of the first visible information recorded on each of the data layers; and generating the first visible information, recorded on each of the data layers, on the basis of the three-dimensional position information and the hue information.

(26) The reading method according to (24) or (25), further including detecting second visible information from the information medium, the second visible information being synthesis of the two or more pieces of first visible information recorded on the respective data layers.

(27) The information medium according to (2), in which the data layers each have a colored part that has a single color tone in a plane.

(28) The information medium according to (2), in which the data layers are the same as each other in color tone of a colored part.

(29) The information medium according to (2), in which at least two layers of the two or more data layers are different from each other in color tone of a colored part.

(30) The information medium according to (29), in which at least two layers of the two or more data layers have respective colored parts that partially or fully overlap with each other in a stacking direction.

(31) The information medium according to (2), in which at least two layers of the two or more data layers are the same as each other in color tone of a colored part.

(32) The information medium according to (3), in which the modulation material includes a material having an optical characteristic that reversibly varies.

According to the information medium of the embodiment of the present disclosure, only the two-dimensional visible information can be read when a usual reading apparatus is used. It is therefore possible to provide an information medium difficult to forge.

According to the recording apparatus of the embodiment of the present disclosure, only the two-dimensional visible information can be read when a usual reading apparatus is used. It is therefore possible to provide an information medium difficult to forge.

According to the reading apparatus of the embodiment of the present disclosure, the first visible information recorded on each of the data layers can be detected by detecting the three-dimensional position information. It is therefore possible to read information that cannot be read by a usual reading apparatus.

Note that the effects of the present technology are not necessarily limited to the effects described here, and may include any of the effects described herein.

The present application claims priority based on Japanese Patent Application No. 2019-060353 filed with the Japan Patent Office on Mar. 27, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information medium comprising
two or more data layers provided on a support base, wherein
the two or more data layers have two or more pieces of visible information recorded on the two or more data layers, the two or more pieces of visible information being obtained by decomposing two-dimensional visible information and thereby allowing synthesis of the two or more pieces of visible information to result in the two-dimensional visible information,
the data layers each include a modulation material having an optical characteristic that is modulatable,
modulation of the modulation material causes the visible information to be recorded, and
at least two layers of the two or more data layers are the same as each other in color tone at time of color development of the modulation material.

2. The information medium according to claim 1, wherein the data layers each comprise a printed layer to which corresponding one of the two or more pieces of visible information is irreversibly fixed.

3. The information medium according to claim 1, wherein the modulation material includes a leuco dye.

4. The information medium according to claim 1, wherein the modulation material includes a photochromic material.

5. The information medium according to claim 1, further comprising one or more intermediate layers that each suppress interference between two, of the data layers, that are adjacent to each other.

6. The information medium according to claim 1, wherein the data layers each have a single color tone in a plane at time of color development of the modulation material.

7. The information medium according to claim 6, wherein each of the data layers are the same as each other in color tone at the time of the color development of the modulation material.

8. The information medium according to claim 7, wherein the data layers are different from each other in modulation condition of the modulation material.

9. The information medium according to claim 1, wherein at least two layers of the two or more data layers are different from each other in color tone at time of color development of the modulation material.

10. The information medium according to claim 9, wherein at least two layers of the two or more data layers have respective colored parts that partially or fully overlap with each other in a stacking direction.

11. The information medium according to claim 9, wherein the data layers are different from each other in modulation condition of the modulation material.

12. The information medium according to claim 1, wherein the data layers are different from each other in modulation condition of the modulation material.

13. A recording apparatus that records information on an information medium, the information medium including two or more data layers stacked on a support base, the recording apparatus comprising:

a generating unit that generates two or more pieces of visible information by decomposing two-dimensional visible information and thereby allowing synthesis of the two or more pieces of visible information to result in the two-dimensional visible information; and
a recording unit that records, on the two or more data layers, the two or more pieces of visible information generated by the generating unit, wherein
the data layers each include a modulation material having an optical characteristic that is modulatable,
modulation of the modulation material causes the visible information to be recorded, and
at least two layers of the two or more data layers are the same as each other in color tone at time of color development of the modulation material.

14. The recording apparatus according to claim 13, wherein the generating unit converts first information into the two-dimensional visible information and converts second information into the two or more pieces of visible information.

15. The recording apparatus according to claim 13, wherein
the data layers are different from each other in modulation condition of the modulation material, and
the recording unit controls each of the data layers on a basis of the modulation condition of each of the data layers to perform recording on each of the data layers.

16. A reading apparatus comprising:
a first detecting unit that detects, from an information medium in which two or more data layers are stacked on a support base and first visible information is recorded on each of the data layers, three-dimensional position information of the first visible information recorded on each of the data layers; and
a generating unit that generates the first visible information, recorded on each of the data layers, on a basis of the three-dimensional position information detected by the first detecting unit, wherein
the data layers each include a modulation material having an optical characteristic that is modulatable,
modulation of the modulation material causes the visible information to be recorded, and
at least two layers of the two or more data layers are the same as each other in color tone at time of color development of the modulation material.

17. The reading apparatus according to claim 16, further comprising
a second detecting unit that detects hue information of the first visible information recorded on each of the data layers, wherein
the generating unit generates the first visible information, recorded on each of the data layers, on a basis of the three-dimensional position information and the hue information.

18. The reading apparatus according to claim 16, further comprising a third detecting unit that detects second visible information from the information medium, the second visible information being synthesis of the two or more pieces of first visible information recorded on the respective data layers.

* * * * *